(12) United States Patent
Kurokawa et al.

(10) Patent No.: US 10,222,848 B2
(45) Date of Patent: Mar. 5, 2019

(54) ANALOG ARITHMETIC CIRCUIT, SEMICONDUCTOR DEVICE, AND ELECTRONIC DEVICE

(71) Applicant: Semiconductor Energy Laboratory Co., Ltd., Atsugi-shi, Kanagawa-ken (JP)

(72) Inventors: Yoshiyuki Kurokawa, Sagamihara (JP); Takayuki Ikeda, Atsugi (JP); Shunpei Yamazaki, Setagaya (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 9 days.

(21) Appl. No.: 15/124,543

(22) PCT Filed: Mar. 2, 2015

(86) PCT No.: PCT/IB2015/051505
§ 371 (c)(1),
(2) Date: Sep. 8, 2016

(87) PCT Pub. No.: WO2015/136401
PCT Pub. Date: Sep. 17, 2015

(65) Prior Publication Data
US 2017/0017285 A1    Jan. 19, 2017

(30) Foreign Application Priority Data

Mar. 14, 2014  (JP) ................. 2014-051695

(51) Int. Cl.
*G06F 1/32* (2006.01)
*G06G 7/00* (2006.01)
*G06F 1/3287* (2019.01)

(52) U.S. Cl.
CPC .............. *G06F 1/32* (2013.01); *G06F 1/3287* (2013.01); *G06G 7/00* (2013.01)

(58) Field of Classification Search
CPC ................... G06F 1/32; G06G 7/00
See application file for complete search history.

(56) References Cited

U.S. PATENT DOCUMENTS

| 7,120,617 B2 | 10/2006 | Nomura et al. |
| 7,272,585 B2 | 9/2007 | Nomura et al. |

(Continued)

FOREIGN PATENT DOCUMENTS

| CN | 100578440 C | 1/2010 |
| CN | 102214430 A | 10/2011 |

(Continued)

OTHER PUBLICATIONS

International Search Report (Application No. PCT/IB2015/051505) dated May 19, 2015.

(Continued)

*Primary Examiner* — Kim Huynh
*Assistant Examiner* — Eric Chang
(74) *Attorney, Agent, or Firm* — Robinson Intellectual Property Law Office; Eric J. Robinson

(57) ABSTRACT

The power consumption of an analog arithmetic circuit is reduced. The analog arithmetic circuit includes a plurality of first circuits. An output terminal of the k-th (k is a natural number) first circuit is connected to an input terminal of the k+1-th first circuit. Each of the first circuits includes a memory circuit which holds an analog signal, a second circuit which performs arithmetic processing using the analog signal, a switch which controls power supply to the second circuit, and a controller. The conduction state of the switch included in the k-th first circuit is controlled by the controller included in the k+1-th first circuit. The arithmetic processing performed by the second circuit included in the k+1-th first circuit is started by the controller included in the k+1-th first circuit.

6 Claims, 25 Drawing Sheets

(56) References Cited

U.S. PATENT DOCUMENTS

| | | | |
|---|---|---|---|
| 7,982,385 B2 | 7/2011 | Kimura et al. | |
| 8,278,817 B2 | 10/2012 | Kimura et al. | |
| 8,558,778 B2 | 10/2013 | Yoshii et al. | |
| 8,629,612 B2 | 1/2014 | Kimura et al. | |
| 9,099,374 B2 | 8/2015 | Kimura et al. | |
| 9,131,171 B2 | 9/2015 | Aoki et al. | |
| 9,443,471 B2 | 9/2016 | Kishi et al. | |
| 9,887,236 B2 | 2/2018 | Kimura et al. | |
| 2011/0234554 A1* | 9/2011 | Yoshii | G09G 3/20 345/204 |
| 2013/0222584 A1 | 8/2013 | Aoki et al. | |
| 2018/0158865 A1 | 6/2018 | Kimura et al. | |

FOREIGN PATENT DOCUMENTS

| | | |
|---|---|---|
| EP | 1770676 A | 4/2007 |
| JP | 2000-284762 A | 10/2000 |
| JP | 3256738 | 2/2002 |
| JP | 2004-110421 A | 4/2004 |
| JP | 2005-122467 A | 5/2005 |
| JP | 2013-211840 A | 10/2013 |
| KR | 2013-0099849 A | 9/2013 |
| TW | 201351367 | 12/2013 |
| TW | 201409449 | 3/2014 |
| WO | WO-2005/038645 | 4/2005 |

OTHER PUBLICATIONS

Written Opinion (Application No. PCT/IB2015/051505) dated May 19, 2015.
Taiwanese Office Action (Application No. 104107239) dated Jul. 9, 2018.

* cited by examiner

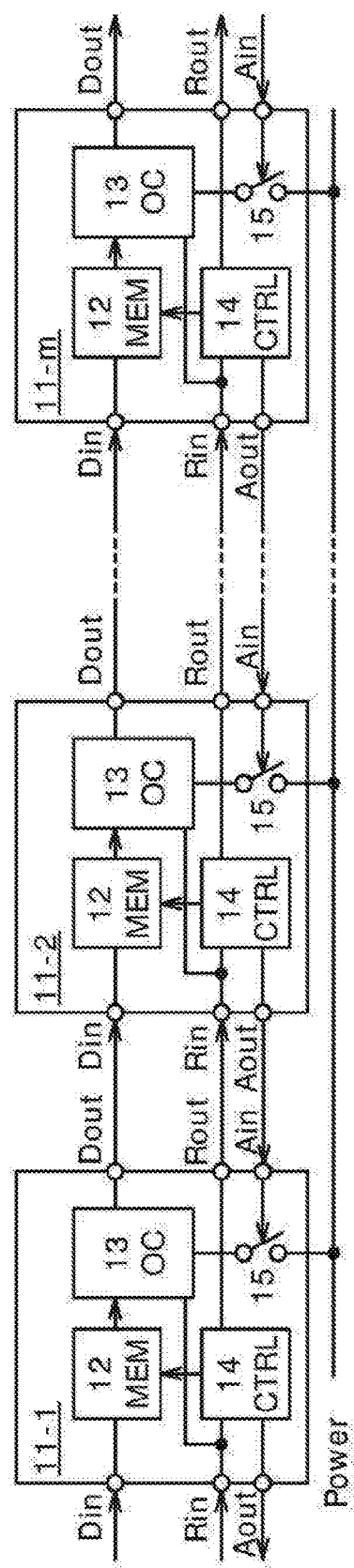
[FIG. 1]

[FIG. 2]
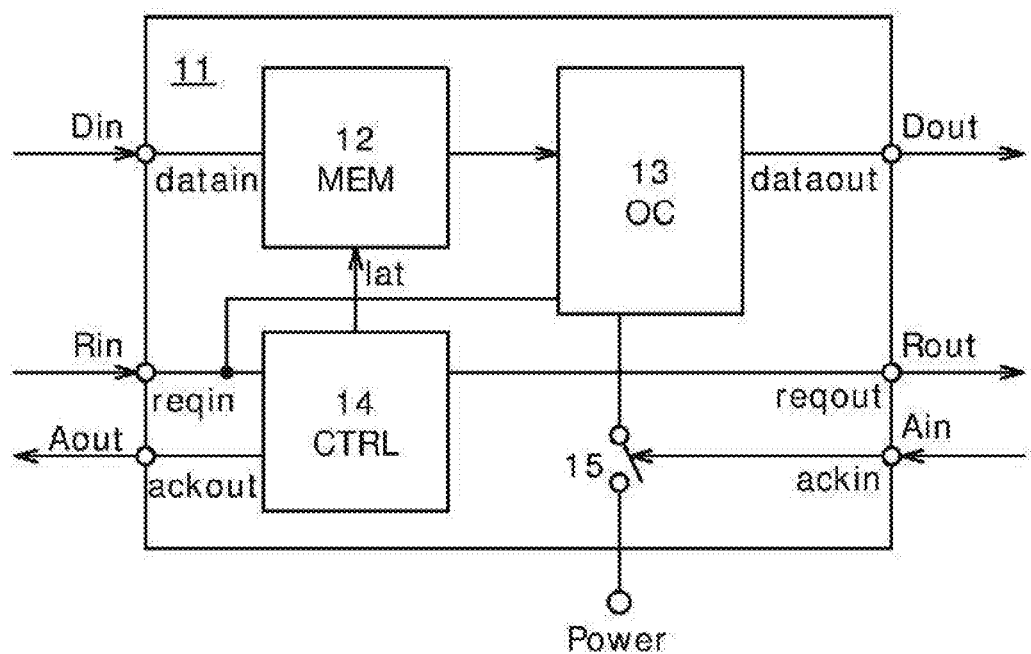

[FIG. 3]
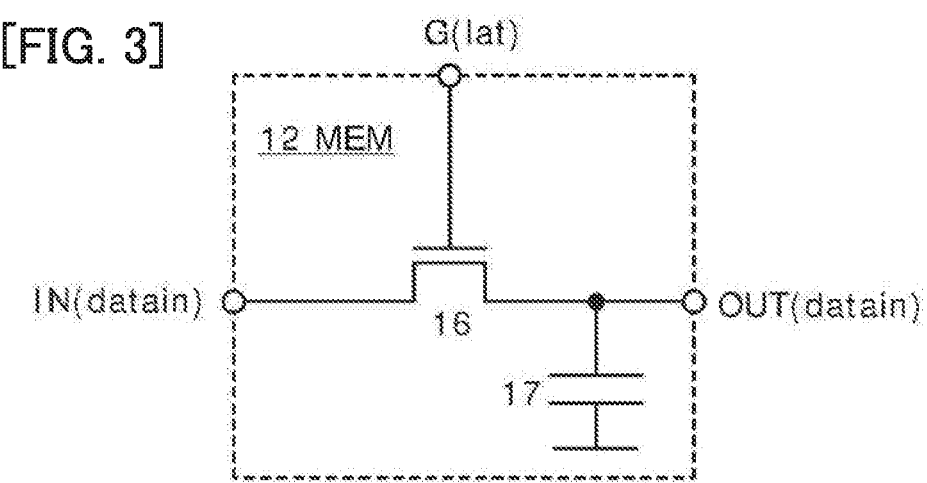

[FIG. 4]
(A)
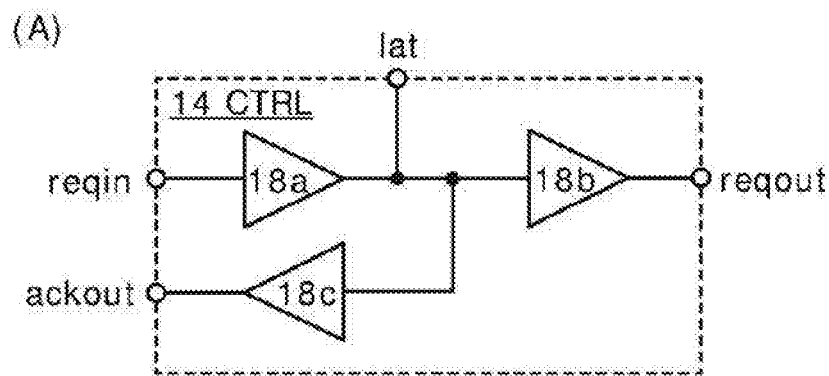
(B)
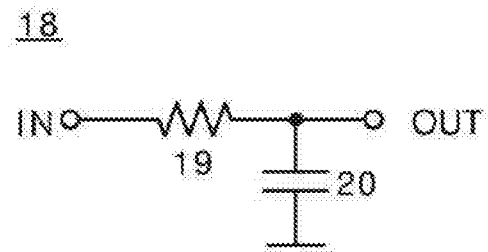
(C)
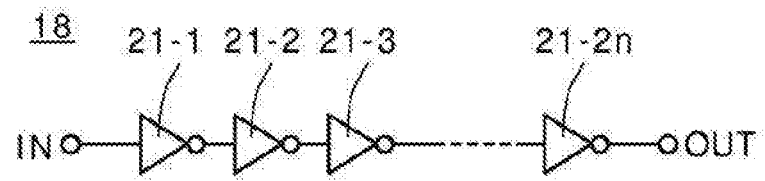

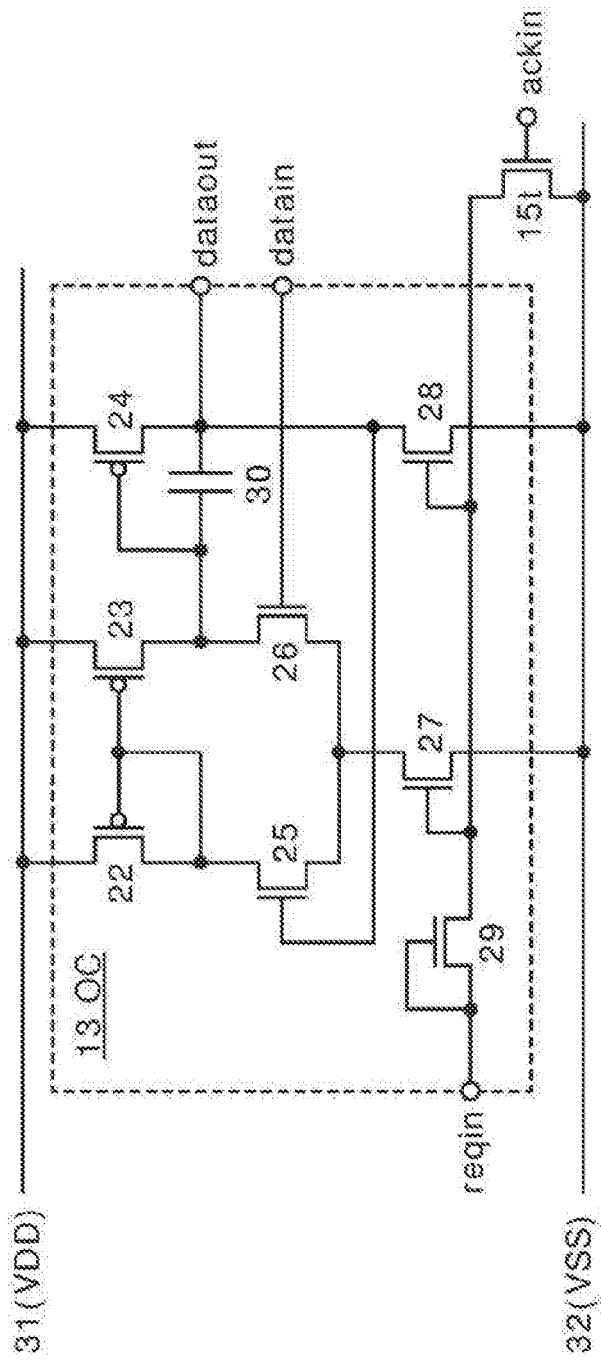
[FIG. 5]

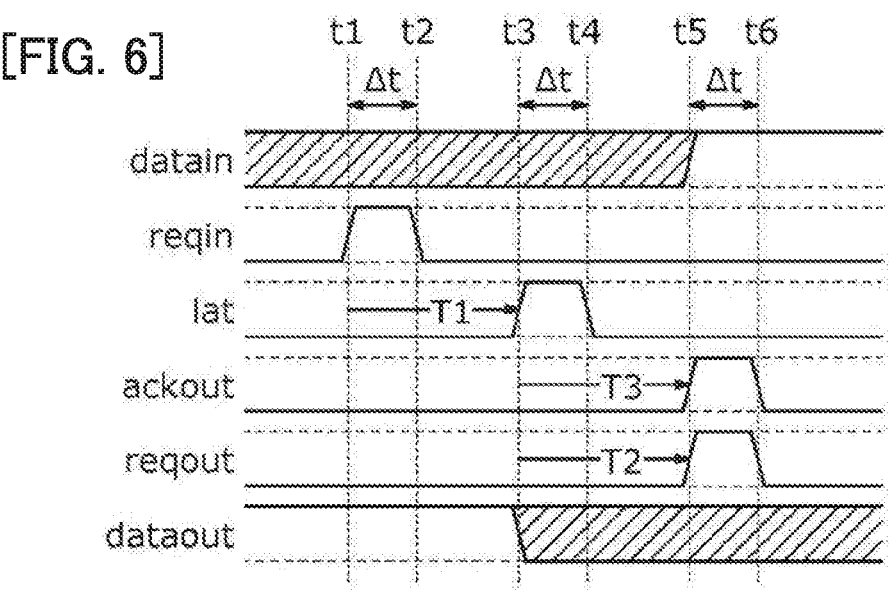
[FIG. 6]

[FIG. 7]
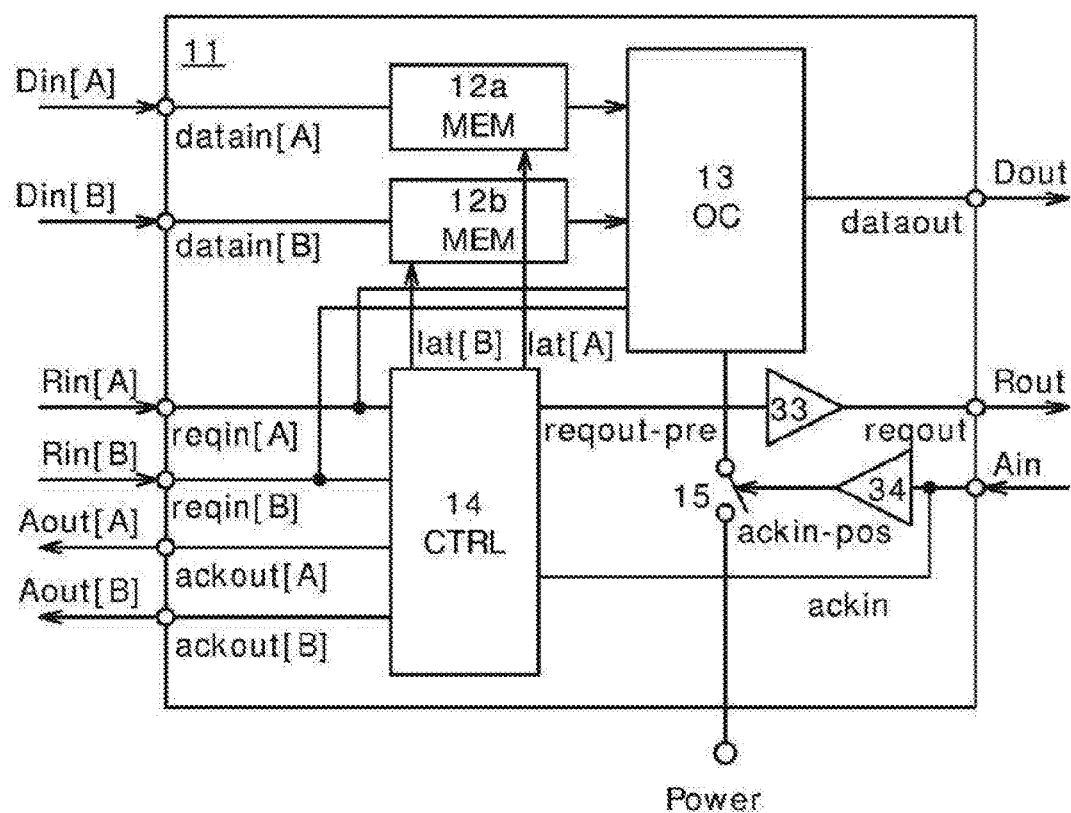

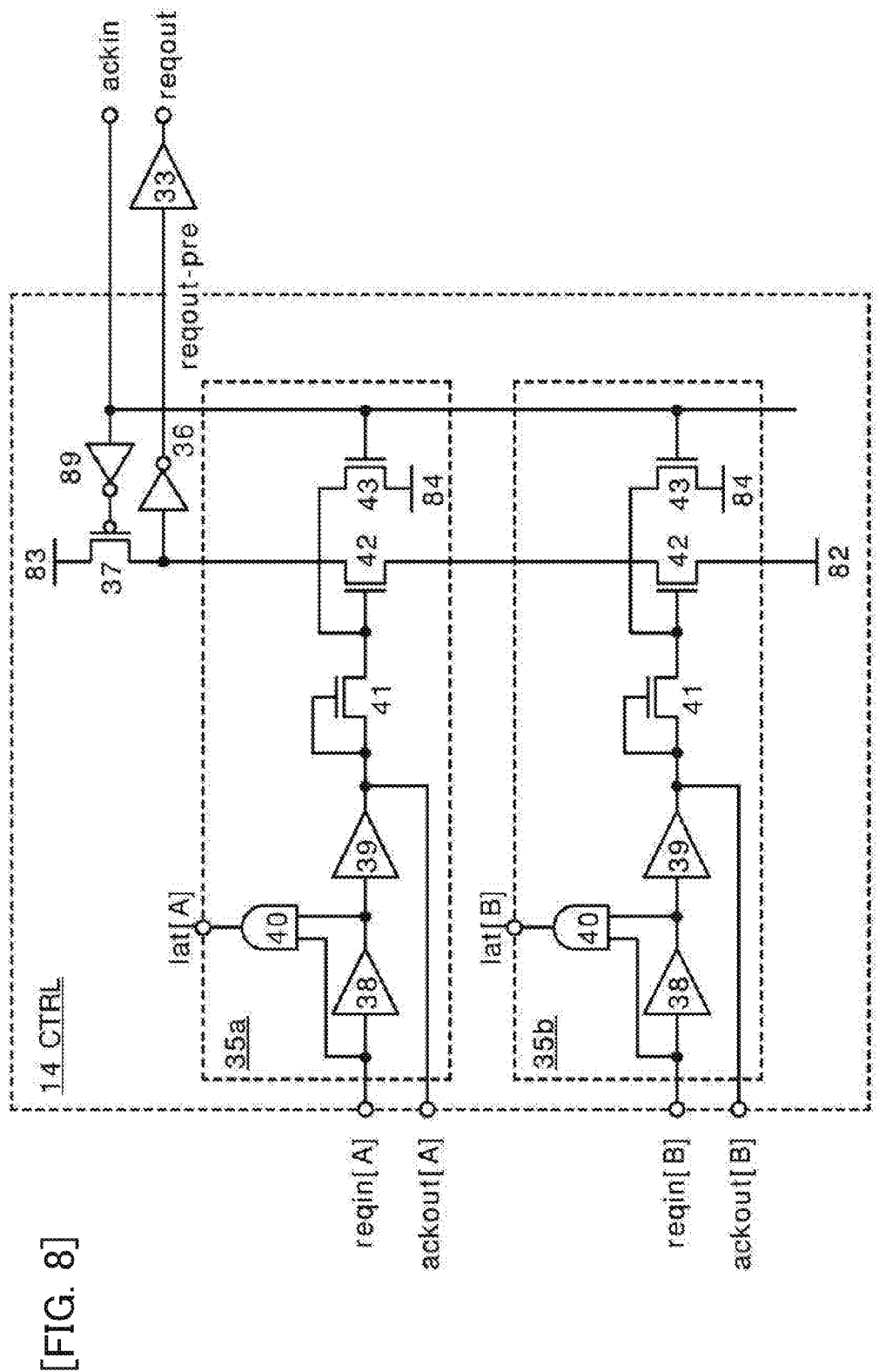
[FIG. 8]

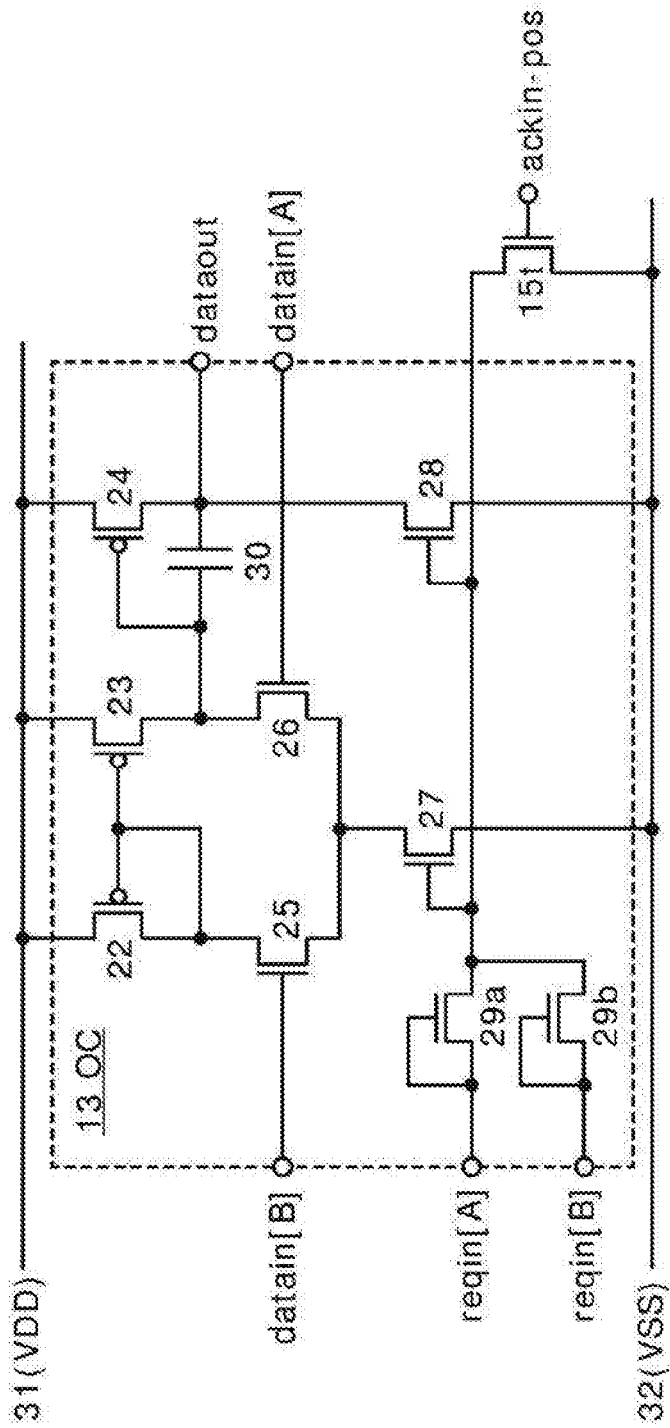
[FIG. 9]

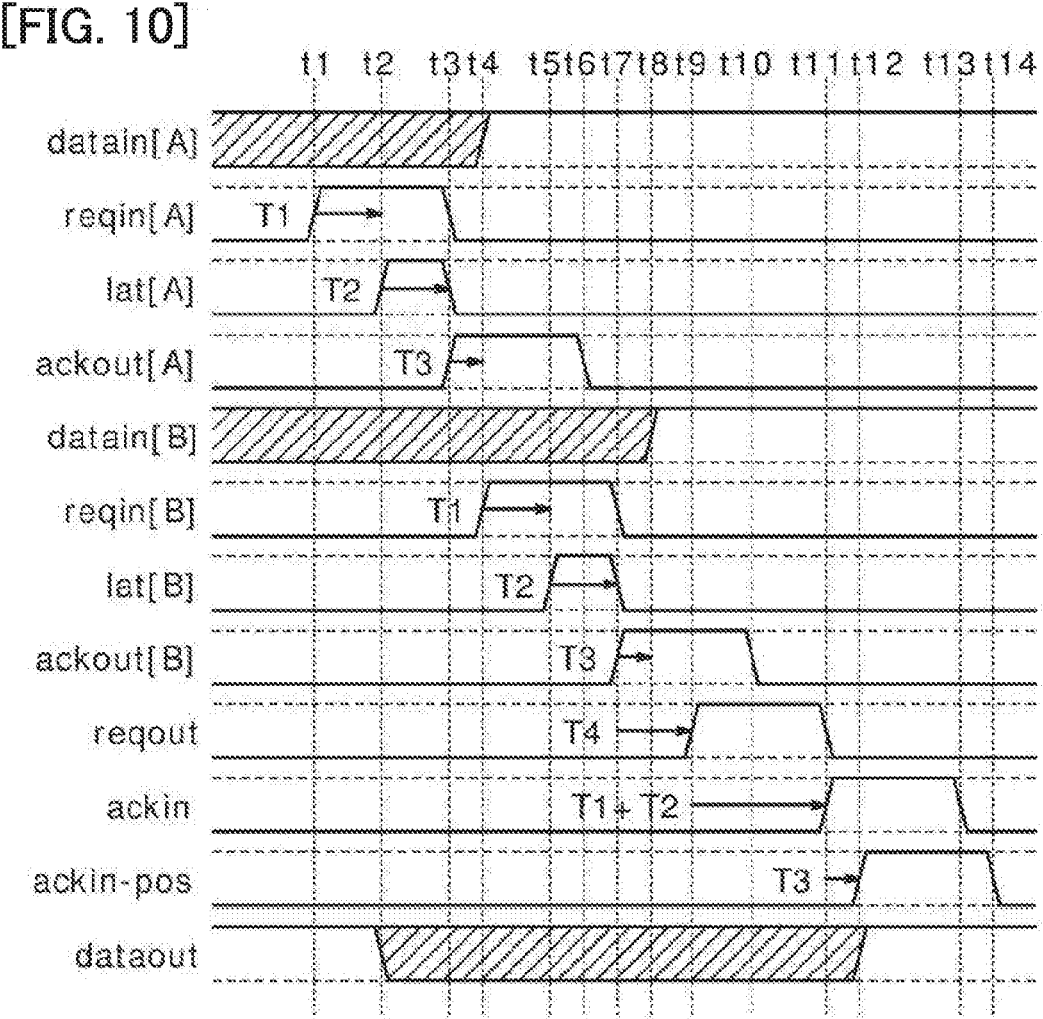
[FIG. 10]

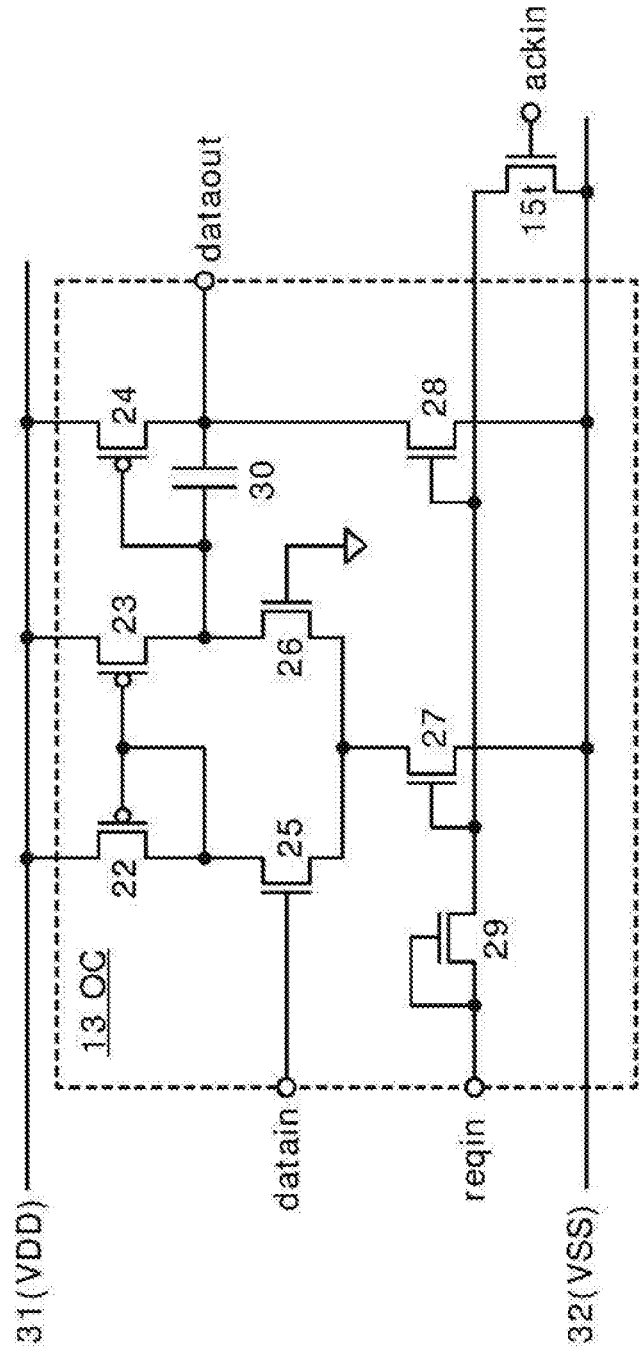
[FIG. 11]

[FIG. 12]
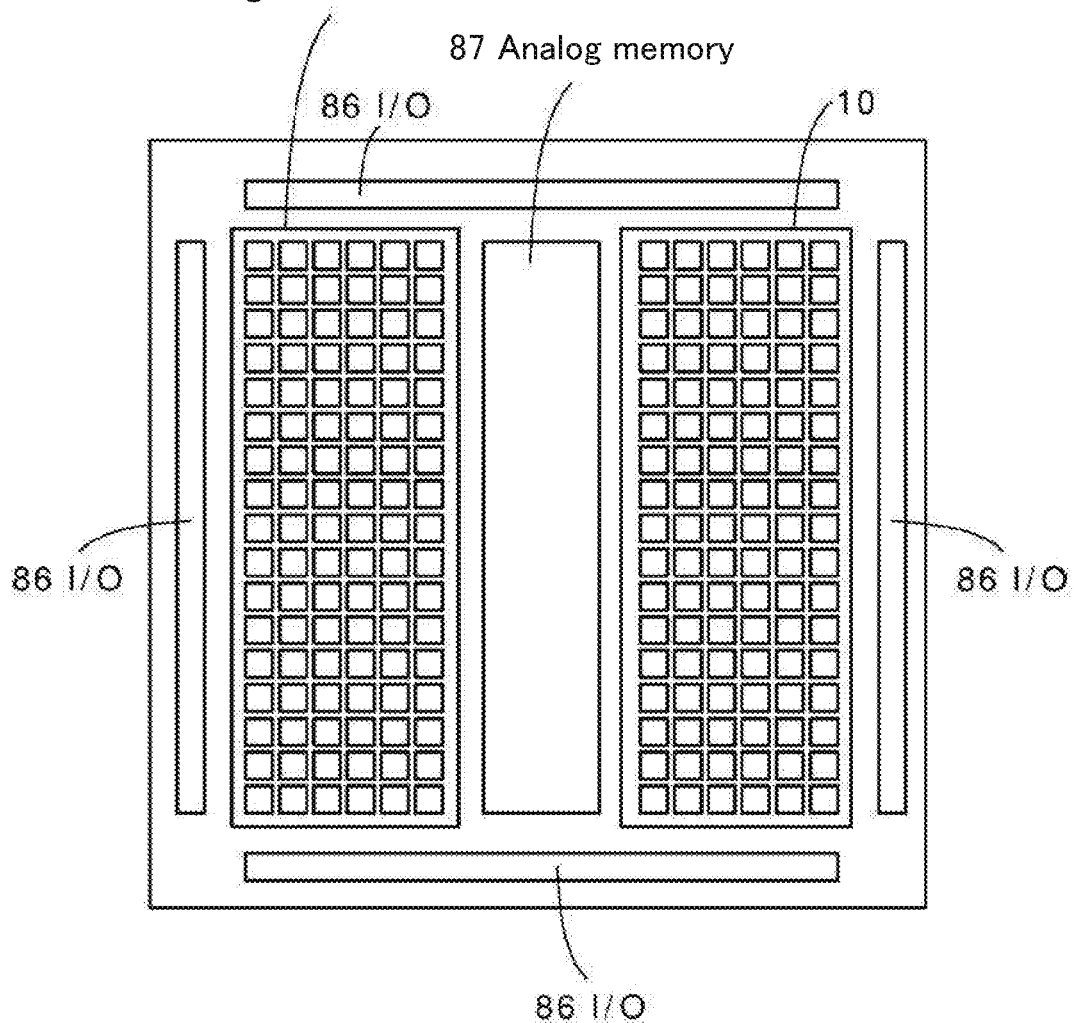

[FIG. 13]
(A)
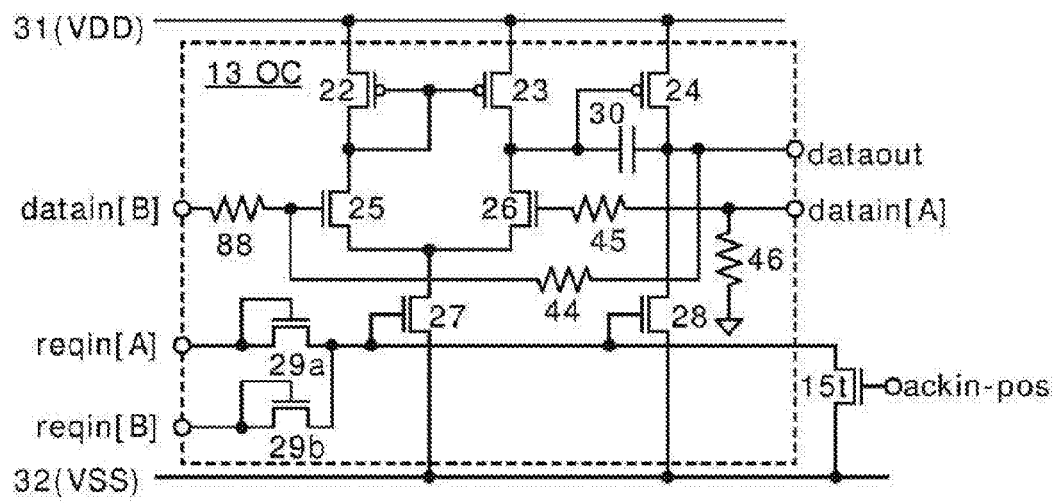
(B)
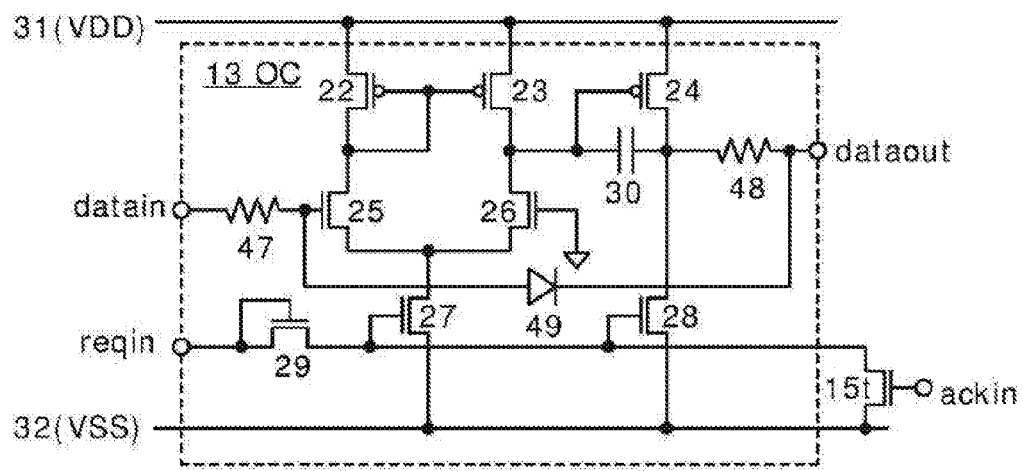

[FIG. 14]
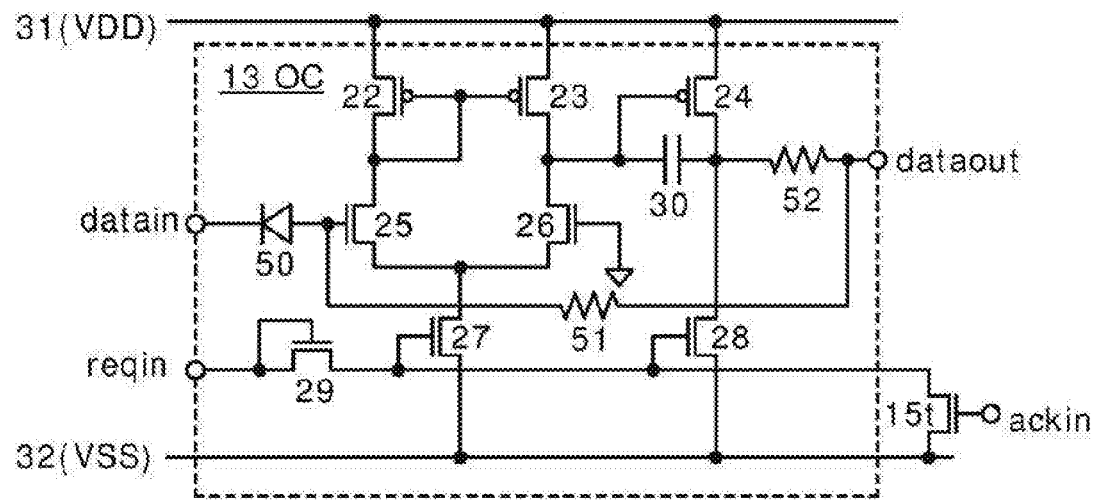

[FIG. 15]
(A)
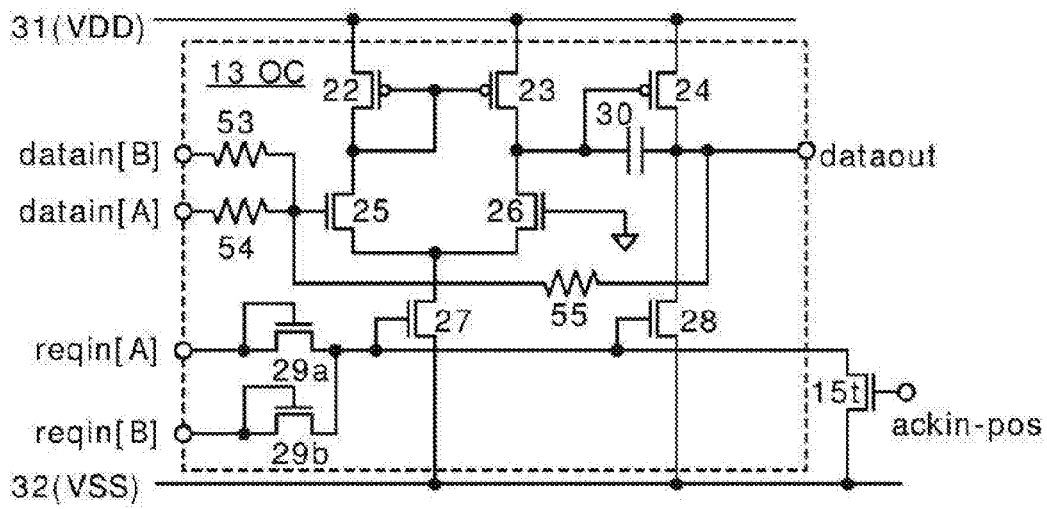
(B)
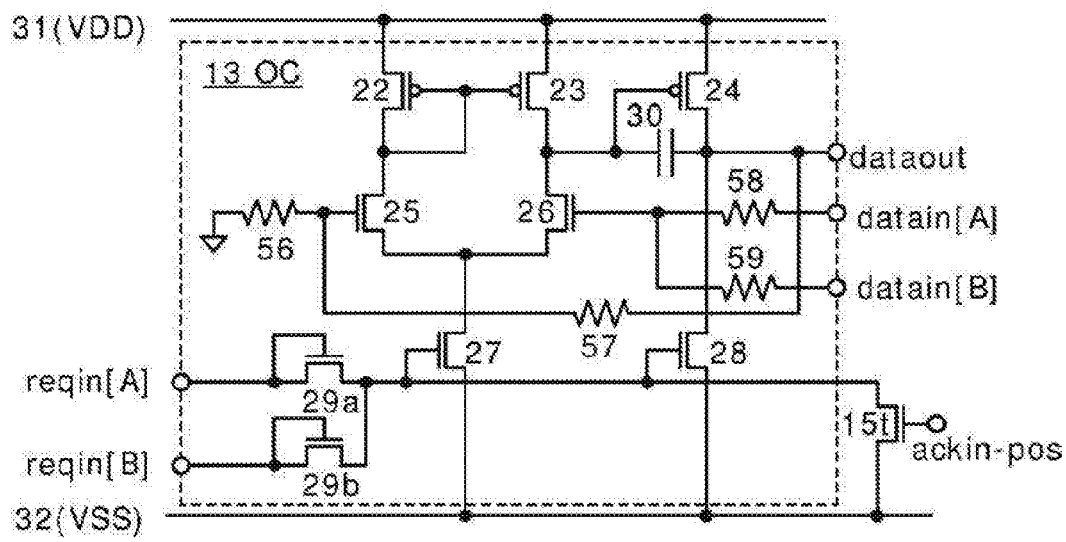

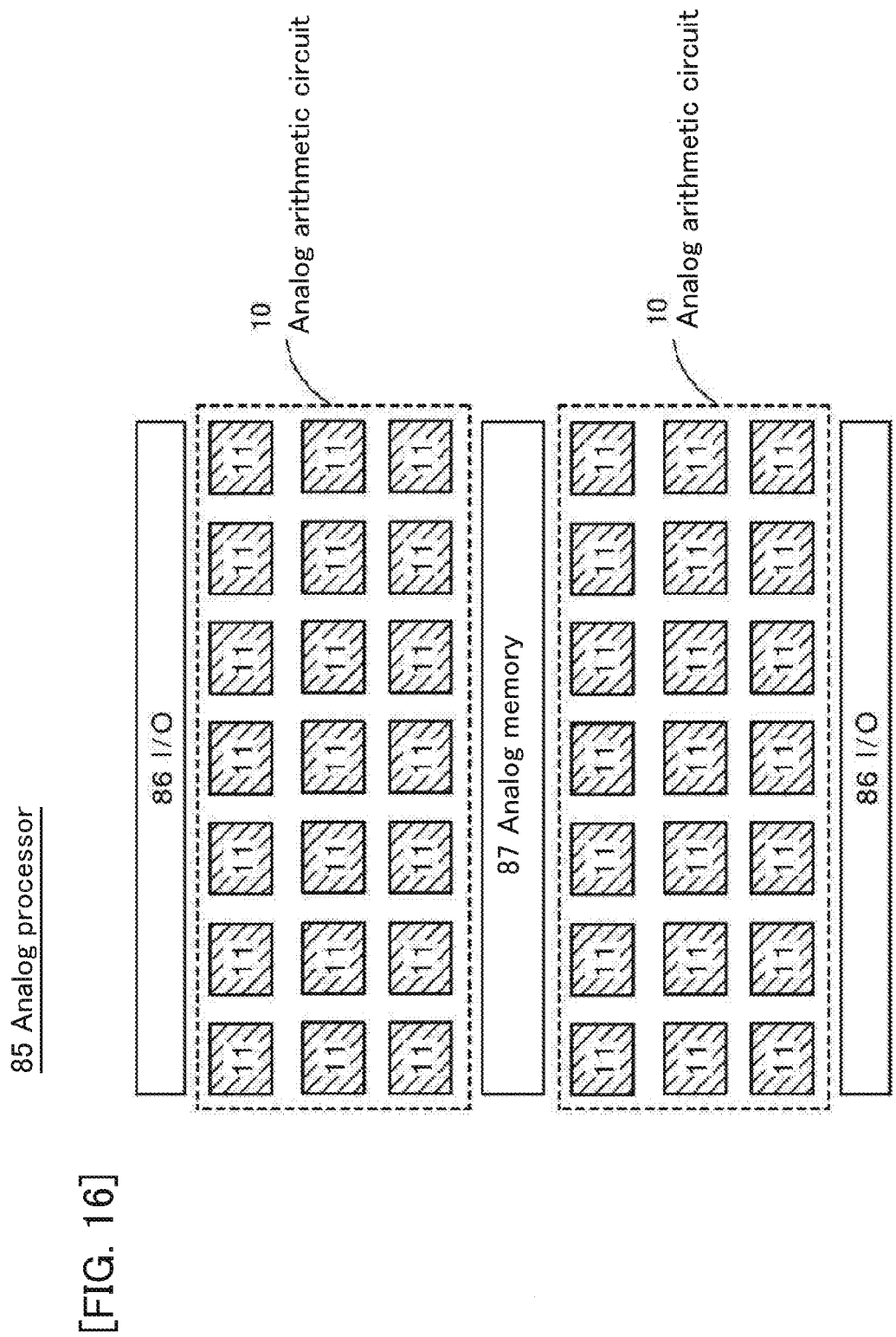
[FIG. 16]

[FIG. 17]
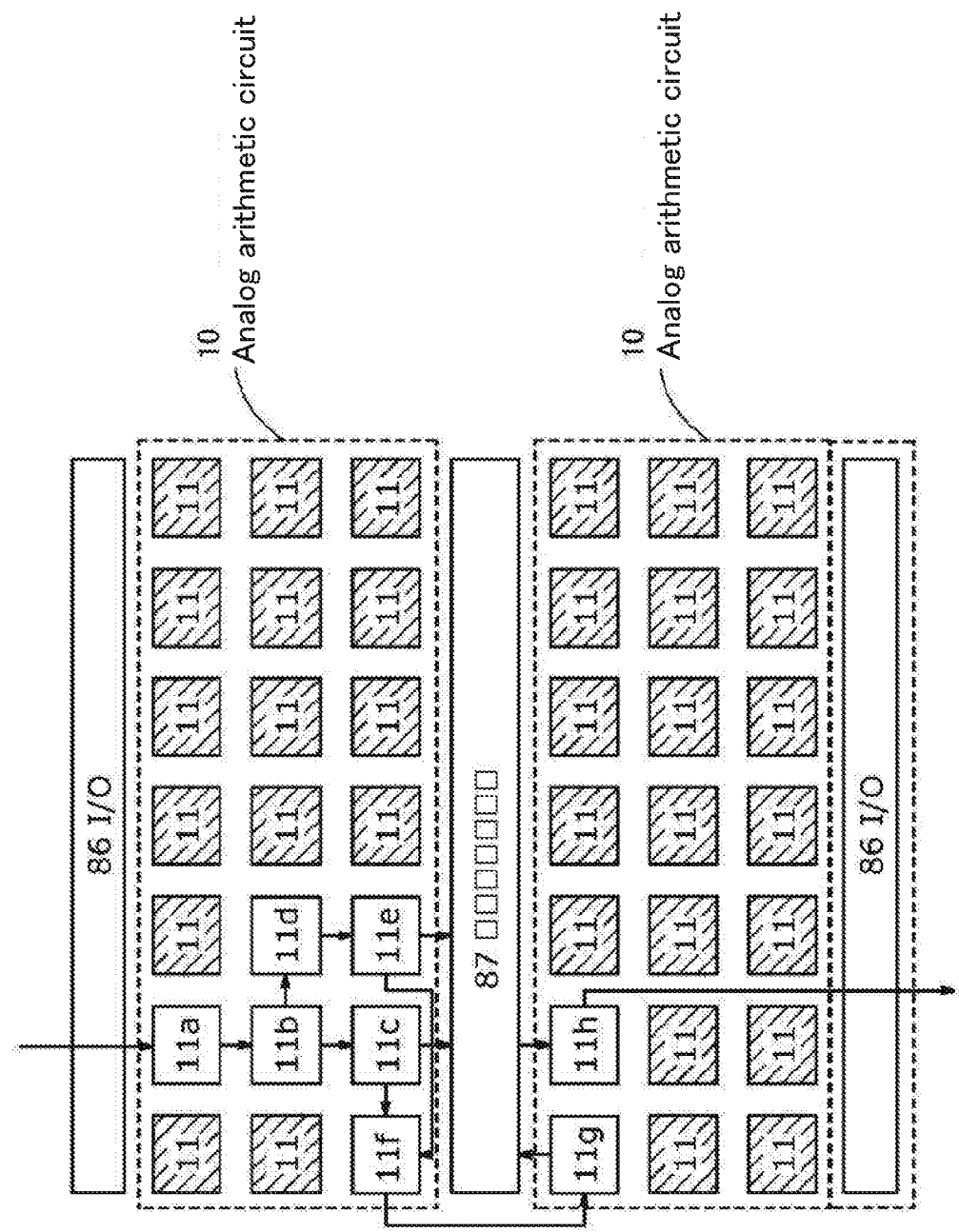

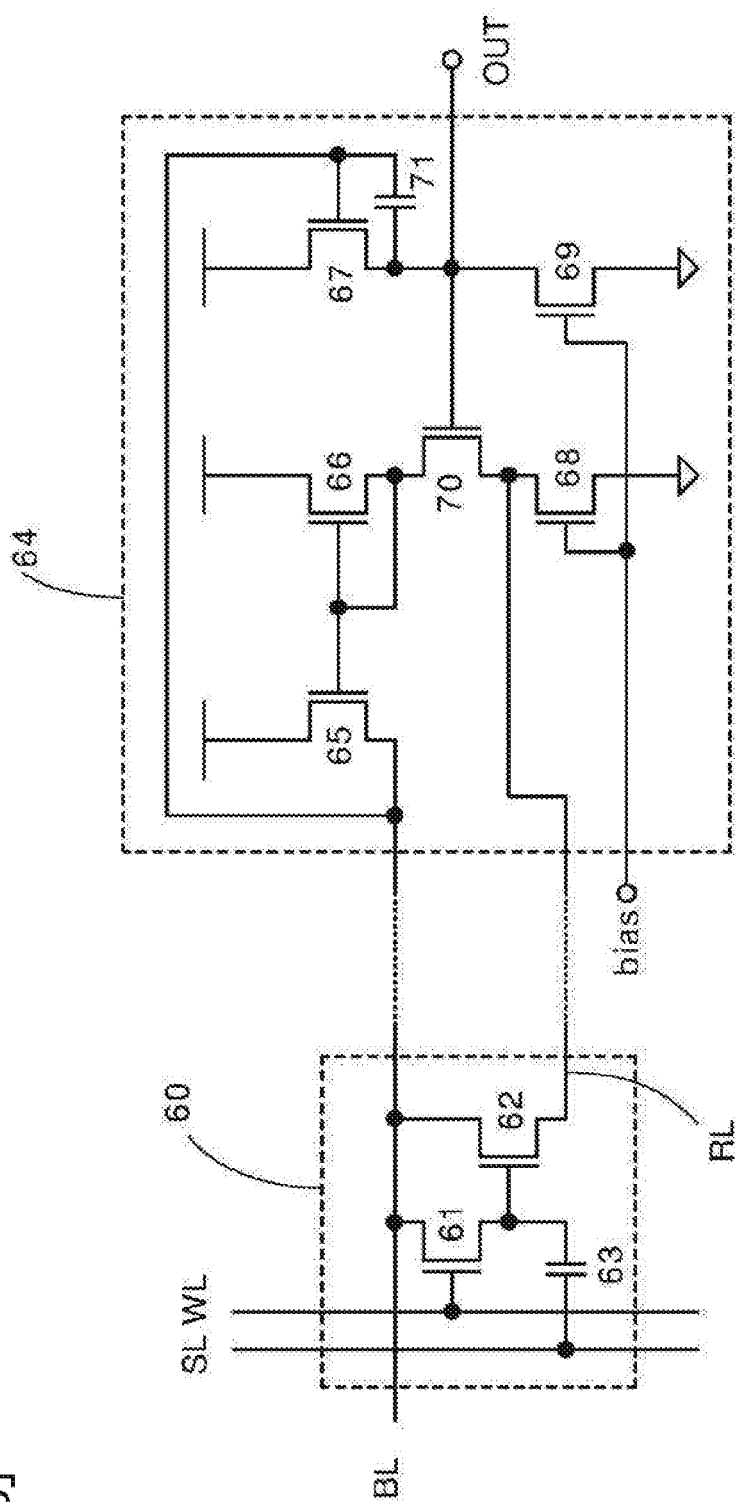
[FIG. 18]

[FIG. 19]
(A)
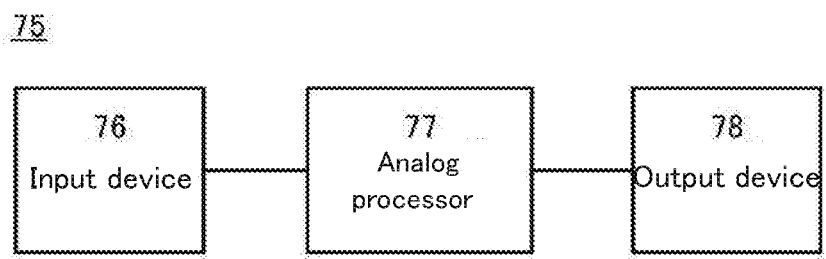
(B)
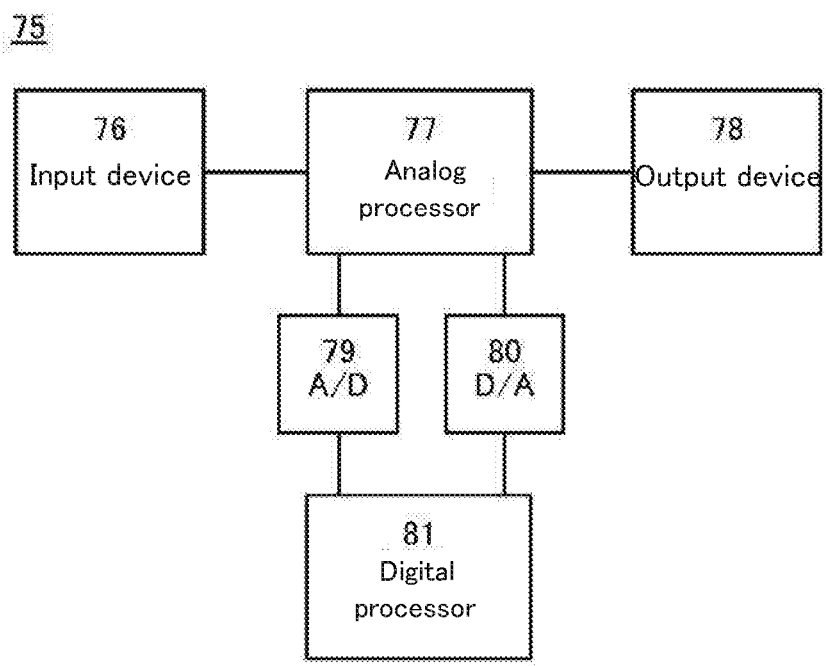

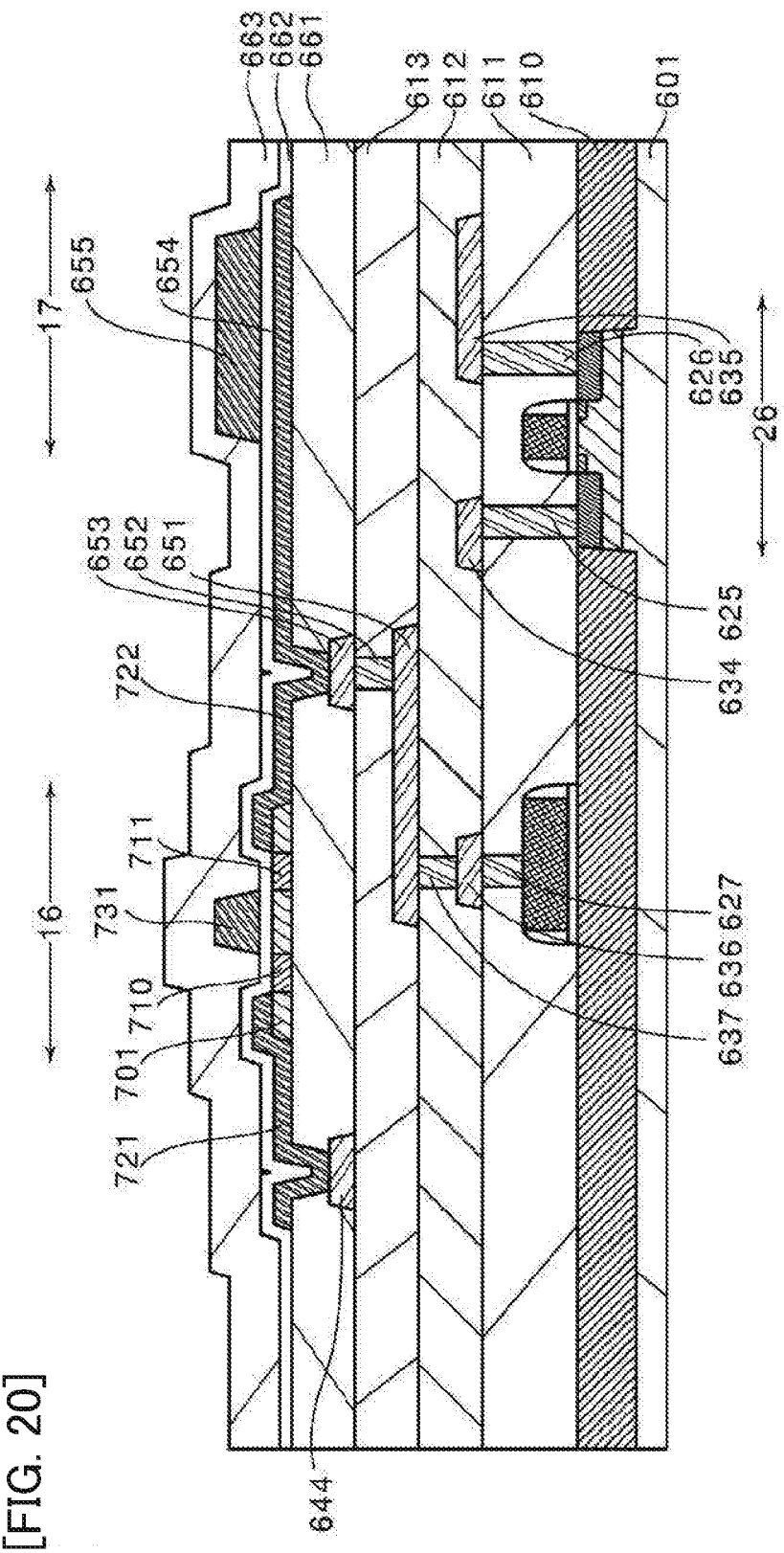

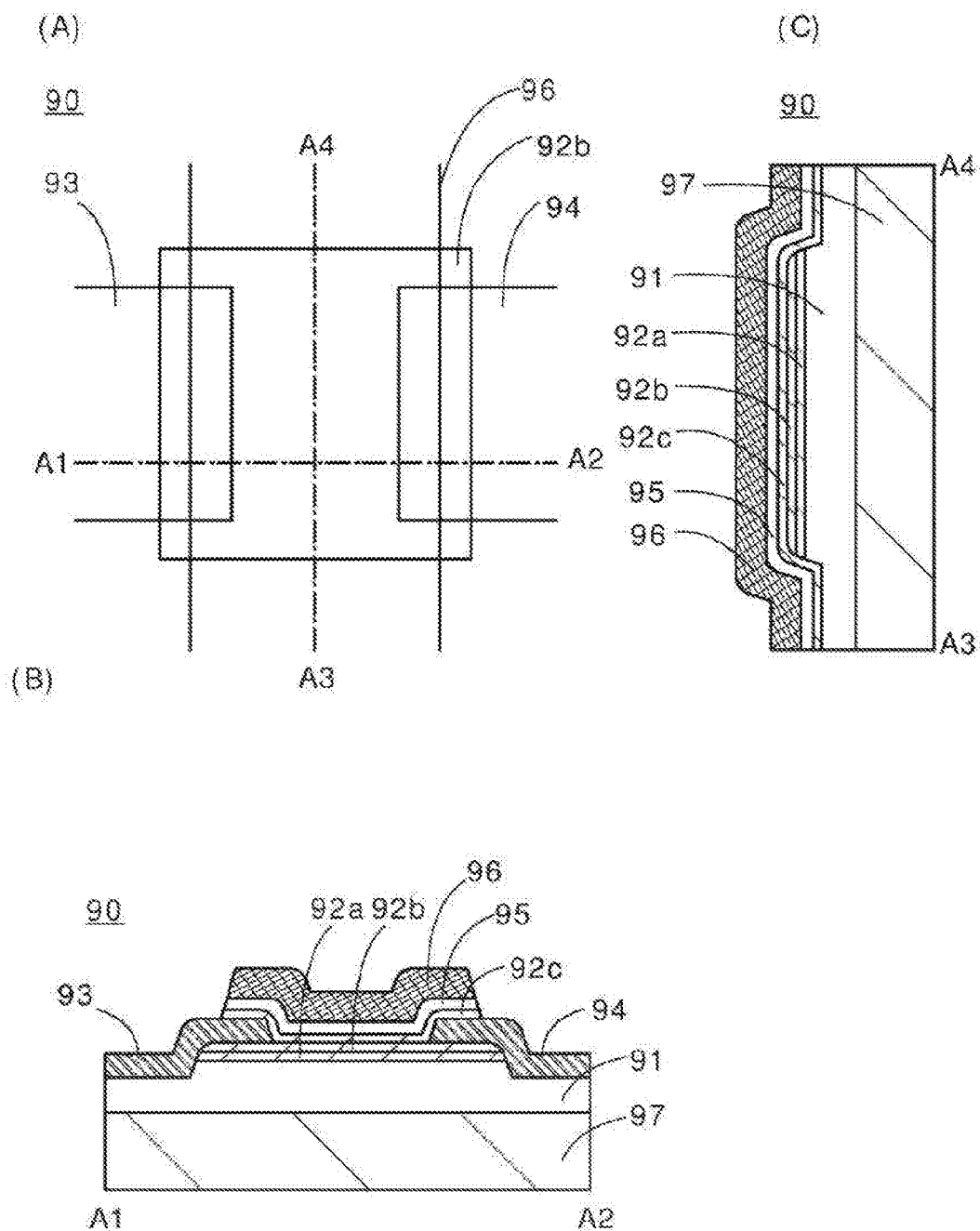
[FIG. 21]

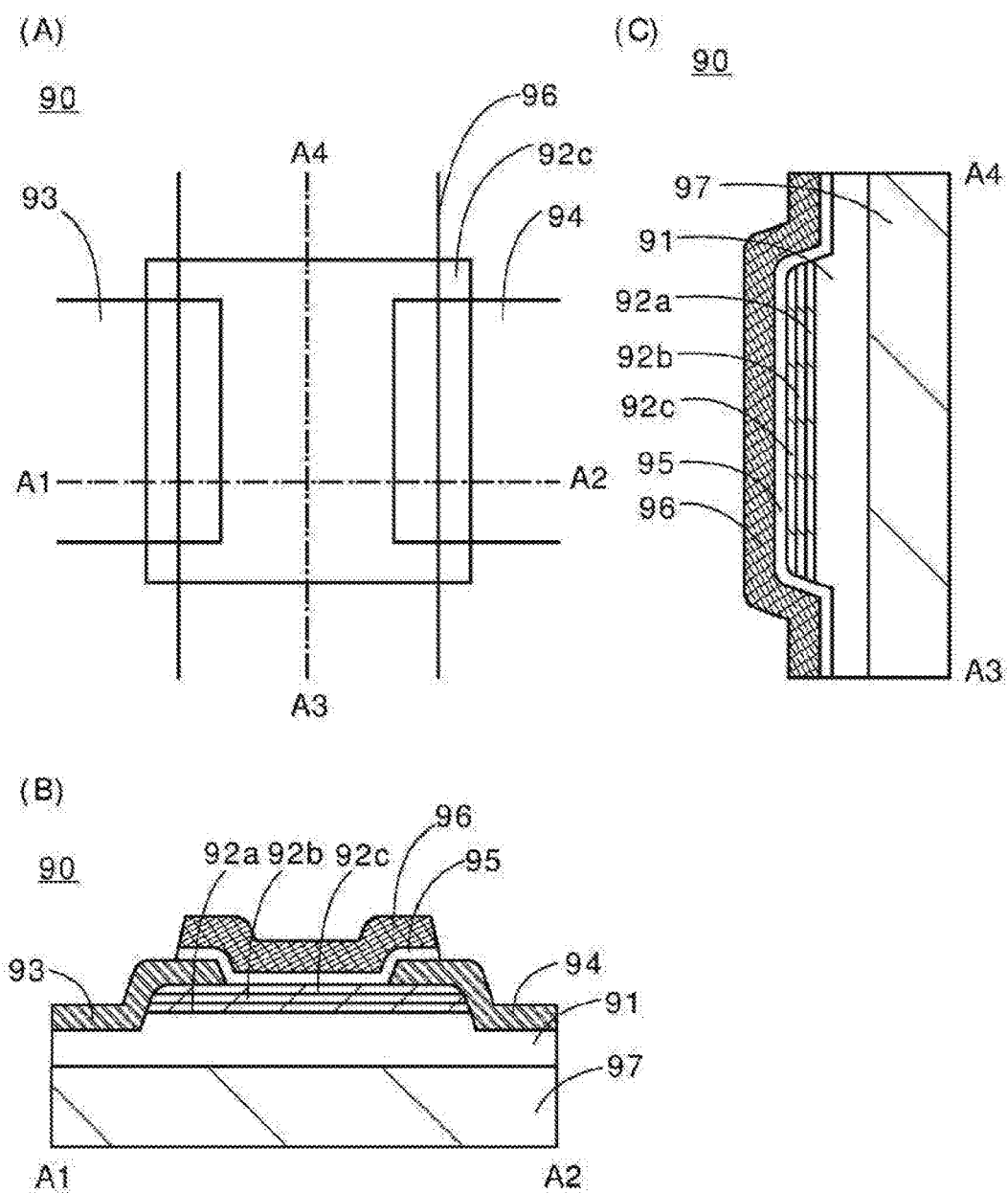
[FIG. 22]

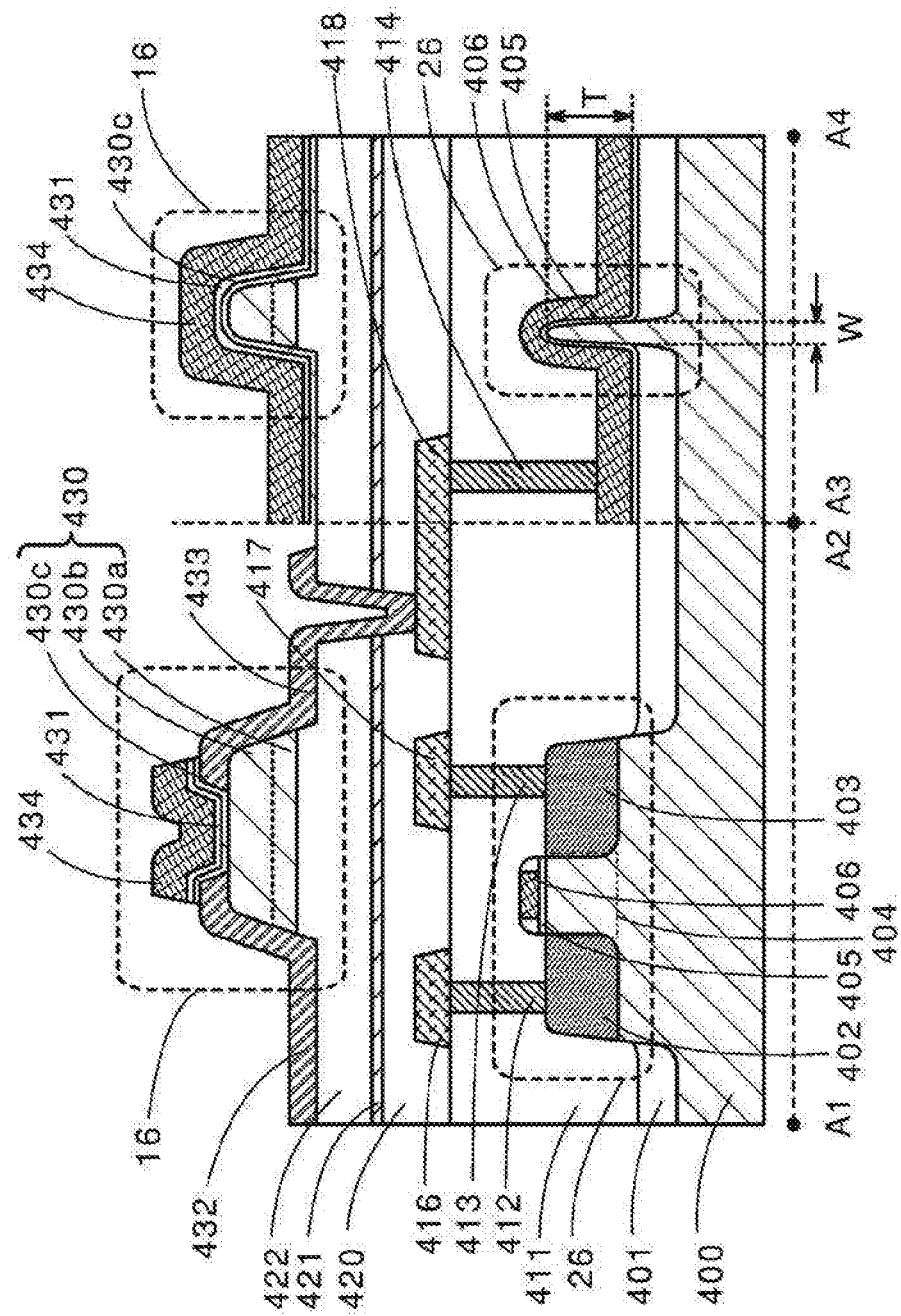
[FIG. 23]

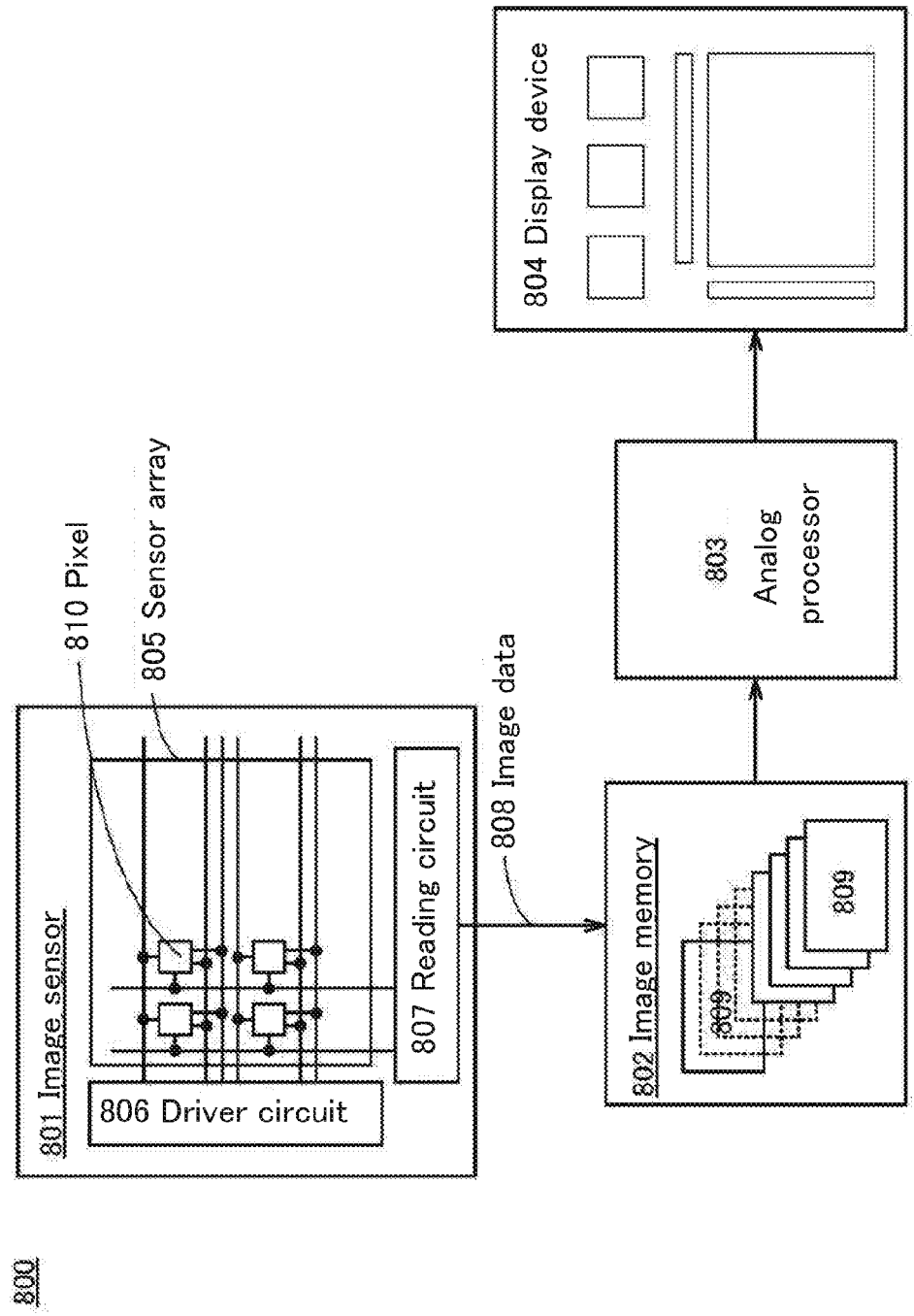
[FIG. 24]

[FIG. 25]
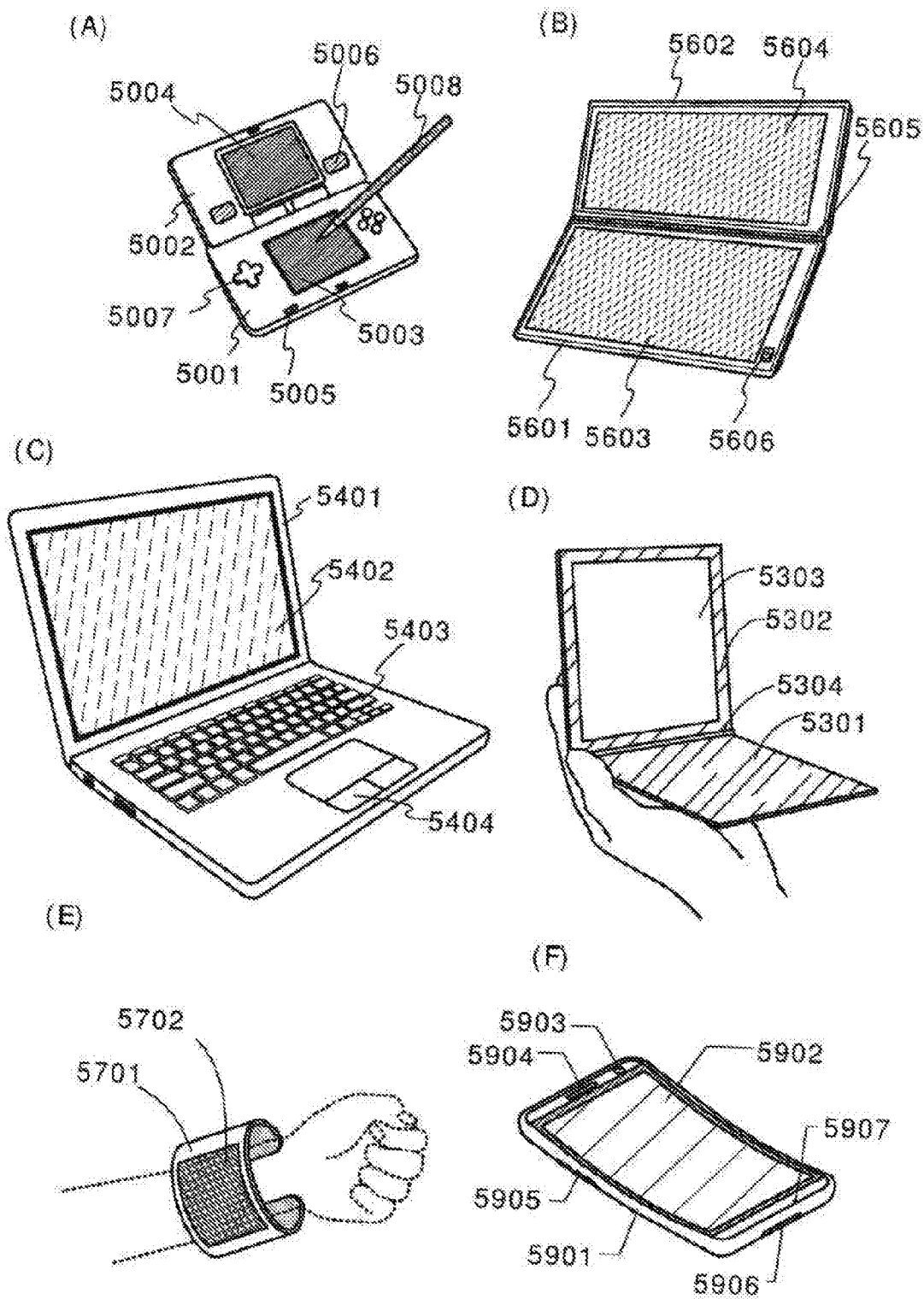

ANALOG ARITHMETIC CIRCUIT, SEMICONDUCTOR DEVICE, AND ELECTRONIC DEVICE

TECHNICAL FIELD

One embodiment of the present invention relates to an analog arithmetic circuit which performs arithmetic processing using an analog signal. For example, one embodiment of the present invention relates to a dynamically reconfigurable analog arithmetic circuit. Furthermore, one embodiment of the present invention relates to a semiconductor device using the above analog arithmetic circuit.

Note that one embodiment of the present invention is not limited to the above technical field. The technical field of one embodiment of the invention disclosed in this specification and the like relates to an object, a method, or a manufacturing method. Another embodiment of the present invention relates to a process, a machine, manufacture, or a composition (composition of matter). Thus, as specific examples of the technical field of one embodiment of the present invention disclosed in this specification, a semiconductor device, a display device, a liquid crystal display device, a light-emitting device, a lighting device, a power storage device, a memory device, a driving method thereof, and a manufacturing method thereof can be given.

BACKGROUND ART

An analog arithmetic circuit in which analog data input from an input device is used for arithmetic processing can output an analog value as data obtained by the arithmetic processing. Therefore, data does not have to be converted into digital data, and thus, a DA converter circuit or the like, which is necessary for data conversion from an analog value into a digital value, is unnecessary. Moreover, an analog arithmetic circuit is considered to have an advantage of low power consumption because its capability of large-scale real-time data processing enables a reduction in power for data transfer.

The following Patent Document 1 discloses a liquid crystal display device in which, as compared with arithmetic operation with digital data, low-power and short-time arithmetic operation is achieved by an analog arithmetic circuit utilizing voltage-current characteristics of MOS transistors. In addition, the following Patent Document 2 discloses an analog-digital mixed arithmetic circuit including a plurality of analog arithmetic circuits, a capacitor which accumulates the sum of arithmetic operation results as the amount of charge, a comparator which converts the amount of charge into a corresponding pulse signal, a pulse width-digital conversion circuit which converts the pulse signal into a digital signal, and a digital arithmetic circuit which calculates the cumulative value in accordance with the digital signal.

PRIOR ART DOCUMENTS

Patent Documents

[Patent Document 1] Japanese Published Patent Application No. 2000-284762
[Patent Document 2] Japanese Published Patent Application No. 2005-122467

SUMMARY OF THE INVENTION

Problem to be Solved by the Invention

Although an analog arithmetic circuit has an advantage of low power consumption over a digital arithmetic circuit, a semiconductor device with lower power consumption requires a further reduction in power consumption of the analog arithmetic circuit.

In view of the above-described technical background, an object of one embodiment of the present invention is to reduce the power consumption of an analog arithmetic circuit. Another object of one embodiment of the present invention is to reduce the power consumption of a semiconductor device using the analog arithmetic circuit.

Note that an object of one embodiment of the present invention is to provide a novel semiconductor device or the like. Note that the description of these objects does not disturb the existence of other objects. Note that one embodiment of the present invention does not need to achieve all of these objects. Note that other objects will be apparent from the description of the specification, the drawings, the claims, and the like; other objects can be derived from the description of the specification, the drawings, the claims, and the like.

Means for Solving the Problem

An analog arithmetic circuit of one embodiment of the present invention includes a plurality of first circuits. An output terminal of the k-th (k is a natural number) first circuit is connected to an input terminal of the k+1-th first circuit. Each of the first circuits includes a memory circuit which holds an analog signal, a second circuit which performs arithmetic processing using the analog signal, a switch which controls power supply to the second circuit, and a controller. A conduction state of the switch included in the k-th first circuit is controlled by the controller included in the k+1-th first circuit. The arithmetic processing performed by the second circuit included in the k+1-th first circuit is started by the controller included in the k+1-th first circuit.

Furthermore, in the analog arithmetic circuit of one embodiment of the present invention, the switch may include a transistor and the transistor may include a channel formation region in an oxide semiconductor film.

Furthermore, in the analog arithmetic circuit of one embodiment of the present invention, the oxide semiconductor film may contain In, Ga, and Zn.

Effect of the Invention

According to one embodiment of the present invention, a reduction in power consumption of an analog arithmetic circuit can be achieved. According to another embodiment of the present invention, a reduction in power consumption of a semiconductor device using the analog arithmetic circuit can be achieved.

Note that one embodiment of the present invention can provide a novel semiconductor device or the like. Note that the description of these effects does not disturb the existence of other effects. Note that one embodiment of the present invention does not need to have all of these effects. Note that other effects will be apparent from the description of the specification, the drawings, the claims, and the like; other effects can be derived from the description of the specification, the drawings, the claims, and the like.

BRIEF DESCRIPTION OF THE DRAWINGS

FIG. 1 A diagram illustrating a configuration example of an analog arithmetic circuit.

FIG. 2 A diagram illustrating a configuration example of a circuit 11.

FIG. 3 A diagram illustrating a configuration example of a memory circuit.

FIG. 4 Diagrams illustrating configuration examples of a controller and a delay circuit.

FIG. 5 A diagram illustrating a configuration example of an arithmetic circuit and a switch.

FIG. 6 A timing chart illustrating the operation of an analog arithmetic circuit.

FIG. 7 A diagram illustrating a configuration example of the circuit 11.

FIG. 8 A diagram illustrating a configuration example of a controller.

FIG. 9 A diagram illustrating a configuration example of an arithmetic circuit and a switch.

FIG. 10 A timing chart illustrating the operation of an analog arithmetic circuit.

FIG. 11 A diagram illustrating a configuration example of an arithmetic circuit and a switch.

FIG. 12 A diagram illustrating a configuration example of an analog processor.

FIG. 13 Diagrams each illustrating a configuration example of an arithmetic circuit and a switch.

FIG. 14 A diagram illustrating a configuration example of an arithmetic circuit and a switch.

FIG. 15 Diagrams each illustrating a configuration example of an arithmetic circuit and a switch.

FIG. 16 A diagram illustrating a configuration example of an analog processor.

FIG. 17 A diagram illustrating an example of the operation of an analog processor.

FIG. 18 A diagram illustrating a configuration example of an analog memory.

FIG. 19 Diagrams each illustrating a configuration example of a semiconductor device.

FIG. 20 A diagram illustrating a cross-sectional structure of a semiconductor device.

FIG. 21 Diagrams illustrating a structure of a transistor.

FIG. 22 Diagrams illustrating a structure of a transistor.

FIG. 23 A diagram illustrating a cross-sectional structure of a semiconductor device.

FIG. 24 A configuration example of a semiconductor device.

FIG. 25 Diagrams of electronic devices.

MODES FOR CARRYING OUT THE INVENTION

Embodiments of the present invention will be described below in detail with reference to the drawings. Note that the present invention is not limited to the following description, and it is easily understood by those skilled in the art that the modes and details can be variously changed without departing from the spirit and scope of the present invention. Therefore, the present invention should not be construed as being limited to the described content of the embodiments below.

Furthermore, a source of a transistor means a source region that is part of a semiconductor film functioning as an active layer or a source electrode connected to the semiconductor film. Similarly, a drain of a transistor means a drain region that is part of the semiconductor film or a drain electrode connected to the semiconductor film. In addition, a gate means a gate electrode.

The terms "source" and "drain" of a transistor interchange with each other depending on the conductivity type of the transistor or levels of potentials supplied to the terminals. In general, in an n-channel transistor, a terminal to which a low potential is supplied is called a source, and a terminal to which a high potential is supplied is called a drain. In contrast, in a p-channel transistor, a terminal to which a low potential is supplied is called a drain, and a terminal to which a high potential is supplied is called a source. In this specification, the connection relation of a transistor is sometimes described assuming that the source and the drain are fixed for convenience; actually, the names of the source and the drain interchange with each other depending on the relation of the potentials.

Configuration Example of Analog Arithmetic Circuit

FIG. 1 is a block diagram illustrating a configuration example of an analog arithmetic circuit 10 of one embodiment of the present invention. Note that the block diagram shows components classified into independent blocks according to their functions; however, it may be practically difficult to completely separate the components according to their functions and, in some cases, one component may involve a plurality of functions.

The analog arithmetic circuit 10 includes a plurality of circuits 11. FIG. 1 illustrates an example in which the analog arithmetic circuit 10 includes m circuits 11, namely, a circuit 11-1 to a circuit 11-$m$ (m is a natural number of 3 or more). Furthermore, an output terminal Dout of one of the circuits 11 is electrically connected to an input terminal Din of the circuit 11 in the subsequent stage. In addition, an output terminal Rout of one of the circuits 11 is electrically connected to an input terminal Rin of the circuit 11 in the subsequent stage. In addition, an output terminal Aout of one of the circuits 11 is electrically connected to an input terminal Ain of the circuit 11 in the previous stage.

Specifically, an output terminal Dout of the k+1-th (k is a natural number of m−2 or less) circuit 11-$k$+1 is electrically connected to an input terminal Din of the k+2-th circuit 11-$k$+2. In addition, an output terminal Rout of the k+1-th circuit 11-$k$+1 is electrically connected to an input terminal Rin of the k+2-th circuit 11-$k$+2. In addition, an output terminal Aout of the k+1-th circuit 11-$k$+1 is electrically connected to an input terminal Ain of the k-th circuit 11-$k$.

In addition, each of the circuits 11 includes a memory circuit 12 (MEM), an arithmetic circuit 13 (OC), a controller 14 (CTRL), and a switch 15. FIG. 2 illustrates a specific configuration example of the circuit 11.

In the circuit 11 illustrated in FIG. 2, the memory circuit 12 has a function of holding an analog signal datain input from the input terminal Din. The arithmetic circuit 13 has a function of generating an analog signal dataout by arithmetic processing using the signal datain held in the memory circuit 12. The timing at which the arithmetic processing is started is determined by a signal reqin input from the input terminal Rin. The signal dataout is output from the output terminal Dout and input to the input terminal Din of the circuit 11 in the subsequent stage as the signal datain.

The controller 14 has a function of generating, in accordance with the signal reqin input from the input terminal Rin, a signal reqout for determining the timing at which the arithmetic processing in the arithmetic circuit 13 included in the circuit 11 in the stage subsequent to that of the circuit 11 is started. The signal reqout is output from the output terminal Rout and input to the input terminal Rin of the circuit 11 in the subsequent stage as the signal reqin. The controller 14 further has a function of generating, in accordance with the signal reqin input from the input terminal Rin, a signal ackout for controlling the conduction state of the switch 15 included in the circuit 11 in the stage prior to that of the circuit 11. The signal ackout is output from the output terminal Aout and input to the input terminal Ain of the circuit 11 in the previous stage as a signal ackin.

The switch 15 has a function of controlling the supply of power (Power) to the arithmetic circuit 13 in accordance with the signal ackin input from the input terminal Ain.

In the above configuration of the analog arithmetic circuit 10 illustrated in FIG. 1, the arithmetic processing in the arithmetic circuit 13 of the circuit 11-$k$+1 is started by the signal reqin input from the circuit 11-$k$ to the circuit 11-$k$+1. Then, the input of the signal reqin from the circuit 11-$k$ to the circuit 11-$k$+1 is followed by input of the signal reqin from the circuit 11-$k$+1 to the circuit 11-$k$+2; thus, the arithmetic processing is also started in the arithmetic circuit 13 of the circuit 11-$k$+2. That is, in the analog arithmetic circuit 10 illustrated in FIG. 1, the arithmetic processing in the arithmetic circuit 13 is sequentially performed from the circuit 11-1 to the circuit 11-$m$.

Furthermore, in the analog arithmetic circuit 10 illustrated in FIG. 1, the input of the signal reqin to the circuit 11-$k$+1 triggers the start of the arithmetic processing in the arithmetic circuit 13 and the input of the signal ackout from the circuit 11-$k$+1 to the circuit 11-$k$. In the circuit 11-$k$, the conduction state of the switch 15 is controlled by the signal ackout input as the signal ackin, so that the power supply to the arithmetic circuit 13 is stopped. That is, in the analog arithmetic circuit 10 illustrated in FIG. 1, the power supply to the arithmetic circuits 13 can be stopped in the circuits 11 in the order of completion of the arithmetic processing in the arithmetic circuit 13.

The above configuration of one embodiment of the present invention enables power to be supplied to the circuit 11 in which arithmetic processing is performed while the power supply to the other circuits 11 is stopped; therefore, the power consumption of the analog arithmetic circuit 10 can be reduced.

Configuration Example of Memory Circuit

Next, a configuration example of the memory circuit 12 will be described. FIG. 3 illustrates a configuration example of the memory circuit 12.

The memory circuit 12 illustrated in FIG. 3 includes a transistor 16 functioning as a switch and a capacitor 17. The conduction state of the transistor 16 is controlled by the potential of a signal lat supplied to a gate (G) of the transistor 16. Specifically, one of a source and a drain of the transistor 16 corresponds to an input terminal IN, and the other of the source and the drain corresponds to an output terminal OUT. Furthermore, one of a pair of electrodes of the capacitor 17 is electrically connected to the other of the source and the drain of the transistor 16, and the other electrode is electrically connected to a wiring supplied with a predetermined potential.

In the memory circuit 12, when the transistor 16 is turned on in accordance with the potential of the signal lat, the signal datain input from the input terminal IN is supplied to the capacitor 17 through the transistor 16. Consequently, charge corresponding to the potential of the signal datain is accumulated in the capacitor 17; thus, the signal datain is written to the memory circuit 12. Note that the charge accumulated in the capacitor 17 is determined by the potential of the signal datain; therefore, the memory circuit 12 can store the analog signal datain. Subsequently, the transistor 16 is turned off in accordance with the potential of the signal lat, so that the input terminal IN and the capacitor 17 are electrically disconnected from each other. Accordingly, the charge accumulated in the capacitor 17 is held; thus, the signal datain is held in the memory circuit 12. Then, the signal datain held in the memory circuit 12 is output from the output terminal OUT.

Note that the off-state current of the transistor 16 is desirably very low in order to prevent the charge accumulated in the capacitor 17 from leaking through the transistor 16. A transistor characterized by a channel formation region formed in a film of a semiconductor with a wider bandgap than silicon and a lower intrinsic carrier density than silicon can have a very low off-state current and thus is preferably used as the transistor 16. Examples of such a semiconductor are an oxide semiconductor and gallium nitride, whose band gaps are twice or more as large as that of silicon. A transistor including the above semiconductor can have a much lower off-state current than a transistor formed using a normal semiconductor such as silicon or germanium.

Configuration Example of Controller

Next, a configuration example of the controller 14 will be described. FIG. 4(A) illustrates a configuration example of the controller 14.

The controller 14 illustrated in FIG. 4(A) includes a delay circuit 18$a$ to a delay circuit 18$c$. The delay circuit 18$a$ to the delay circuit 18$c$ each have a function of adjusting the delay time of an input signal. Specifically, the signal reqin which is input from the input terminal Rin of the circuit 11 illustrated in FIG. 2 is input to an input terminal of the delay circuit 18$a$. The potential of an output terminal of the delay circuit 18$a$ is supplied to the memory circuit 12 as the signal lat. In addition, the output terminal of the delay circuit 18$a$ is electrically connected to an input terminal of the delay circuit 18$b$ and an input terminal of the delay circuit 18$c$. The potential of an output terminal of the delay circuit 18$b$ is output as the signal reqout from the output terminal Rout of the circuit 11 illustrated in FIG. 2. The potential of an output terminal of the delay circuit 18$c$ is output as the signal ackout from the output terminal Aout of the circuit 11 illustrated in FIG. 2.

FIG. 4(B) illustrates a specific circuit configuration example of a delay circuit 18 which can be used as each of the delay circuits 18$a$ to 18$c$. The delay circuit 18 illustrated in FIG. 4(B) includes a resistor 19 and a capacitor 20. One of a pair of terminals of the resistor 19 corresponds to an input terminal IN, and the other corresponds to an output terminal OUT. One of a pair of electrodes of the capacitor 20 is electrically connected to the other of the pair of terminals of the resistor 19, and the other electrode is electrically connected to a wiring supplied with a predetermined potential.

In the delay circuit 18 illustrated in FIG. 4(B), the signal delay time can be adjusted by adjusting the resistance value of the resistor 19 and the capacitance value of the capacitor 20.

FIG. 4(C) illustrates another specific circuit configuration example of the delay circuit 18. The delay circuit 18 illustrated in FIG. 4(C) includes 2n inverters 21 (n is a natural number), namely, an inverter 21-1 to an inverter 21-2$n$. Furthermore, an input terminal of the inverter 21-1 corresponds to the input terminal IN of the delay circuit 18, and an output terminal of the inverter 21-2n corresponds to the output terminal OUT of the delay circuit 18. In addition, the inverter 21-2 to the inverter 21-(2n−1) are electrically connected in sequence such that their input terminals are each electrically connected to the output terminal of the inverter 21 in the previous stage and their output terminals are each electrically connected to the input terminal of the inverter 21 in the subsequent stage.

In the delay circuit 18 illustrated in FIG. 4(C), the signal delay time can be adjusted by adjusting the number of the inverters 21. Alternatively, in the delay circuit 18 illustrated in FIG. 4(C), the signal delay time can be adjusted by adjusting the channel length of a transistor used for the inverter 21.

Configuration Example 1 of Arithmetic Circuit and Switch

Next, a configuration example of the arithmetic circuit 13 and the switch 15 will be described. FIG. 5 illustrates a configuration example of the arithmetic circuit 13 and the switch 15.

The arithmetic circuit 13 illustrated in FIG. 5 includes p-channel transistors 22 to 24, n-channel transistors 25 to 29, and a capacitor 30. In addition, in FIG. 5, a transistor 15t functioning as the switch 15 is electrically connected to the arithmetic circuit 13.

The transistor 22 and the transistor 23 function as a current mirror circuit. The transistor 25 to the transistor 27 function as a differential circuit. The transistor 24 and the transistor 28 function as an amplifier circuit. The capacitor 30 has a function of performing phase compensation. Furthermore, the transistor 22 to the transistor 28 and the capacitor 30 can play a role of an operational amplifier. Each of the transistors 27 and 28 also functions as a current source. The transistor 29 has a function of controlling the supply of the signal reqin to the current sources.

Specifically, one of a source and a drain of each of the transistors 22 to 24 is electrically connected to a wiring 31 supplied with a high-level potential VDD. A gate of the transistor 22 is electrically connected to a gate of the transistor 23. The other of the source and the drain of the transistor 22 is electrically connected to the gate of the transistor 22. The other of the source and the drain of the transistor 23 is electrically connected to a gate of the transistor 24 and one electrode of the capacitor 30. The other of the source and the drain of the transistor 24 is electrically connected to the other electrode of the capacitor 30, and the potential of the other of the source and the drain of the transistor 24 is output from the arithmetic circuit 13 as the signal dataout.

In addition, one of a source and a drain of each of the transistors 27 and 28 and one of a source and a drain of the transistor 15t are electrically connected to a wiring 32 supplied with a low-level potential VSS. A gate and one of a source and a drain of the transistor 29 are electrically connected to each other, and the signal reqin is supplied to the gate. The other of the source and the drain of the transistor 29 and the other of the source and the drain of the transistor 15t are electrically connected to gates of the transistor 27 and the transistor 28. A gate of the transistor 15t is supplied with the signal ackin.

The other of the source and the drain of the transistor 27 is electrically connected to one of a source and a drain of each of the transistors 25 and 26. The other of the source and the drain of the transistor 25 is electrically connected to the other of the source and the drain of the transistor 22. The other of the source and the drain of the transistor 26 is electrically connected to the other of the source and the drain of the transistor 23. A gate of the transistor 25 and the other of the source and the drain of the transistor 28 are electrically connected to the other of the source and the drain of the transistor 24. A gate of the transistor 26 is supplied with the signal datain.

In the arithmetic circuit 13 illustrated in FIG. 5, the gate of the transistor 26 corresponds to a non-inverting input terminal (+) of the operational amplifier. In addition, the gate of the transistor 25 corresponds to an inverting input terminal (−) of the operational amplifier. Furthermore, the arithmetic circuit 13 illustrated in FIG. 5 has the following configuration: the gate of the transistor 25, which is the inverting input terminal (−) of the operational amplifier, is electrically connected to the other of the source and the drain of the transistor 24 and the other of the source and the drain of the transistor 28 which correspond to an output terminal of the operational amplifier. Thus, the arithmetic circuit 13 illustrated in FIG. 5 functions as a unity gain buffer.

Furthermore, as for the arithmetic circuit 13 illustrated in FIG. 5, the power supply to the arithmetic circuit 13 is controlled in accordance with the conduction state of the transistor 15t. Specifically, when the transistor 15t is off, the gate voltage of each of the transistors 27 and 28 is determined by the potential difference between the potential of the signal reqin and the potential VSS, and power corresponding to the gate voltage is supplied to the arithmetic circuit 13. In contrast, when the transistor 15t is turned on, each of the transistors 27 and 28 is turned off because electrical continuity is established between the gate and one of the source and the drain. Consequently, the power supply to the arithmetic circuit 13 is stopped.

Example 1 of Operation of Analog Arithmetic Circuit

Next, a specific example of the operation of the analog arithmetic circuit 10 including the circuit 11 illustrated in FIG. 2 will be described using the timing chart illustrated in FIG. 6. Note that FIG. 6 exemplifies a timing chart in the case where the memory circuit 12 illustrated in FIG. 3, the controller 14 illustrated in FIG. 4(A), and the arithmetic circuit 13 and the transistor 15t illustrated in FIG. 5 are used for the analog arithmetic circuit 10.

Note that in the shaded period of the signal datain in the timing chart illustrated in FIG. 6, the signal datain has an analog value. Similarly, in the shaded period of the signal dataout in the timing chart illustrated in FIG. 6, the signal dataout has an analog value.

As illustrated in FIG. 6, the potential of the signal reqin is at the high level in a period Δt from time t1 to time t2, and the potential of the signal reqin is at the low level in the other periods. Furthermore, the controller 14 generates the signal lat, the signal reqout, and the signal ackout in accordance with the signal reqin.

Specifically, FIG. 6 exemplifies a timing chart in the case where the signal delay time in the delay circuit 18a, the signal delay time in the delay circuit 18b, and the signal delay time in the delay circuit 18c of the controller 14 illustrated in FIG. 4(A) are T1, T2, and T3, respectively. Accordingly, the potential of the signal lat generated by the controller 14 is at the high level in a period Δt from time t3, at which the delay time T1 has passed since the time t1, to time t4, and the potential is at the low level in the other periods.

Similarly, the potential of the signal reqout generated by the controller 14 is at the high level in a period Δt from time t5, at which the delay time T2 has passed since the time t3, to time t6, and the potential is at the low level in the other periods. Similarly, the potential of the signal ackout generated by the controller 14 is at the high level in the period Δt from the time t5, at which the delay time T3 has passed since the time t3, to the time t6, and the potential is at the low level in the other periods.

Note that in the timing chart exemplified by FIG. 6, the delay time T2 is equal to the delay time T3. It is also possible to set the lengths of the delay time T2 and the delay time T3 to different values.

Furthermore, in the period from the time t3 to the time t4, in which the potential of the signal lat is at the high level, the signal datain is written to the memory circuit 12. Then, the written signal datain is supplied to the arithmetic circuit 13.

In addition, although not illustrated in FIG. 6, the potential of the signal ackin is at the low level from the time t1 to the time t6. Therefore, the transistor 15t is off. Furthermore, when the potential of the signal reqin is set to the high level in the period Δt from the time t1 to the time t2, the transistor 29 in the arithmetic circuit 13 is turned on. Consequently, the signal reqin is supplied to the gates of the transistor 27 and the transistor 28 through the transistor 29; thus, power is supplied to the arithmetic circuit 13. The arithmetic circuit 13 generates the signal dataout by arithmetic processing using the signal datain.

Note that the potential of the signal reqout generated by the controller 14 is supplied to the circuit 11 in the subsequent stage as the signal reqin; therefore, when the potential of the signal reqout is set to the high level, the power supply to the arithmetic circuit 13 is also started in the circuit 11 in the subsequent stage and the arithmetic processing in the arithmetic circuit 13 is performed. In addition, the potential of the signal ackout generated by the controller 14 is supplied to the circuit 11 in the previous stage as the signal ackin; therefore, when the potential of the signal ackout is set to the high level, the power supply to the arithmetic circuit 13 is stopped in the circuit 11 in the previous stage.

Note that the length of the delay time T1 is desirably set such that the time from the time t1, at which the potential of the signal reqin is changed to the high level, is long enough for the arithmetic circuit 13 to become ready for the arithmetic processing. The length of the delay time T2 is desirably set such that the time required for the memory circuit 12 to hold the signal datain is secured. The length of the delay time T3 is desirably set such that the time required to complete the arithmetic processing using the signal datain in the arithmetic circuit 13 and to stabilize the potential of the signal dataout is secured.

The length of the period Δt is desirably set such that the time required to set, in the arithmetic circuit 13, the potentials of the gates of the transistor 27 and the transistor 28, which function as current sources, to the high level, the time required to write the signal datain to the memory circuit 12, and the time required to set the potentials of the gates of the transistor 27 and the transistor 28, which function as current sources, to the low level are all secured.

Configuration Example of Circuit 11

Next, a configuration example of the circuit 11 having a configuration different from that of the circuit 11 illustrated in FIG. 2 will be described.

The circuit 11 illustrated in FIG. 7 includes the arithmetic circuit 13 which performs arithmetic processing using analog signals datain[A] and datain[B]. Specifically, the circuit 11 illustrated in FIG. 7 includes a memory circuit 12a (MEM), a memory circuit 12b (MEM), the arithmetic circuit 13 (OC), the controller 14 (CTRL), the switch 15, a delay circuit 33, and a delay circuit 34.

The memory circuit 12a has a function of holding, in accordance with a signal lat[A], the signal datain[A] input from an input terminal Din[A]. The memory circuit 12b has a function of holding, in accordance with a signal lat[B], the signal datain[B] input from an input terminal Din[B]. The arithmetic circuit 13 has a function of generating the analog signal dataout by arithmetic processing using the signal datain[A] held in the memory circuit 12a and the signal datain[B] held in the memory circuit 12b. The timing at which the arithmetic processing is started is determined by a signal reqin[A] input from an input terminal Rin[A] and a signal reqin[B] input from an input terminal Rin[B]. The signal dataout is output from the output terminal Dout and input to the input terminal Din of the circuit 11 in the subsequent stage as the signal datain.

The configuration example of the memory circuit 12 illustrated in FIG. 3 can be applied to the specific configuration of each of the memory circuits 12a and 12b.

The controller 14 has a function of generating a signal reqout-pre in accordance with the signal reqin[A] input from the input terminal Rin[A] and the signal reqin[B] input from the input terminal Rin[B]. The delay circuit 33 has a function of generating, by delaying the signal reqout-pre, the signal reqout for determining the timing at which the arithmetic processing in the arithmetic circuit 13 included in the circuit 11 in the stage subsequent to that of the circuit 11 is started. The signal reqout is output from the output terminal Rout and input to the input terminal Rin of the circuit 11 in the subsequent stage as the signal reqin. The controller 14 further has a function of generating, in accordance with the signal reqin[A] input from the input terminal Rin[A] and the signal reqin[B] input from the input terminal Rin[B], a signal ackout[A] for controlling the conduction state of the switch 15 included in a circuit 11[A] in the stage prior to that of the circuit 11 and a signal ackout[B] for controlling the conduction state of the switch 15 included in a circuit 11 [B] in the stage prior to that of the circuit 11. The signal ackout[A] is output from an output terminal Aout[A] and input to the input terminal Ain of the circuit 11 [A] in the previous stage as the signal ackin. The signal ackout[B] is output from an output terminal Aout[B] and input to the input terminal Ain of the circuit 11[B] in the previous stage as the signal ackin.

The controller 14 further has a function of generating the signal lat[A] and the signal lat[B] in accordance with the signal reqin[A] and the signal reqin[B], respectively. The signal lat[A] is supplied to the memory circuit 12a, and the signal lat[B] is supplied to the memory circuit 12b.

The delay circuit 34 has a function of generating a signal ackin-pos by delaying the signal ackin input from the input terminal Ain. The signal ackin has a function of determining the timing at which the potential of the output terminal Rout is initialized. In addition, the signal ackin-pos has a function of controlling the conduction state of the switch 15. The switch 15 has a function of controlling the supply of power (Power) to the arithmetic circuit 13 in accordance with the signal ackin-pos.

In the above configuration, the signal reqin is input from the circuit 11 illustrated in FIG. 7 to the circuit 11 in the stage subsequent to that of the circuit 11, whereby the arithmetic processing in the arithmetic circuit 13 is started in the circuit 11 in the subsequent stage. Thus, in an analog arithmetic circuit using the circuit 11 illustrated in FIG. 7, as in the analog arithmetic circuit 10 illustrated in FIG. 1, the arithmetic processing in the arithmetic circuit 13 is sequentially performed in a plurality of circuits 11.

In addition, the input of the signal reqin[A] and the signal reqin[B] to the circuit 11 illustrated in FIG. 7 triggers the start of the arithmetic processing in the arithmetic circuit 13 and the input of the signal ackout[A] and the signal ackout [B] from the circuit 11 illustrated in FIG. 7 to the circuit 11 [A] and the circuit 11 [B], respectively, in the stage prior to that of the circuit 11 illustrated in FIG. 7. In the circuit 11 [A] and the circuit 11 [B] in the previous stage, the conduction state of the switches 15 is controlled by the signal ackout[A] and the signal ackout[B] input to the respective circuits, so that the power supply to the arithmetic circuits 13 is stopped. That is, in the analog arithmetic circuit using the circuit 11 illustrated in FIG. 7, as in the analog arithmetic circuit 10 illustrated in FIG. 1, the power supply to the arithmetic circuits 13 can be stopped in the circuits 11 in the order of completion of the arithmetic processing in the arithmetic circuit 13.

The above configuration of one embodiment of the present invention enables power to be supplied only to the circuit 11 in which arithmetic processing is performed while the power supply to the other circuits 11 is stopped; therefore, the power consumption of the analog arithmetic circuit can be reduced.

Configuration Example of Controller and Delay Circuit

Next, a configuration example of the controller 14 and the delay circuit 33 which are used for the circuit 11 illustrated in FIG. 7 will be described. FIG. 8 illustrates a configuration example of the controller 14 and the delay circuit 33.

The controller 14 illustrated in FIG. 8 includes a circuit 35a which has a function of generating the signal lat[A] and the signal ackout[A] from the signal reqin[A] and a circuit 35b which has a function of generating the signal lat[B] and the signal ackout[B] from the signal reqin[B]. The controller 14 further includes a transistor 37, an inverter 36, and an inverter 89.

In addition, the controller 14 illustrated in FIG. 8 has a function of generating the signal reqout-pre using the signal reqin[A] and the signal reqin[B]. The delay circuit 33 generates the signal reqout by delaying the signal reqout-pre.

Specifically, FIG. 8 illustrates an example in which the circuit 35a and the circuit 35b each include a delay circuit 38, a delay circuit 39, an AND circuit 40, and n-channel transistors 41 to 43.

In the circuit 35a, the signal reqin[A] is supplied to an input terminal of the delay circuit 38 and a first input terminal of the AND circuit 40. In addition, an output terminal of the delay circuit 38 is electrically connected to a second input terminal of the AND circuit 40 and an input terminal of the delay circuit 39. The potential of an output terminal of the AND circuit 40 is output as the signal lat[A]. The potential of an output terminal of the delay circuit 39 is output as the signal ackout[A]. In addition, the output terminal of the delay circuit 39 is electrically connected to a gate of the transistor 41 and one of a source and a drain of the transistor 41. The other of the source and the drain of the transistor 41 is electrically connected to a gate of the transistor 42. One of a source and a drain of the transistor 43 is electrically connected to a wiring 84 supplied with a low-level potential, and the other of the source and the drain is electrically connected to the gate of the transistor 42.

In the circuit 35b, the signal reqin[B] is supplied to an input terminal of the delay circuit 38 and a first input terminal of the AND circuit 40. In addition, an output terminal of the delay circuit 38 is electrically connected to a second input terminal of the AND circuit 40 and an input terminal of the delay circuit 39. The potential of an output terminal of the AND circuit 40 is output as the signal lat[B]. The potential of an output terminal of the delay circuit 39 is output as the signal ackout[B]. In addition, the output terminal of the delay circuit 39 is electrically connected to a gate of the transistor 41 and one of a source and a drain of the transistor 41. The other of the source and the drain of the transistor 41 is electrically connected to a gate of the transistor 42. One of a source and a drain of the transistor 43 is electrically connected to the wiring 84 supplied with a low-level potential, and the other of the source and the drain is electrically connected to the gate of the transistor 42.

Furthermore, the transistor 42 included in the circuit 35a and the transistor 42 included in the circuit 35b are electrically connected in series. Specifically, one of a source and a drain of the transistor 42 included in the circuit 35b is electrically connected to a wiring 82 supplied with a low-level potential, and the other of the source and the drain is electrically connected to one of a source and a drain of the transistor 42 in the circuit 35a. The other of the source and the drain of the transistor 42 in the circuit 35a is electrically connected to an input terminal of the inverter 36.

In addition, a gate of the transistor 43 included in the circuit 35a and a gate of the transistor 43 included in the circuit 35b are electrically connected to an input terminal of the inverter 89. In addition, an output terminal of the inverter 89 is electrically connected to a gate of the transistor 37. In addition, the signal ackin is supplied to the input terminal of the inverter 89. In addition, one of a source and a drain of the transistor 37 is electrically connected to a wiring 83 supplied with a high-level potential, and the other of the source and the drain is electrically connected to the input terminal of the inverter 36.

The potential of an output terminal of the inverter 36 is output from the controller 14 as the signal reqout-pre. Furthermore, the output terminal of the inverter 36 is electrically connected to an input terminal of the delay circuit 33, and the signal reqout-pre is supplied to the input terminal of the delay circuit 33. The potential of an output terminal of the delay circuit 33 is output as the signal reqout.

Configuration Example 2 of Arithmetic Circuit and Switch

Next, a configuration example of the arithmetic circuit 13 and the switch 15 which are used for the circuit 11 illustrated in FIG. 7 will be described. FIG. 9 illustrates a configuration example of the arithmetic circuit 13 and the switch 15.

Like the arithmetic circuit 13 illustrated in FIG. 5, the arithmetic circuit 13 illustrated in FIG. 9 includes the p-channel transistors 22 to 24, the n-channel transistors 25 to 28, and the capacitor 30. In addition, as in the arithmetic circuit 13 illustrated in FIG. 5, the transistor 15t functioning as the switch 15 is electrically connected to the arithmetic circuit 13 in FIG. 9. Furthermore, the arithmetic circuit 13 illustrated in FIG. 9 is different from the arithmetic circuit 13 illustrated in FIG. 5 in that n-channel transistors 29a and 29b are provided.

Furthermore, as in the arithmetic circuit 13 illustrated in FIG. 5, the transistor 22 and the transistor 23 in the arithmetic circuit 13 illustrated in FIG. 9 function as a current mirror circuit. In addition, as in the arithmetic circuit 13 illustrated in FIG. 5, the transistor 25 to the transistor 27 in the arithmetic circuit 13 illustrated in FIG. 9 function as a differential circuit. In addition, as in the arithmetic circuit 13 illustrated in FIG. 5, the transistor 24 and the transistor 28 in the arithmetic circuit 13 illustrated in FIG. 9 function as an amplifier circuit. In addition, as in the arithmetic circuit 13 illustrated in FIG. 5, the capacitor 30 in the arithmetic circuit 13 illustrated in FIG. 9 has a function of performing phase compensation. Furthermore, as in the arithmetic circuit 13 illustrated in FIG. 5, the transistor 22 to the transistor 28 and the capacitor 30 in the arithmetic circuit 13 illustrated in FIG. 9 can play a role of an operational amplifier. As in the arithmetic circuit 13 illustrated in FIG. 5, each of the transistors 27 and 28 in the arithmetic circuit 13 illustrated in FIG. 9 also functions as a current source.

Furthermore, the transistor 29a has a function of controlling the supply of the signal reqin[A] to the current sources. Similarly, the transistor 29b has a function of controlling the supply of the signal reqin[B] to the current sources.

A specific connection relation between the transistors and the capacitor is substantially the same as that in the arithmetic circuit 13 illustrated in FIG. 5. Regarding the connection relation between the transistors and the capacitor, differences between the arithmetic circuit 13 illustrated in FIG. 9 and the arithmetic circuit 13 illustrated in FIG. 5 will be described below.

In the arithmetic circuit 13 illustrated in FIG. 9, a gate and one of a source and a drain of the transistor 29a are electrically connected to each other, and the signal reqin[A] is supplied to the gate. In a similar manner, a gate and one of a source and a drain of the transistor 29b are electrically connected to each other, and the signal reqin[B] is supplied to the gate. The other of the source and the drain of the transistor 29a and the other of the source and the drain of the transistor 29b are electrically connected to the gates of the transistor 27 and the transistor 28.

Furthermore, the gate of the transistor 26 corresponds to a non-inverting input terminal (+) of the operational amplifier, and the signal datain[A] is supplied to the gate. In addition, the gate of the transistor 25 corresponds to an inverting input terminal (−) of the operational amplifier, and the signal datain[B] is supplied to the gate.

Furthermore, as for the arithmetic circuit 13 illustrated in FIG. 9, the power supply to the arithmetic circuit 13 is controlled in accordance with the conduction state of the transistor 15t. Specifically, when the transistor 15t is off, the gate voltage of each of the transistors 27 and 28 is determined by the potential difference between the potential of the signal reqin[A] or the signal reqin[B] and the potential VSS, and power corresponding to the gate voltage is supplied to the arithmetic circuit 13. In contrast, when the transistor 15t is turned on, each of the transistors 27 and 28 is turned off because electrical continuity is established between the gate and one of the source and the drain. Consequently, the power supply to the arithmetic circuit 13 is stopped.

Example 2 of Operation of Analog Arithmetic Circuit

Next, a specific example of the operation of the analog arithmetic circuit including the circuit 11 illustrated in FIG. 7 will be described using the timing chart illustrated in FIG. 10. Note that FIG. 10 exemplifies a timing chart in the case where the memory circuit 12 illustrated in FIG. 3 is used as each of the memory circuits 12a and 12b, and the controller 14 illustrated in FIG. 8 and the arithmetic circuit 13 and the transistor 15t illustrated in FIG. 9 are used for the circuit 11 illustrated in FIG. 7.

In addition, in the timing chart exemplified by FIG. 10, the signal delay time in the delay circuits 38 and the signal delay time in the delay circuits 39 of the controller 14 illustrated in FIG. 8 are T1 and T2, respectively, the signal delay time in the delay circuit 33 is T4, and the signal delay time in the delay circuit 34 illustrated in FIG. 7 is T3. In addition, FIG. 10 exemplifies a timing chart in the case where the transistor 37 is a p-channel one.

Note that in the shaded period of the signal datain[A] in the timing chart illustrated in FIG. 10, the signal datain[A] has an analog value. Similarly, in the shaded period of the signal datain[B] in the timing chart illustrated in FIG. 10, the signal datain[B] has an analog value. Similarly, in the shaded period of the signal dataout in the timing chart illustrated in FIG. 10, the signal dataout has an analog value.

As illustrated in FIG. 10, when the potential of the signal reqin[A] is switched from the low level to the high level at time t1, the potential of the signal lat[A] is changed from the low level to the high level at time t2, at which the delay time T1 has passed since the time t1. In addition, the potential of the signal ackout[A] is changed from the low level to the high level at time t3, at which the delay time T1 and the delay time T2 have passed since the time t1. Furthermore, when the potential of the signal ackout[A] is changed to the high level, that of the signal reqout generated by the circuit 11 [A] in the stage prior to that of the circuit 11 illustrated in FIG. 7 is changed to the low level; accordingly, the potential of the signal reqin[A] input to the circuit 11 illustrated in FIG. 7 is changed from the high level to the low level at the time t3. Consequently, the potential of the signal lat[A] is changed from the high level to the low level at the time t3.

In the period from the time t2 to the time t3, in which the potential of the signal lat[A] is at the high level, the signal datain[A] is written to the memory circuit 12a. Then, the written signal datain[A] is supplied to the arithmetic circuit 13.

In addition, at time t4, at which the delay time T3 has passed since the time t3, at which the potential of the signal ackout[A] is changed from the low level to the high level, the supply of the signal datain[A] from the circuit 11 [A] in the stage prior to that of the circuit 11 illustrated in FIG. 7 to the circuit 11 illustrated in FIG. 7 is stopped. Then, the potential of the signal ackout[A] is changed from the high level to the low level at time t6, at which the delay time T1 and the delay time T2 have passed since the time t3.

In addition, in the timing chart exemplified by FIG. 10, the potential of the signal reqin[B] is switched from the low level to the high level at or after the time t4. In one embodiment of the present invention, however, the timing at which the potential of the signal reqin[B] is switched from the low level to the high level is not necessarily at or after the time t4 and may be, for example, before the time t4.

In the timing chart exemplified by FIG. 10, the potential of the signal reqin[B] is switched from the low level to the high level at the time t4. When the potential of the signal reqin[B] is switched from the low level to the high level at the time t4, the potential of the signal lat[B] is changed from the low level to the high level at time t5, at which the delay time T1 has passed since the time t4. In addition, the potential of the signal ackout[B] is changed from the low level to the high level at time t7, at which the delay time T1 and the delay time T2 have passed since the time t4.

Furthermore, when the potential of the signal ackout[B] is changed to the high level, that of the signal reqout generated by the circuit 11 [B] in the stage prior to that of the circuit 11 illustrated in FIG. 7 is changed to the low level; accordingly, the potential of the signal reqin[B] input to the circuit 11 illustrated in FIG. 7 is changed from the high level to the low level at the time t7. Consequently, the potential of the signal lat[B] is changed from the high level to the low level at the time t7.

In the period from the time t5 to the time t7, in which the potential of the signal lat[B] is at the high level, the signal datain[B] is written to the memory circuit 12b. Then, the written signal datain[B] is supplied to the arithmetic circuit 13.

In addition, at time t8, at which the delay time T3 has passed since the time t7, at which the potential of the signal ackout[B] is changed from the low level to the high level, the supply of the signal datain[B] from the circuit 11 [B] in the stage prior to that of the circuit 11 illustrated in FIG. 7 to the circuit 11 illustrated in FIG. 7 is stopped. Then, the potential of the signal ackout[B] is changed from the high level to the low level at time t10, at which the delay time T1 and the delay time T2 have passed since the time t7.

Furthermore, in the circuit 35a illustrated in FIG. 8, when the potential of the signal ackout[A] becomes the high level, the signal ackout[A] is supplied to the gate of the transistor 42 through the transistor 41, so that the transistor 42 is turned on. By turning off the transistor 41, the potential of the gate of the transistor 42 is held even after the potential of the signal ackout[A] is changed to the low level; therefore, the transistor 42 keeps in the on state. Similarly, in the circuit 35b illustrated in FIG. 8, when the potential of the signal ackout[B] becomes the high level, the signal ackout[B] is supplied to the gate of the transistor 42 through the transistor 41, so that the transistor 42 is turned on. By turning off the transistor 41, the potential of the gate of the transistor 42 is held even after the potential of the signal ackout[B] is changed to the low level; therefore, the transistor 42 keeps in the on state.

In the timing chart illustrated in FIG. 10, both the transistor 42 in the circuit 35a and the transistor 42 in the circuit 35b are turned on at the time t7, at which the potential of the signal ackout[B] is changed to the high level. Accordingly, the low-level potential of the wiring 82 is supplied to the input terminal of the inverter 36, so that the potential of the output terminal of the inverter 36 is changed from the low level to the high level. The potential of the output terminal of the inverter 36 is input to the delay circuit 33 as the signal reqout-pre. The delay circuit 33 generates the signal reqout by delaying the signal reqout-pre by the delay time T4. Consequently, the potential of the signal reqout is changed from the low level to the high level at time t9, at which the delay time T4 has passed since the time t7, at which the potential of the signal ackout[B] is changed from the low level to the high level.

When the potential of the signal reqout is changed from the low level to the high level, in the circuit 11 in the stage subsequent to that of the circuit 11 illustrated in FIG. 7, the potential of the signal ackout generated by the controller 14 is changed from the low level to the high level after the delay time T1 and the delay time T2 pass. Then, the signal ackout generated by the circuit 11 in the subsequent stage is supplied to the circuit 11 illustrated in FIG. 7 as the signal ackin. Accordingly, the potential of the signal ackin is changed from the low level to the high level at time t11, at which the delay time T1 and the delay time T2 have passed since the time t9.

When the signal ackin is changed from the low level to the high level, the conduction state of the transistor 37 is changed from on to off. In addition, both the transistors 43 included in the circuit 35a and the circuit 35b are turned on. Accordingly, the low-level potential of the wiring 84 is supplied to the gates of the transistors 42 included in the circuit 35a and the circuit 35b, so that both the transistors 42 are turned off.

In addition, by the potential change of the signal ackin from the low level to the high level at the time t11, the potential of the signal ackin-pos is changed from the low level to the high level at time t12, at which the delay time T3 has passed since the time t11. Through the above operation, the transistor 15t is turned on at the time t12, so that the power supply to the arithmetic circuit 13 is stopped. The arithmetic circuit 13 generates the signal dataout by arithmetic processing using the signal datain[A] and the signal datain[B].

Subsequently, the potential of the signal ackin is changed from the high level to the low level at time t13, whereby the potential of the signal ackin-pos is changed from the high level to the low level at time t14, at which the delay time T3 has passed since the time t13. Through the above operation, the transistor 15t is turned off at the time t14, so that the power supply to the arithmetic circuit 13 is started.

Note that the length of the delay time T1 is desirably set such that the time from the time t12, at which the potential of the signal ackin-pos is changed from the low level to the high level, is long enough for the arithmetic circuit 13 to become ready for the arithmetic processing. The length of the delay time T2 is desirably set such that both the time required to write the signal datain[A] to the memory circuit 12a and the time required to write the signal datain[B] to the memory circuit 12b are secured. The length of the delay time T3 is desirably set such that both the time required for the memory circuit 12a to hold the signal datain[A] and the time required for the memory circuit 12b to hold the signal datain[B] are secured. The length of the delay time T4 is desirably set such that the time required to complete the arithmetic processing using the signal datain[A] and the signal datain[B] in the arithmetic circuit 13 and to stabilize the potential of the signal dataout is secured.

Configuration Example 3 of Arithmetic Circuit and Switch

Next, a configuration example of the arithmetic circuit 13 and the switch 15 which is different from the configurations of the arithmetic circuit 13 and the switch 15 illustrated in FIG. 5 and FIG. 9 will be described. FIG. 11 illustrates a configuration example of the arithmetic circuit 13 and the switch 15.

Like the arithmetic circuit 13 illustrated in FIG. 5, the arithmetic circuit 13 illustrated in FIG. 11 includes the p-channel transistors 22 to 24, the n-channel transistors 25 to 29, and the capacitor 30. In addition, as in the arithmetic circuit 13 illustrated in FIG. 5, the transistor 15t functioning as the switch 15 is electrically connected to the arithmetic circuit 13 in FIG. 11.

A specific connection relation between the transistors and the capacitor in the arithmetic circuit 13 illustrated in FIG. 11 is substantially the same as that in the arithmetic circuit 13 illustrated in FIG. 5. Regarding the connection relation between the transistors and the capacitor, differences between the arithmetic circuit 13 illustrated in FIG. 11 and the arithmetic circuit 13 illustrated in FIG. 5 will be described below.

In the arithmetic circuit 13 illustrated in FIG. 11, the gate of the transistor 26 corresponds to a non-inverting input terminal (+) of an operational amplifier and is electrically connected to a wiring supplied with a reference potential. In addition, the gate of the transistor 25 corresponds to an inverting input terminal (−) of the operational amplifier and is supplied with the signal datain.

Configuration Example of Analog Processor

Next, a configuration example of an analog processor 85 will be described as an example of a semiconductor device using the analog arithmetic circuit 10 of one embodiment of the present invention.

The analog processor 85 illustrated in FIG. 12 includes the analog arithmetic circuit 10, an I/O interface 86 (I/O), and an analog memory 87. The I/O interface 86 has a function of controlling a signal input from an external circuit of the analog processor 85 or a signal output to the external circuit. The analog memory 87 has a function of storing analog data obtained by arithmetic processing performed in the analog arithmetic circuit 10.

FIG. 16 shows an enlarged view of part of the analog processor 85 illustrated in FIG. 12. The analog arithmetic circuit 10 includes a plurality of circuits 11. Signal transfer paths between the plurality of circuits 11 can be determined in advance by wirings or the like provided between the plurality of circuits 11. Furthermore, in the analog processor 85, the power supply to the arithmetic circuit in the circuit 11 in which the arithmetic processing is not performed can be stopped. FIG. 16 illustrates the state in which the arithmetic processing is not performed in any of the circuits 11 and the power supply to the arithmetic circuits is stopped.

FIG. 17 schematically illustrates the state of the analog processor 85 in which the arithmetic processing is performed in some of the circuits 11. In FIG. 17, the arithmetic processing is sequentially performed from the circuit 11a to the circuit 11h of the plurality of circuits 11 as indicated by arrows. In the analog processor 85 of one embodiment of the present invention, power is supplied to the arithmetic circuits in the circuits 11 in which the arithmetic processing is performed, and the power supply to the arithmetic circuits is stopped in the circuits 11 in the order of completion of the arithmetic processing.

Configuration Example of Analog Memory

Next, a configuration example of the analog memory 87 included in the analog processor 85 illustrated in FIG. 12 will be described.

FIG. 18 illustrates a configuration example of the analog memory 87. The analog memory 87 illustrated in FIG. 18 includes a memory cell 60 and a reading circuit 64. The memory cell 60 includes a transistor 61, a transistor 62, and a capacitor 63. A gate of the transistor 61 is electrically connected to a wiring WL. In addition, one of a source and a drain of the transistor 61 is electrically connected to a wiring BL to which an analog signal is input, and the other of the source and the drain is electrically connected to a gate of the transistor 62. One of a source and a drain of the transistor 62 is electrically connected to the wiring BL, and the other of the source and the drain is electrically connected to a wiring RL. One electrode of the capacitor 63 is electrically connected to a wiring SL, and the other electrode is electrically connected to the gate of the transistor 62.

Note that the off-state current of the transistor 61 is desirably very low in order to prevent charge accumulated in the capacitor 63 from leaking through the transistor 61. A transistor characterized by a channel formation region formed in a film of a semiconductor with a wider bandgap than silicon and a lower intrinsic carrier density than silicon can have a very low off-state current and thus is preferably used as the transistor 61. Examples of such a semiconductor are an oxide semiconductor and gallium nitride, whose band gaps are twice or more as large as that of silicon. A transistor including the above semiconductor can have a much lower off-state current than a transistor formed using a normal semiconductor such as silicon or germanium.

In addition, in the example illustrated in FIG. 18, the reading circuit 64 includes n-channel transistors 65 to 70 and a capacitor 71. Specifically, one of a source and a drain of each of the transistors 68 and 69 is electrically connected to a wiring supplied with a low-level potential. In addition, gates of the transistor 68 and the transistor 69 are electrically connected to a wiring supplied with a bias potential (bias). The other of the source and the drain of the transistor 68 is electrically connected to the wiring RL. The other of the source and the drain of the transistor 69 is electrically connected to a gate of the transistor 70. One of a source and a drain of the transistor 70 is electrically connected to the wiring RL, and the other of the source and the drain is electrically connected to gates of the transistor 65 and the transistor 66.

One of a source and a drain of the transistor 65 is electrically connected to the wiring BL and a gate of the transistor 67. One of a source and a drain of the transistor 66 is electrically connected to the gate of the transistor 66. One of a source and a drain of the transistor 67 is electrically connected to the gate of the transistor 70. One of the source and the drain of each of the transistors 65 to 67 is electrically connected to a wiring supplied with a high-level potential. One electrode of the capacitor 71 is electrically connected to the gate of the transistor 70, and the other electrode is electrically connected to the gate of the transistor 67. Furthermore, the potential of the gate of the transistor 70 is output from the output terminal OUT as an output signal.

In the analog memory 87 illustrated in FIG. 18, the transistor 62 and the reading circuit 64 form a voltage follower. Furthermore, the voltage follower functions as an impedance converter for reading an analog signal held at the gate of the transistor 62.

Configuration Example 4 of Arithmetic Circuit and Switch

Next, a configuration example of the arithmetic circuit 13 and the switch 15 which is different from the configurations of the arithmetic circuit 13 and the switch 15 illustrated in FIG. 5, FIG. 9, and FIG. 11 will be described. FIG. 13(A) illustrates a configuration example of the arithmetic circuit 13 functioning as a subtraction circuit and the switch 15.

Like the arithmetic circuit 13 illustrated in FIG. 9, the arithmetic circuit 13 illustrated in FIG. 13(A) includes the p-channel transistors 22 to 24, the n-channel transistors 25 to 28, the n-channel transistors 29a and 29b, and the capacitor 30. In addition, as in the arithmetic circuit 13 illustrated in FIG. 9, the transistor 15t functioning as the switch 15 is electrically connected to the arithmetic circuit 13 in FIG. 13(A).

The arithmetic circuit 13 illustrated in FIG. 13(A) further includes a resistor 88 and a resistor 44 to a resistor 46.

A specific connection relation between the transistors and the capacitor in the arithmetic circuit 13 illustrated in FIG. 13(A) is substantially the same as that in the arithmetic circuit 13 illustrated in FIG. 9. Regarding the connection relation between the elements, differences between the arithmetic circuit 13 illustrated in FIG. 13(A) and the arithmetic circuit 13 illustrated in FIG. 9 will be described below.

In the arithmetic circuit 13 illustrated in FIG. 13(A), the gate of the transistor 25 corresponds to an inverting input terminal (−) of an operational amplifier and is supplied with the signal datain[B] through the resistor 88. In addition, the gate of the transistor 25 is electrically connected through the resistor 44 to the other of the source and the drain of the transistor 24 and the other of the source and the drain of the transistor 28 which correspond to an output terminal of the operational amplifier. In addition, the gate of the transistor 26 corresponds to a non-inverting input terminal (+) of the operational amplifier and is supplied with the signal datain [A] through the resistor 45. In addition, the gate of the transistor 26 is electrically connected to a wiring supplied with a reference potential through the resistor 45 and the transistor 46 which are connected in series.

Configuration Example 5 of Arithmetic Circuit and Switch

Next, a configuration example of the arithmetic circuit 13 and the switch 15 which is different from the configurations of the arithmetic circuit 13 and the switch 15 illustrated in FIG. 5, FIG. 9, FIG. 11, and FIG. 13(A) will be described. FIG. 13(B) illustrates a configuration example of the arithmetic circuit 13 functioning as a logarithmic conversion circuit and the switch 15.

Like the arithmetic circuit 13 illustrated in FIG. 11, the arithmetic circuit 13 illustrated in FIG. 13(B) includes the p-channel transistors 22 to 24, the n-channel transistors 25 to 29, and the capacitor 30. In addition, as in the arithmetic circuit 13 illustrated in FIG. 11, the transistor 15t functioning as the switch 15 is electrically connected to the arithmetic circuit 13 in FIG. 13(B).

The arithmetic circuit 13 illustrated in FIG. 13(B) further includes a resistor 47, a resistor 48, and a diode 49.

A specific connection relation between the transistors and the capacitor in the arithmetic circuit 13 illustrated in FIG. 13(B) is substantially the same as that in the arithmetic circuit 13 illustrated in FIG. 11. Regarding the connection relation between the elements, differences between the arithmetic circuit 13 illustrated in FIG. 13(B) and the arithmetic circuit 13 illustrated in FIG. 11 will be described below.

In the arithmetic circuit 13 illustrated in FIG. 13(B), the other of the source and the drain of the transistor 24 and the other of the source and the drain of the transistor 28 which correspond to an output terminal of an operational amplifier are electrically connected to one terminal of the resistor 48, and the potential of the other terminal of the resistor 48 is output from the arithmetic circuit 13 as the signal dataout. In addition, the gate of the transistor 25 corresponds to an inverting input terminal (−) of the operational amplifier and is supplied with the signal datain through the resistor 47. In addition, the gate of the transistor 25 is electrically connected to an anode of the diode 49, and a cathode of the diode 49 is electrically connected to the other terminal of the resistor 48.

Configuration Example 6 of Arithmetic Circuit and Switch

Next, a configuration example of the arithmetic circuit 13 and the switch 15 which is different from the configurations of the arithmetic circuit 13 and the switch 15 illustrated in FIG. 5, FIG. 9, FIG. 11, and FIG. 13 will be described. FIG. 14 illustrates a configuration example of the arithmetic circuit 13 functioning as an antilog converter circuit and the switch 15.

Like the arithmetic circuit 13 illustrated in FIG. 11, the arithmetic circuit 13 illustrated in FIG. 14 includes the p-channel transistors 22 to 24, the n-channel transistors 25 to 29, and the capacitor 30. In addition, as in the arithmetic circuit 13 illustrated in FIG. 11, the transistor 15t functioning as the switch 15 is electrically connected to the arithmetic circuit 13 in FIG. 14.

The arithmetic circuit 13 illustrated in FIG. 14 further includes a resistor 51, a resistor 52, and a diode 50.

A specific connection relation between the transistors and the capacitor in the arithmetic circuit 13 illustrated in FIG. 14 is substantially the same as that in the arithmetic circuit 13 illustrated in FIG. 11. Regarding the connection relation between the elements, differences between the arithmetic circuit 13 illustrated in FIG. 14 and the arithmetic circuit 13 illustrated in FIG. 11 will be described below.

In the arithmetic circuit 13 illustrated in FIG. 14, the other of the source and the drain of the transistor 24 and the other of the source and the drain of the transistor 28 which correspond to an output terminal of an operational amplifier are electrically connected to one terminal of the resistor 52, and the potential of the other terminal of the resistor 52 is output from the arithmetic circuit 13 as the signal dataout. In addition, the gate of the transistor 25 corresponds to an inverting input terminal (−) of the operational amplifier and is electrically connected to the other terminal of the resistor 52 through the resistor 51. In addition, the gate of the transistor 25 is electrically connected to an anode of the diode 50, and the signal datain is supplied to a cathode of the diode 50.

Configuration Example 7 of Arithmetic Circuit and Switch

Next, a configuration example of the arithmetic circuit 13 and the switch 15 which is different from the configurations of the arithmetic circuit 13 and the switch 15 illustrated in FIG. 5, FIG. 9, FIG. 11, FIG. 13, and FIG. 14 will be described. FIG. 15(A) illustrates a configuration example of the arithmetic circuit 13 functioning as an inverting adder circuit and the switch 15.

Like the arithmetic circuit 13 illustrated in FIG. 9, the arithmetic circuit 13 illustrated in FIG. 15(A) includes the p-channel transistors 22 to 24, the n-channel transistors 25 to 28, the n-channel transistors 29a and 29b, and the capacitor 30. In addition, as in the arithmetic circuit 13 illustrated in FIG. 9, the transistor 15t functioning as the switch 15 is electrically connected to the arithmetic circuit 13 in FIG. 15(A).

The arithmetic circuit 13 illustrated in FIG. 15(A) further includes a resistor 53 to a resistor 55.

A specific connection relation between the transistors and the capacitor in the arithmetic circuit 13 illustrated in FIG. 15(A) is substantially the same as that in the arithmetic circuit 13 illustrated in FIG. 9. Regarding the connection relation between the elements, differences between the arithmetic circuit 13 illustrated in FIG. 15(A) and the arithmetic circuit 13 illustrated in FIG. 9 will be described below.

In the arithmetic circuit 13 illustrated in FIG. 15(A), the gate of the transistor 25 corresponds to an inverting input terminal (−) of an operational amplifier, is supplied with the signal datain[B] through the resistor 53, and is supplied with the signal datain[A] through the resistor 54. In addition, the gate of the transistor 25 is electrically connected through the resistor 55 to the other of the source and the drain of the transistor 24 and the other of the source and the drain of the transistor 28 which correspond to an output terminal of the operational amplifier. In addition, the gate of the transistor 26 corresponds to a non-inverting input terminal (+) of the operational amplifier and is electrically connected to a wiring supplied with a reference potential.

Configuration Example 8 of Arithmetic Circuit and Switch

Next, a configuration example of the arithmetic circuit 13 and the switch 15 which is different from the configurations of the arithmetic circuit 13 and the switch 15 illustrated in FIG. 5, FIG. 9, FIG. 11, FIG. 13, FIG. 14, and FIG. 15(A) will be described. FIG. 15(B) illustrates a configuration example of the arithmetic circuit 13 functioning as a non-inverting adder circuit and the switch 15.

Like the arithmetic circuit 13 illustrated in FIG. 9, the arithmetic circuit 13 illustrated in FIG. 15(B) includes the p-channel transistors 22 to 24, the n-channel transistors 25 to 28, the n-channel transistors 29a and 29b, and the capacitor 30. In addition, as in the arithmetic circuit 13 illustrated in FIG. 9, the transistor 15t functioning as the switch 15 is electrically connected to the arithmetic circuit 13 in FIG. 15(B).

The arithmetic circuit 13 illustrated in FIG. 15(B) further includes a resistor 56 to a resistor 59.

A specific connection relation between the transistors and the capacitor in the arithmetic circuit 13 illustrated in FIG. 15(B) is substantially the same as that in the arithmetic circuit 13 illustrated in FIG. 9. Regarding the connection relation between the elements, differences between the arithmetic circuit 13 illustrated in FIG. 15(B) and the arithmetic circuit 13 illustrated in FIG. 9 will be described below.

In the arithmetic circuit 13 illustrated in FIG. 15(B), the gate of the transistor 25 corresponds to an inverting input terminal (−) of an operational amplifier and is electrically connected to a wiring supplied with a reference potential. In addition, the gate of the transistor 25 is electrically connected through the resistor 57 to the other of the source and the drain of the transistor 24 and the other of the source and the drain of the transistor 28 which correspond to an output terminal of the operational amplifier. In addition, the gate of the transistor 26 corresponds to a non-inverting input terminal (+) of the operational amplifier, is supplied with the signal datain[A] through the resistor 58, and is supplied with the signal datain[B] through the resistor 59.

Configuration Example 1 of Semiconductor Device

Next, a configuration example of a semiconductor device of one embodiment of the present invention will be described. A semiconductor device 75 illustrated in FIG. 19(A) includes an analog processor 77 using the analog arithmetic circuit of one embodiment of the present invention, an input device 76, and an output device 78.

The input device 76 has a function of sending data input from the outside of the semiconductor device 75 to the analog processor 77. As the input device 76, for example, a keyboard, a mouse, or a touch panel can be used. The output device 78 has a function of outputting data output from the analog processor 77. As the output device 78, for example, a display, a projector, a printer, a plotter, an audio output device, or a memory can be used.

In addition, the semiconductor device 75 illustrated in FIG. 19(B) includes the analog processor 77 using the analog arithmetic circuit of one embodiment of the present invention, the input device 76, the output device 78, an analog-to-digital converter circuit 79 (A/D), a digital-to-analog converter circuit 80 (D/A), and a digital processor 81.

The analog-to-digital converter circuit 79 has a function of analog-to-digital conversion of data output from the analog processor 77. The digital processor 81 performs arithmetic processing using the digital data sent from the analog-to-digital converter circuit 79 and outputs the resulting data. The digital-to-analog converter circuit 80 has a function of digital-to-analog conversion of the data output from the digital processor 81.

Note that in the example illustrated in FIG. 19(B), the semiconductor device 75 has a configuration in which data is supplied from the input device 76 to the analog processor 77 and the data is output from the analog processor 77 to the output device 78. However, the semiconductor device 75 of one embodiment of the present invention may also have a configuration in which data is supplied from the input device 76 to the digital processor 81 and the data is output from the digital processor 81 to the output device 78.

Configuration Example 2 of Semiconductor Device

Next, a configuration example of a semiconductor device of one embodiment of the present invention will be described. A semiconductor device 800 illustrated in FIG. 24 includes an image sensor 801, an image memory 802, an analog processor 803 using the analog arithmetic circuit of one embodiment of the present invention, and a display device 804. The image sensor 801 corresponds to an input device, and the display device 804 corresponds to an output device.

The image sensor 801 includes a sensor array 805 which is provided with a plurality of pixels 810 each including a photoelectric conversion element and a transistor, a driver circuit 806 which controls the acquisition of image data 808 by the pixels 810, and a reading circuit 807 which controls the reading of the obtained image data 808.

The image memory 802 includes a plurality of analog memories 809. Each of the analog memories 809 can store one frame of the image data 808 obtained in the sensor array 805.

The operation of the image sensor 801 will be described below. In a first step, the first image data 808 is obtained in the sensor array 805. The image data 808 may be obtained by a so-called rolling shutter method, in which the pixels 810 are sequentially subjected to exposure and the image data 808 is sequentially read out, or by a so-called global shutter method, in which all the pixels 810 are subjected to exposure at the same time and then the image data 808 is sequentially read out. When the image data 808 is obtained by the rolling shutter method, the reading of the image data 808 from the pixels 810 in a row and the exposure of the pixels 810 in another row can be performed in parallel; therefore, the frame frequency for obtaining the image data 808 can be increased. In contrast, when the image data 808 is obtained by the global shutter method, the image data 808 with little distortion can be obtained even in the case where an object moves.

In a second step, the first image data 808 obtained in the sensor array 805 is stored in the first analog memory 809 through the reading circuit 807. The image data 808 can be stored as analog data in the first analog memory 809. The above configuration removes the necessity for converting the image data 808 from analog to digital, thereby increasing the frame frequency for obtaining the image data 808.

Subsequently, the first step and the second step are repeated plural times, whereby the image data 808 can be stored in each of the plurality of analog memories 809.

In a third step, the analog processor 803 performs desired image processing using the image data 808 stored in the plurality of analog memories 809. The image data having been subjected to the image processing is sent to the display device 804.

Note that as an example of the above image processing, image processing in which the image data 808 with little blur of focus is obtained from plural pieces of image data 808 can be given. Specifically, in the above image processing, the sharpness of each image data 808 may be calculated and the image data 808 with the highest sharpness may be selected. Alternatively, in the above image processing, a region with high sharpness may be extracted from each image data 808 and these regions may be combined to produce single image data 808.

Furthermore, as another example of the image processing by the analog processor 803, image processing in which the image data 808 with optimum brightness is obtained from plural pieces of image data 808 can be given. Specifically, in the above image processing, the highest brightness of each image data 808 is calculated and the image data 808 whose highest brightness is saturated is identified. Then, the image data 808 except for the identified image data 808 may be selected from the plural pieces of image data 808.

Alternatively, in the above image processing, the lowest brightness of each image data 808 is calculated and the image data 808 whose lowest brightness is saturated is identified. Then, the image data 808 except for the identified image data 808 may be selected from the plural pieces of image data 808.

Note that in the case where the first step and the second step are performed in accordance with the lighting of an imaging flashlight, the image data 808 can be obtained at the timing at which the optimum amount of light is delivered.

Example of Cross-Sectional Structure of Semiconductor Device

FIG. 20 illustrates an example of a cross-sectional structure of an analog arithmetic circuit of one embodiment of the present invention. Note that FIG. 20 exemplifies a cross-sectional view of the transistor 16 and the capacitor 17 included in the memory circuit 12 illustrated in FIG. 3 and the transistor 26 included in the arithmetic circuit 13 illustrated in FIG. 5. Furthermore, in the example illustrated in FIG. 20, the capacitor 17 and the transistor 16 including a channel formation region in an oxide semiconductor film are formed over the transistor 26 including a channel formation region in a single-crystal silicon substrate.

The transistor 26 may include a channel formation region in a semiconductor film or a semiconductor substrate of silicon, germanium, or the like in an amorphous, microcrystalline, polycrystalline, or single-crystal state. Alternatively, the transistor 26 may include a channel formation region in an oxide semiconductor film or an oxide semiconductor substrate. In the case where the transistors each include a channel formation region in an oxide semiconductor film or an oxide semiconductor substrate, the transistor 16 is not necessarily stacked over the transistor 26, and the transistor 16 and the transistor 26 may be formed in the same layer.

In the case where the transistor 26 is formed using a thin silicon film, amorphous silicon formed by a vapor phase growth method, such as a plasma CVD method, or a sputtering method, polycrystalline silicon obtained by crystallization of amorphous silicon by treatment such as laser annealing, single-crystal silicon obtained by separation of a surface portion of a single-crystal silicon wafer by implantation of hydrogen ions or the like, or the like can be used for the thin film.

As a semiconductor substrate 601 on which the transistor 26 is formed, for example, a silicon substrate, a germanium substrate, or a silicon germanium substrate can be used. FIG. 20 illustrates an example in which a single-crystal silicon substrate is used as the semiconductor substrate 601.

In addition, the transistor 26 is electrically isolated by an element isolation method. As the element isolation method, a selective oxidation method (LOCOS: Local Oxidation of Silicon), a trench isolation method (STI: Shallow Trench Isolation), or the like can be employed. FIG. 20 illustrates an example in which a trench isolation method is used to electrically isolate the transistor 26. Specifically, in the example illustrated in FIG. 20, the transistor 26 is subjected to element isolation using an element isolation region 610 formed in such a manner that a trench is formed in the semiconductor substrate 601 by etching or the like and then an insulator containing silicon oxide or the like is buried in the trench.

An insulating film 611 is provided over the transistor 26. Openings are formed in the insulating film 611. Furthermore, a conductive film 625 and a conductive film 626 which are electrically connected to the source and the drain of the transistor 26 and a conductive film 627 which is electrically connected to the gate of the transistor 26 are formed in the openings.

Furthermore, the conductive film 625 is electrically connected to a conductive film 634 formed over the insulating film 611. The conductive film 626 is electrically connected to a conductive film 635 formed over the insulating film 611. The conductive film 627 is electrically connected to a conductive film 636 formed over the insulating film 611.

An insulating film 612 is formed over the conductive film 634 to the conductive film 636. An opening is formed in the insulating film 612. A conductive film 637 electrically connected to the conductive film 636 is formed in the opening. Furthermore, the conductive film 637 is electrically connected to a conductive film 651 formed over the insulating film 612.

In addition, an insulating film 613 is formed over the conductive film 651. An opening is formed in the insulating film 613. A conductive film 652 electrically connected to the conductive film 651 is formed in the opening. Furthermore, the conductive film 652 is electrically connected to a conductive film 653 formed over the insulating film 613. A conductive film 644 is also formed over the insulating film 613.

An insulating film 661 is formed over the conductive film 653 and the conductive film 644. Furthermore, in FIG. 20, the transistor 16 and the capacitor 17 are formed over the insulating film 661.

The transistor 16 includes a semiconductor film 701 which is over the insulating film 661 and contains an oxide semiconductor, a conductive film 721 and a conductive film 722 which are over the semiconductor film 701 and function as a source and a drain, a gate insulating film 662 over the semiconductor film 701, the conductive film 721, and the conductive film 722, and a gate electrode 731 which is located over the gate insulating film 662 and overlaps with the semiconductor film 701 between the conductive film 721 and the conductive film 722. Note that the conductive film 722 is electrically connected to the conductive film 653 in the opening provided in the insulating film 661.

Furthermore, in the semiconductor film 701 of the transistor 16, there is a region 710 between a region overlapping with the conductive film 721 and a region overlapping with the gate electrode 731. In addition, in the semiconductor film 701 of the transistor 16, there is a region 711 between a region overlapping with the conductive film 722 and the region overlapping with the gate electrode 731. Argon, an impurity which imparts p-type conductivity to the semiconductor film 701, or an impurity which imparts n-type conductivity to the semiconductor film 701 is added to the region 710 and the region 711 using the conductive film 721, the conductive film 722, and the gate electrode 731 as masks, whereby in the semiconductor film 701, the resistivity of the region 710 and the region 711 can become lower than that of the region overlapping with the gate electrode 731.

In addition, the capacitor 17 includes a conductive film 654 over the insulating film 661, the gate insulating film 662 overlapping with the conductive film 654, and a conductive film 655 overlapping with the conductive film 654 with the gate insulating film 662 positioned therebetween. The conductive film 654 can be formed together with the conductive film 722 by forming a conductive film over the insulating film 661 and processing the conductive film into a desired shape. The conductive film 655 can be formed together with the gate electrode 731 by forming a conductive film over the gate insulating film 662 and processing the conductive film into a desired shape.

Furthermore, an insulating film 663 is provided over the transistor 16 and the capacitor 17.

Note that in FIG. 20, the transistor 16 may include the gate electrode 731 on at least one side of the semiconductor film 701 or may include a pair of gate electrodes between which the semiconductor film 701 is positioned.

In the case where the transistor 16 includes a pair of gate electrodes between which the semiconductor film 701 is positioned, a signal for controlling an on state or an off state may be supplied to one of the gate electrodes, and the other gate electrode may be supplied with a potential from another source. In this case, potentials at the same level may be supplied to the pair of gate electrodes, or a fixed potential such as the ground potential may be supplied only to the other gate electrode. By controlling the level of the potential supplied to the other gate electrode, the threshold voltage of the transistor can be controlled.

In addition, FIG. 20 exemplifies the case where the transistor 16 has a single-gate structure in which one channel formation region corresponding to one gate electrode 731 is provided. However, the transistor 16 may have a multi-gate structure in which a plurality of electrically connected gate electrodes is provided so that a plurality of channel formation regions is included in one active layer.

Transistor

Next, a structure example of a transistor 90 including a channel formation region in an oxide semiconductor film will be described.

FIG. 21 illustrates a structure example of the transistor 90 including a channel formation region in an oxide semiconductor film. FIG. 21(A) shows a top view of the transistor 90. Note that insulating films are omitted in FIG. 21(A) in order to clarify the layout of the transistor 90. In addition, FIG. 21(B) shows a cross-sectional view along the dashed-dotted line A1-A2 in the top view in FIG. 21(A). FIG. 21(C) shows a cross-sectional view along the dashed-dotted line A3-A4.

As illustrated in FIG. 21, the transistor 90 includes an oxide semiconductor film 92a and an oxide semiconductor film 92b which are stacked in this order over an insulating film 91 formed over a substrate 97; a conductive film 93 and a conductive film 94 which are electrically connected to the oxide semiconductor film 92b and function as a source electrode and a drain electrode; an oxide semiconductor film 92c over the oxide semiconductor film 92b, the conductive film 93, and the conductive film 94; an insulating film 95 which functions as a gate insulating film and is located over the oxide semiconductor film 92c; and a conductive film 96 which functions as a gate electrode, lies over the insulating film 95, and overlaps with the oxide semiconductor film 92a to the oxide semiconductor film 92c. Note that the substrate 97 may be a glass substrate, a semiconductor substrate, or the like or may be an element substrate in which a semiconductor element is formed over a glass substrate or a semiconductor substrate.

FIG. 22 illustrates another specific structure example of the transistor 90. FIG. 22(A) shows a top view of the transistor 90. Note that insulating films are omitted in FIG. 22(A) in order to clarify the layout of the transistor 90. In addition, FIG. 22(B) shows a cross-sectional view along the dashed-dotted line A1-A2 in the top view in FIG. 22(A). FIG. 22(C) shows a cross-sectional view along the dashed-dotted line A3-A4.

As illustrated in FIG. 22, the transistor 90 includes the oxide semiconductor film 92a to the oxide semiconductor film 92c which are sequentially stacked over the insulating film 91; the conductive film 93 and the conductive film 94 which are electrically connected to the oxide semiconductor film 92c and function as a source electrode and a drain electrode; the insulating film 95 which functions as a gate insulating film and is located over the oxide semiconductor film 92c, the conductive film 93, and the conductive film 94; and the conductive film 96 which functions as a gate electrode, lies over the insulating film 95, and overlaps with the oxide semiconductor film 92a to the oxide semiconductor film 92c.

Note that in the structure examples of the transistor 90 in FIG. 21 and FIG. 22, the oxide semiconductor film 92a to the oxide semiconductor film 92c which are stacked are used. The oxide semiconductor film included in the transistor 90 is not limited to stacked oxide semiconductor films and may be a single oxide semiconductor film.

In the case where the transistor 90 includes the semiconductor film in which the oxide semiconductor film 92a to the oxide semiconductor film 92c are sequentially stacked, each of the oxide semiconductor films 92a and 92c is an oxide film which contains, as a component, at least one metal element contained in the oxide semiconductor film 92b and in which the conduction band minimum energy is closer to the vacuum level than that in the oxide semiconductor film 92b by 0.05 eV or more, 0.07 eV or more, 0.1 eV or more, or 0.15 eV or more and 2 eV or less, 1 eV or less, 0.5 eV or less, or 0.4 eV or less. Moreover, the oxide semiconductor film 92b preferably contains at least indium because the carrier mobility is increased.

In the case where the transistor 90 includes the semiconductor film with the above structure, when an electric field is applied to the semiconductor film by application of a voltage to the gate electrode, a channel region is formed in the oxide semiconductor film 92b, which has the lowest conduction band minimum energy in the semiconductor film. That is, since the oxide semiconductor film 92c is provided between the oxide semiconductor film 92b and the insulating film 95, the channel region can be formed in the oxide semiconductor film 92b, which is separated from the insulating film 95.

In addition, since the oxide semiconductor film 92c contains, as a component, at least one metal element contained in the oxide semiconductor film 92b, interface scattering is less likely to occur at the interface between the oxide semiconductor film 92b and the oxide semiconductor film 92c. Thus, the movement of carriers is less likely to be inhibited at the interface, which results in an increase in the field-effect mobility of the transistor 90.

In addition, when an interface state is formed at the interface between the oxide semiconductor film 92b and the oxide semiconductor film 92a, a channel region is also formed in a region in the vicinity of the interface, which causes a change in the threshold voltage of the transistor 90. However, since the oxide semiconductor film 92a contains, as a component, at least one metal element contained in the oxide semiconductor film 92b, an interface state is less likely to be formed at the interface between the oxide semiconductor film 92b and the oxide semiconductor film 92a. Accordingly, the above structure can reduce variations in the electrical characteristics of the transistor 90, such as the threshold voltage.

In addition, it is desirable that a plurality of oxide semiconductor films be stacked so that an interface state which is caused by an impurity existing between the oxide semiconductor films and inhibits carrier flow is not formed at the interface between the films. This is because when an impurity exists between the stacked oxide semiconductor films, the continuity of the conduction band minimum energy between the oxide semiconductor films is lost, and carriers are trapped or disappear by recombination in the vicinity of the interface. By reducing impurities between the films, a continuous junction (here, in particular, a state having a U-shaped well structure in which the conduction band minimum energy is changed continuously between the films) is formed easily as compared with the case of merely stacking a plurality of oxide semiconductor films which contain at least one common metal as a main component.

To form a continuous junction, the films need to be stacked successively without being exposed to the air by using a multi-chamber deposition apparatus (sputtering apparatus) provided with a load lock chamber. Each chamber of the sputtering apparatus is preferably subjected to high vacuum evacuation (to about $5\times10^{-7}$ Pa to $1\times10^{-4}$ Pa) with the use of a suction vacuum pump such as a cryopump so that water or the like, which is an impurity for an oxide semiconductor, is removed as much as possible. Alternatively, a turbo molecular pump and a cold trap are preferably combined to prevent backflow of a gas into the chamber through an evacuation system.

To obtain a highly purified intrinsic oxide semiconductor, not only high vacuum evacuation of the chamber but also high purification of a gas used in the sputtering is important. When the dew point of an oxygen gas or an argon gas used as the above gas is set to −40° C. or lower, preferably −80° C. or lower, further preferably −100° C. or lower to increase the purity of the gas to be used, moisture and the like can be prevented from entering the oxide semiconductor film as much as possible. Specifically, in the case where the oxide semiconductor film 92b is an In-M-Zn oxide (M is Ga, Y, Zr, La, Ce, or Nd) and a target having an atomic ratio of metal elements of In:M:Zn=$x_1$:$y_1$:$z_1$ is used for depositing the oxide semiconductor film 92b, $x_1/y_1$ is preferably greater than or equal to ⅓ and less than or equal to 6, further preferably greater than or equal to 1 and less than or equal to 6, and $z_1/y_1$ is preferably greater than or equal to ⅓ and less than or equal to 6, further preferably greater than or equal to 1 and less than or equal to 6. Note that when $z_1/y_1$ is greater than or equal to 1 and less than or equal to 6, a CAAC-OS film is easily formed as the oxide semiconductor film 92b. Typical examples of the atomic ratio of the metal elements in the target are In:M:Zn=1:1:1 and In:M:Zn=3:1:2.

Specifically, in the case where the oxide semiconductor film 92a and the oxide semiconductor film 92c are each an In-M-Zn oxide (M is Ga, Y, Zr, La, Ce, or Nd) and a target having an atomic ratio of metal elements of In:M:Zn=$x_2$:$y_2$:$z_2$ is used for depositing the oxide semiconductor film 92a and the oxide semiconductor film 92c, $x_2/y_2$ is preferably smaller than $x_1/y_1$, and $z_2/y_2$ is preferably greater than or equal to ⅓ and less than or equal to 6, further preferably greater than or equal to 1 and less than or equal to 6. Note that when $z_2/y_2$ is greater than or equal to 1 and less than or equal to 6, CAAC-OS films are easily formed as the oxide semiconductor film 92a and the oxide semiconductor film 92c. Typical examples of the atomic ratio of the metal elements in the target are In:M:Zn=1:3:2, In:M:Zn=1:3:4, In:M:Zn=1:3:6, and In:M:Zn=1:3:8.

Note that the thickness of each of the oxide semiconductor films 92a and 92c is greater than or equal to 3 nm and less than or equal to 100 nm, preferably greater than or equal to 3 nm and less than or equal to 50 nm. In addition, the thickness of the oxide semiconductor film 92b is greater than or equal to 3 nm and less than or equal to 200 nm, preferably more than or equal to 3 nm and less than or equal to 100 nm, further preferably more than or equal to 3 nm and less than or equal to 50 nm.

In the semiconductor film having a three-layer structure, the oxide semiconductor film 92a to the oxide semiconductor film 92c can be either amorphous or crystalline. Note that the oxide semiconductor film 92b in which a channel region is formed is preferably crystalline; this is because, with the crystalline oxide semiconductor film 92b, the transistor 90 can have stable electrical characteristics.

Note that a channel formation region refers to a region of the semiconductor film of the transistor 90 which overlaps with the gate electrode and is positioned between the source electrode and the drain electrode. In addition, a channel region refers to a region in which current mainly flows in the channel formation region.

For example, in the case where an In—Ga—Zn oxide film formed by a sputtering method is used as each of the oxide semiconductor films 92a and 92c, the oxide semiconductor film 92a and the oxide semiconductor film 92c can be deposited using a target containing an In—Ga—Zn oxide (In:Ga:Zn=1:3:2 [atomic ratio]). The deposition conditions may be as follows, for example: as a deposition gas, an argon gas and an oxygen gas are used at 30 sccm and 15 sccm, respectively; the pressure is 0.4 Pa; the substrate temperature is 200° C.; and the DC power is 0.5 kW.

In addition, in the case where the oxide semiconductor film 92b is a CAAC-OS film, the oxide semiconductor film 92b is preferably deposited using a polycrystalline target containing an In—Ga—Zn oxide (In:Ga:Zn=1:1:1 [atomic ratio]). The deposition conditions can be as follows, for example: as a deposition gas, an argon gas and an oxygen gas are used at 30 sccm and 15 sccm, respectively; the pressure is 0.4 Pa; the substrate temperature is 300° C.; and the DC power is 0.5 kW.

Note that the oxide semiconductor films 92a to 92c can be formed by a sputtering method; however, they may be formed by another method, for example, a thermal CVD method. As the thermal CVD method, for example, an MOCVD (Metal Organic Chemical Vapor Deposition) method or an ALD (Atomic Layer Deposition) method may be employed.

Note that there are few carrier generation sources in a highly purified oxide semiconductor (purified Oxide Semiconductor) obtained by reduction of impurities such as moisture or hydrogen serving as electron donors (donors) and reduction of oxygen vacancies; therefore, an i-type (intrinsic) or a substantially i-type semiconductor can be obtained. For this reason, a transistor including a channel formation region in a highly purified oxide semiconductor film has a very low off-state current and high reliability. Furthermore, a transistor in which a channel formation region is formed in the oxide semiconductor film easily has an electrical characteristic of a positive threshold voltage (also referred to as a normally-off characteristic).

Specifically, various experiments can prove the low off-state current of a transistor including a channel formation region in a highly purified oxide semiconductor film. For example, even when an element has a channel width of $1\times10^6$ μm and a channel length of 10 μm, the off-state current can be at or below the measurement limit of a semiconductor parameter analyzer, i.e., lower than or equal to $1\times10^{-13}$ A, at a voltage (drain voltage) between the source electrode and the drain electrode of 1 V to 10 V. In this case, it can be seen that the off-state current of the transistor which is normalized on the channel width is lower than or equal to 100 zA/μm. In addition, the off-state current was measured using a circuit in which a capacitor and a transistor were connected to each other and charge flowing into the capacitor or flowing from the capacitor was controlled by the transistor. In the measurement, a highly purified oxide semiconductor film was used for a channel formation region of the transistor, and the off-state current of the transistor was measured from a change in the amount of charge in the capacitor per unit time. It can be seen from the result that, in the case where the voltage between the source electrode and the drain electrode of the transistor is 3 V, a lower off-state current of several tens of yA/μm is obtained. Accordingly, the transistor using the highly purified oxide semiconductor film for a channel formation region has a much lower off-state current than a transistor using crystalline silicon.

Note that in the case where an oxide semiconductor film is used as the semiconductor film, the oxide semiconductor preferably contains at least indium (In) or zinc (Zn). In addition to them, gallium (Ga) is preferably contained as a stabilizer for reducing variations in electrical characteristics of a transistor using the oxide semiconductor. In addition, tin (Sn) is preferably contained as a stabilizer. In addition, hafnium (Hf) is preferably contained as a stabilizer. In addition, aluminum (Al) is preferably contained as a stabilizer. In addition, zirconium (Zr) is preferably contained as a stabilizer.

Among oxide semiconductors, unlike silicon carbide, gallium nitride, or gallium oxide, an In—Ga—Zn oxide, an In—Sn—Zn oxide, or the like has an advantage of high mass productivity because a transistor with favorable electrical characteristics can be formed by a sputtering method or a wet process. Furthermore, unlike silicon carbide, gallium nitride, or gallium oxide, with the use of the In—Ga—Zn oxide, a transistor with favorable electrical characteristics can be formed over a glass substrate. Furthermore, a larger substrate can be used.

In addition, as another stabilizer, one or more kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

As the oxide semiconductor, for example, indium oxide, gallium oxide, tin oxide, zinc oxide, an In—Zn oxide, a Sn—Zn oxide, an Al—Zn oxide, a Zn—Mg oxide, a Sn—Mg oxide, an In—Mg oxide, an In—Ga oxide, an In—Ga—Zn oxide (also referred to as IGZO), an In—Al—Zn oxide, an In—Sn—Zn oxide, a Sn—Ga—Zn oxide, an Al—Ga—Zn oxide, a Sn—Al—Zn oxide, an In—Hf—Zn oxide, an In—La—Zn oxide, an In—Pr—Zn oxide, an In—Nd—Zn oxide, an In—Ce—Zn oxide, an In—Sm—Zn oxide, an In—Eu—Zn oxide, an In—Gd—Zn oxide, an In—Tb—Zn oxide, an In—Dy—Zn oxide, an In—Ho—Zn oxide, an In—Er—Zn oxide, an In—Tm—Zn oxide, an In—Yb—Zn oxide, an In—Lu—Zn oxide, an In—Sn—Ga—Zn oxide, an In—Hf—Ga—Zn oxide, an In—Al—Ga—Zn oxide, an In—Sn—Al—Zn oxide, an In—Sn—Hf—Zn oxide, or an In—Hf—Al—Zn oxide can be used.

Note that, for example, an In—Ga—Zn oxide refers to an oxide containing In, Ga, and Zn, and there is no limitation on the ratio of In to Ga, and Zn. Furthermore, a metal element other than In, Ga, and Zn may be contained. Since the In—Ga—Zn oxide has a sufficiently high resistance when no electric field is applied thereto, the off-state current can be sufficiently reduced. Moreover, its mobility is high.

For example, an In—Sn—Zn oxide enables a high mobility relatively easily. However, even an In—Ga—Zn oxide enables the mobility increase by reducing the defect density in a bulk.

In addition, in the transistor 90, a metal in the source electrode and the drain electrode might extract oxygen from the oxide semiconductor film depending on a conductive material used for the source electrode and the drain electrode. In this case, regions of the oxide semiconductor film in contact with the source electrode and the drain electrode become n-type regions due to the formation of oxygen vacancies. Since the n-type region functions as a source region or a drain region, the contact resistance between the oxide semiconductor film and the source electrode or the drain electrode can be reduced. Accordingly, the formation of the n-type region can increase the mobility and the on-state current of the transistor 90, thereby achieving high-speed operation of a semiconductor device using the transistor 90.

Note that the extraction of oxygen by a metal in the source electrode and the drain electrode is probably caused when the source electrode and the drain electrode are formed by a sputtering method or the like or when heat treatment is performed after the formation of the source electrode and the drain electrode. In addition, the n-type region is more likely to be formed when a conductive material which is easily bonded to oxygen is used for the source electrode and the drain electrode. Examples of the above conductive material include Al, Cr, Cu, Ta, Ti, Mo, and W.

In the case where the semiconductor film including the stacked oxide semiconductor films is used for the transistor 90, the n-type region preferably extends to the oxide semiconductor film 92b serving as a channel region in order that the mobility and the on-state current of the transistor 90 can be increased and the semiconductor device can operate at high speed.

The insulating film 91 is desirably an insulating film having a function of supplying part of oxygen to the oxide semiconductor film 92*a* to the oxide semiconductor film 92*c* by heating. In addition, the insulating film 91 preferably includes few defects; typically, the spin density obtained by ESR measurement at g=2.001 due to a dangling bond of silicon is preferably lower than or equal to $1 \times 10^{18}$ spins/cm$^3$.

The insulating film 91, which has a function of supplying part of oxygen to the oxide semiconductor film 92*a* to the oxide semiconductor film 92*c* by heating, is desirably an oxide. For example, aluminum oxide, magnesium oxide, silicon oxide, silicon oxynitride, silicon nitride oxide, gallium oxide, germanium oxide, yttrium oxide, zirconium oxide, lanthanum oxide, neodymium oxide, hafnium oxide, or tantalum oxide can be used. The insulating film 91 can be formed by a plasma CVD (Chemical Vapor Deposition) method, a sputtering method, or the like.

Note that in this specification, an oxynitride refers to a material that contains more oxygen than nitrogen and a nitride oxide refers to a material that contains more nitrogen than oxygen.

Note that the transistor 90 illustrated in FIG. 21 and FIG. 22 has the following structure: the conductive film 96 overlaps with end portions of the oxide semiconductor film 92*b* in which a channel region is formed; the end portions overlap with neither the conductive film 93 nor the conductive film 94, i.e., the end portions are located in regions different from regions in which the conductive film 93 and the conductive film 94 are located. When the end portions of the oxide semiconductor film 92*b* are exposed to plasma in the etching for forming the end portions, a chlorine radical, a fluorine radical, or the like generated from an etching gas is easily bonded to a metal element contained in the oxide semiconductor. For this reason, it can be considered that the end portions of the oxide semiconductor film, from which oxygen bonded to the metal element is easily released, are likely to have n-type conductivity owing to an oxygen vacancy formed therein. However, in the transistor 90 illustrated in FIG. 21 and FIG. 22, the conductive film 96 overlaps with the end portions of the oxide semiconductor film 92*b* which overlap with neither the conductive film 93 nor the conductive film 94; therefore, electric fields applied to the end portions can be controlled by controlling the potential of the conductive film 96. Consequently, current that flows between the conductive film 93 and the conductive film 94 through the end portions of the oxide semiconductor film 92*b* can be controlled by controlling the potential supplied to the conductive film 96. Such a structure of the transistor 90 is referred to as a Surrounded Channel (S-Channel) structure.

In the S-Channel structure, specifically, when a potential at which the transistor 90 is turned off is supplied to the conductive film 96, the off-state current that flows between the conductive film 93 and the conductive film 94 through the end portions can be reduced. For this reason, even when the distance between the conductive film 93 and the conductive film 94 at the end portions of the oxide semiconductor film 92*b* is reduced as a result of reducing the channel length of the transistor 90 to obtain a high on-state current, the transistor 90 can have a low off-state current. Consequently, with the short channel length, the transistor 90 can have a high on-state current in an on state and a low off-state current in an off state.

In addition, in the S-Channel structure, specifically, when a potential at which the transistor 90 is turned on is supplied to the conductive film 96, the current that flows between the conductive film 93 and the conductive film 94 through the end portions can be increased. The current contributes to an increase in the field-effect mobility and an increase in the on-state current of the transistor 90. Furthermore, when the end portions of the oxide semiconductor film 92*b* overlap with the conductive film 96, a region of carrier flow in the oxide semiconductor film 92*b* is not limited to the vicinity of the interface of the oxide semiconductor film 92*b* close to the insulating film 95. Since carriers flow in a wide area of the oxide semiconductor film 92*b*, the amount of carrier movement in the transistor 90 is increased. As a result, the on-state current of the transistor 90 is increased, and the field-effect mobility is increased, typically to 10 cm$^2$N·s or higher, further to 20 cm$^2$N·s or higher. Note that here, the field-effect mobility is not an approximate value of the mobility as a physical property of the oxide semiconductor film but an apparent field-effect mobility in a saturation region of the transistor, which is an index of current drive capability.

A structure of an oxide semiconductor film will be described below.

An oxide semiconductor film is roughly classified into a single-crystal oxide semiconductor film and a non-single-crystal oxide semiconductor film. The non-single-crystal oxide semiconductor film refers to an amorphous oxide semiconductor film, a microcrystalline oxide semiconductor film, a polycrystalline oxide semiconductor film, a CAAC-OS (C Axis Aligned Crystalline Oxide Semiconductor) film, or the like.

The amorphous oxide semiconductor film is an oxide semiconductor film in which the atomic arrangement is disordered and which has no crystalline component. A typical example thereof is an oxide semiconductor film which includes no crystal part even in a microscopic region and entirely has a completely amorphous structure.

The microcrystalline oxide semiconductor film includes a microcrystal (also referred to as nanocrystal) with a size greater than or equal to 1 nm and less than 10 nm, for example. Thus, the microcrystalline oxide semiconductor film has a higher degree of atomic order than the amorphous oxide semiconductor film. Hence, a characteristic of the microcrystalline oxide semiconductor film lies in that its defect state density is lower than that of the amorphous oxide semiconductor film.

The CAAC-OS film is one of oxide semiconductor films including a plurality of crystal parts, and most crystal parts each fit inside a cube whose one side is less than 100 nm. Thus, there is a case where a crystal part included in the CAAC-OS film fits inside a cube whose one side is less than 10 nm, less than 5 nm, or less than 3 nm. A characteristic of the CAAC-OS film lies in that its defect state density is lower than that of the microcrystalline oxide semiconductor film. In the CAAC-OS film observed with a transmission electron microscope (TEM: Transmission Electron Microscope), a boundary between crystal parts, that is, a crystal grain boundary (also referred to as a grain boundary) cannot be clearly observed. Thus, in the CAAC-OS film, a reduction in electron mobility due to the crystal grain boundary is less likely to occur.

According to a TEM observation of the CAAC-OS film in the direction substantially parallel to a sample surface (cross-sectional TEM observation), metal atoms are arranged in a layered manner in the crystal parts. Each metal atom layer has a morphology reflecting the condition of a surface over which the CAAC-OS film is formed (also referred to as a formation surface) or a top surface thereof, and is arranged parallel to the formation surface or the top surface of the CAAC-OS film.

In this specification, "parallel" refers to a state in which two straight lines are arranged at an angle greater than or equal to −10° and less than or equal to 10°. Accordingly, there is also a case where the angle is greater than or equal to −5° and less than or equal to 5°. In addition, "perpendicular" refers to a state in which two straight lines are arranged at an angle greater than or equal to 80° and less than or equal to 100°. Accordingly, there is also a case where the angle is greater than or equal to 85° and less than or equal to 95°.

On the other hand, according to a TEM observation of the CAAC-OS film in the direction substantially perpendicular to the sample surface (plan-view TEM observation), metal atoms are arranged in a triangular configuration or a hexagonal configuration in the crystal parts. However, no regularity of arrangement of metal atoms between different crystal parts is observed.

From the cross-sectional TEM observation and the plan-view TEM observation, alignment is found in the crystal parts of the CAAC-OS film.

A CAAC-OS film is subjected to structural analysis with an X-ray diffraction (XRD: X-Ray Diffraction) apparatus. For example, when the CAAC-OS film including an InGaZnO$_4$ crystal is analyzed by an out-of-plane method, a peak appears at a diffraction angle (2θ) of around 31° in some cases. This peak is derived from the (009) plane of the InGaZnO$_4$ crystal, which indicates that crystals in the CAAC-OS film have c-axis alignment and that the c-axes are aligned in the direction substantially perpendicular to the formation surface or the top surface.

On the other hand, when the CAAC-OS film is analyzed by an in-plane method, in which an X-ray is directed substantially perpendicularly to the c-axis, a peak appears at 2θ of around 56° in some cases. This peak is derived from the (110) plane of the InGaZnO$_4$ crystal. Here, the sample is subjected to analysis (φ scan) while being rotated around a normal vector of a sample surface as an axis (φ axis) with 2θ fixed at around 56°. In the case of a single-crystal oxide semiconductor film of InGaZnO$_4$, six peaks which are derived from crystal planes equivalent to the (110) plane are observed. In contrast, in the case of a CAAC-OS film, no clear peak appears even when φ scan is performed with 2θ fixed at around 56°.

According to the above results, the CAAC-OS film has c-axis alignment, and the c-axes are aligned in the direction parallel to the normal vector of the formation surface or the top surface, while the a-axes and b-axes are irregularly oriented between different crystal parts. Thus, each layer of metal atoms arranged in a layered manner, which is confirmed by the cross-sectional TEM observation, corresponds to a plane parallel to the a-b plane of the crystal.

Note that the crystal part is formed concurrently with deposition of the CAAC-OS film or through crystallization treatment such as heat treatment. As described above, the c-axis of the crystal is aligned in the direction parallel to the normal vector of the formation surface or the top surface of the CAAC-OS film. Thus, for example, in the case where the shape of the CAAC-OS film is changed by etching or the like, the c-axis of the crystal might not be necessarily parallel to the normal vector of the formation surface or the top surface of the CAAC-OS film.

Furthermore, the crystallinity in the CAAC-OS film is not necessarily uniform. For example, in the case where a crystal part in the CAAC-OS film is formed by crystal growth occurring from the vicinity of the top surface of the CAAC-OS film, the crystallinity in a region in the vicinity of the top surface is higher than that in a region in the vicinity of the formation surface in some cases. Moreover, in the case where an impurity is added to the CAAC-OS film, the crystallinity in a region to which the impurity is added may be changed, so that regions with various crystallinities may be locally formed.

Note that when the CAAC-OS film including an InGaZnO$_4$ crystal is analyzed by an out-of-plane method, a peak of 2θ may also appear at around 36°, in addition to the peak of 2θ at around 31°. The peak of 2θ at around 36° indicates that a crystal having no c-axis alignment is included in part of the CAAC-OS film. It is preferable that in the CAAC-OS film, a peak appear when 2θ is around 31° and no peak appear when 2θ is around 36°.

In a transistor using the CAAC-OS film, a change in electrical characteristics due to irradiation with visible light or ultraviolet light is small. Thus, the transistor has high reliability.

Note that an oxide semiconductor film may be a stacked film including two or more kinds of an amorphous oxide semiconductor film, a microcrystalline oxide semiconductor film, and a CAAC-OS film, for example.

In addition, for the deposition of the CAAC-OS film, the following conditions are preferably employed.

By suppressing the entry of impurities during the deposition, the crystal state can be prevented from being damaged by the impurities. For example, the concentration of impurities (e.g., hydrogen, water, carbon dioxide, and nitrogen) which exist in a treatment chamber may be reduced. Furthermore, the impurity concentration in a deposition gas may be reduced. Specifically, a deposition gas whose dew point is −80° C. or lower, preferably −100° C. or lower is used.

Furthermore, by increasing the substrate heating temperature during the deposition, migration of a sputtered particle occurs after it reaches the substrate. Specifically, the deposition is performed at a substrate heating temperature higher than or equal to 100° C. and lower than or equal to 740° C., preferably higher than or equal to 200° C. and lower than or equal to 500° C. By increasing the substrate heating temperature during the deposition, when a flat-plate-like or pellet-like sputtered particle reaches the substrate, migration occurs on the substrate, so that a flat plane of the sputtered particle is attached to the substrate.

Furthermore, it is preferable that the proportion of oxygen in the deposition gas be increased and the power be optimized in order to reduce plasma damage during the deposition. The proportion of oxygen in the deposition gas is 30 vol % or higher, preferably 100 vol %.

As an example of the target, an In—Ga—Zn oxide target will be described below.

A polycrystalline In—Ga—Zn oxide target is obtained by mixing InO$_X$ powder, GaO$_Y$ powder, and ZnO$_Z$ powder in a predetermined molar ratio, applying pressure, and then, performing heat treatment at a temperature higher than or equal to 1000° C. and lower than or equal to 1500° C. Note that X, Y, and Z are each a given positive number. Here, the predetermined molar ratio of the InO$_X$ powder to the GaO$_Y$ powder and the ZnO$_Z$ powder is, for example, 2:2:1, 8:4:3, 3:1:1, 1:1:1, 4:2:3, 2:1:3, or 3:1:2. Note that the kinds of powder and the molar ratio in which they are mixed may be changed as appropriate depending on the target to be formed. In particular, in a CAAC-OS film formed using a target with a molar ratio of In to Ga and Zn von 2:1:3, the proportion of a region in which a diffraction pattern of CAAC-OS is observed in a certain area (also referred to as the proportion of CAAC) can be increased; thus, a transistor including a channel formation region in the CAAC-OS film can have excellent frequency characteristics (f characteristics).

Note that alkali metal, which is not a constituent element of the oxide semiconductor, is an impurity. Alkaline earth metal is also an impurity in the case where it is not a constituent element of the oxide semiconductor. In the case where an insulating film in contact with an oxide semiconductor film is an oxide, particularly Na, among the alkali metals, diffuses into the insulating film and becomes $Na^+$. Furthermore, in the oxide semiconductor film, Na cuts a metal-oxygen bond contained in the oxide semiconductor or enters the bond. As a result, the electrical characteristics of a transistor deteriorate; for example, a negative shift of the threshold voltage causes the transistor to be normally on, or the mobility is reduced. In addition, variations in characteristics also occur. Specifically, the Na concentration measured by secondary ion mass spectrometry is preferably $5\times10^{16}/cm^3$ or lower, further preferably $1\times10^{16}/cm^3$ or lower, still further preferably $1\times10^{15}/cm^3$ or lower. Similarly, the measured Li concentration is preferably $5\times10^{15}/cm^3$ or lower, further preferably $1\times10^{15}/cm^3$ or lower. Similarly, the measured K concentration is preferably $5\times10^{15}/cm^3$ or lower, further preferably $1\times10^{15}/cm^3$ or lower.

In the case where a metal oxide containing indium is used, silicon or carbon, which have higher bond energy with oxygen than indium, might cut the indium-oxygen bond, so that an oxygen vacancy may be formed. Accordingly, when silicon or carbon is contained in the oxide semiconductor film, the electrical characteristics of the transistor are likely to deteriorate as in the case of alkali metal or alkaline earth metal. Thus, the concentration of silicon and that of carbon in the oxide semiconductor film are desirably low. Specifically, the C concentration or the Si concentration measured by secondary ion mass spectrometry is preferably $1\times10^{18}/cm^3$ or lower. In the above structure, the deterioration of the electrical characteristics of the transistor can be prevented, so that the reliability of the semiconductor device can be improved.

Example of Cross-Sectional Structure of Semiconductor Device

FIG. 23 illustrates an example of a cross-sectional structure of an analog arithmetic circuit of one embodiment of the present invention. Note that FIG. 23 exemplifies a cross-sectional view of the transistor 16 included in the memory circuit 12 illustrated in FIG. 3 and the transistor 26 included in the arithmetic circuit 13 illustrated in FIG. 5. Specifically, a region along the dashed line A1-A2 shows a structure of the transistor 16 and the transistor 26 in the channel length direction. A region along the dashed line A3-A4 shows a structure of the transistor 16 and the transistor 26 in the channel width direction. Note that in one embodiment of the present invention, the channel length direction of one transistor is not necessarily aligned with the channel length direction of another transistor.

Note that the channel length direction of a transistor means a direction in which a carrier moves between a source (a source region or a source electrode) and a drain (a drain region or a drain electrode), and the channel width direction means a direction perpendicular to the channel length direction in a plane parallel to a substrate.

Furthermore, in the example illustrated in FIG. 23, the transistor 16 including a channel formation region in an oxide semiconductor film is formed over the transistor 26 including a channel formation region in a single-crystal silicon substrate.

As a substrate 400 on which the transistor 26 is formed, for example, a silicon substrate, a germanium substrate, or a silicon germanium substrate can be used. FIG. 23 illustrates an example in which a single-crystal silicon substrate is used as the substrate 400.

In addition, the transistor 26 is electrically isolated by an element isolation method. As the element isolation method, a trench isolation method (STI: Shallow Trench Isolation) or the like can be employed. FIG. 23 illustrates an example in which a trench isolation method is used to electrically isolate the transistor 26. Specifically, in the example illustrated in FIG. 23, the transistor 26 is subjected to element isolation using an element isolation region 401 formed in such a manner that an insulator containing silicon oxide or the like is buried in a trench formed in the substrate 400 by etching or the like and then the insulator is partly removed by etching or the like.

Note that in the case where the transistor 26 has the same polarity as a transistor adjacent thereto, element isolation between the adjacent transistors is not necessarily performed. In that case, the layout area can be reduced.

In a projection of the substrate 400 which exists in a region other than the trench, an impurity region 402 and an impurity region 403 of the transistor 26 and a channel formation region 404 positioned between the impurity region 402 and the impurity region 403 are provided. Furthermore, the transistor 26 includes an insulating film 405 which covers the channel formation region 404 and a gate electrode 406 which overlaps with the channel formation region 404 with the insulating film 405 positioned therebetween.

In the transistor 26, a side portion and an upper portion of the projection of the channel formation region 404 overlap with the gate electrode 406 with the insulating film 405 positioned therebetween, so that carriers flow in a wide area including the side portion and the upper portion of the channel formation region 404. Thus, the amount of carrier movement in the transistor 26 can be increased while the area over the substrate occupied by the transistor 26 is kept small. As a result, the on-state current and the field-effect mobility of the transistor 26 are increased. Suppose that the length of the projection of the channel formation region 404 in the channel width direction (channel width) is W and that the thickness of the projection of the channel formation region 404 is T. When the aspect ratio of the thickness T to the channel width W is high, in particular, carriers flow in a wider area. Thus, the on-state current and the field-effect mobility of the transistor 26 can be further increased.

Note that in the case of the transistor 26 using a bulk semiconductor substrate, the aspect ratio is desirably 0.5 or higher, further desirably 1 or higher.

An insulating film 411 is provided over the transistor 26. Openings are formed in the insulating film 411. Furthermore, a conductive film 412 and a conductive film 413 which are electrically connected to the impurity region 402 and the impurity region 403, respectively, and a conductive film 414 which is electrically connected to the gate electrode 406 are formed in the openings.

Furthermore, the conductive film 412 is electrically connected to a conductive film 416 formed over the insulating film 411. The conductive film 413 is electrically connected to a conductive film 417 formed over the insulating film 411.

The conductive film 414 is electrically connected to a conductive film 418 formed over the insulating film 411.

An insulating film 420 is provided over the conductive film 416 to the conductive film 418. Furthermore, an insulating film 421 having a blocking effect of preventing diffusion of oxygen, hydrogen, and water is provided over the insulating film 420. As the insulating film 421 has a higher density and is denser or has fewer dangling bonds and is more chemically stable, its blocking effect is improved. For the insulating film 421 having a blocking effect of preventing diffusion of oxygen, hydrogen, and water, for example, aluminum oxide, aluminum oxynitride, gallium oxide, gallium oxynitride, yttrium oxide, yttrium oxynitride, hafnium oxide, or hafnium oxynitride can be used. For the insulating film 421 having a blocking effect of preventing diffusion of hydrogen and water, for example, silicon nitride or silicon nitride oxide can be used.

An insulating film 422 is provided over the insulating film 421. The transistor 16 is provided over the insulating film 422.

The transistor 16 includes a semiconductor film 430 which is over the insulating film 422 and contains an oxide semiconductor, a conductive film 432 and a conductive film 433 which are electrically connected to the semiconductor film 430 and function as a source electrode and a drain electrode, a gate insulating film 431 which covers the semiconductor film 430, and a gate electrode 434 which overlaps with the semiconductor film 430 with the gate insulating film 431 positioned therebetween. Note that an opening is provided in the insulating film 420 to the insulating film 422. The conductive film 433 is connected to the conductive film 418 in the opening.

Note that in FIG. 23, the transistor 16 may include the gate electrode 434 on at least one side of the semiconductor film 430 or may further include a gate electrode which overlaps with the semiconductor film 430 with the insulating film 422 positioned therebetween.

In the case where the transistor 16 includes a pair of gate electrodes, a signal for controlling an on state or an off state may be supplied to one of the gate electrodes, and the other gate electrode may be supplied with a potential from another source. In this case, potentials at the same level may be supplied to the pair of gate electrodes, or a fixed potential such as the ground potential may be supplied only to the other gate electrode. By controlling the level of the potential supplied to the other gate electrode, the threshold voltage of the transistor can be controlled.

In addition, FIG. 23 exemplifies the case where the transistor 16 has a single-gate structure in which one channel formation region corresponding to one gate electrode 434 is provided. However, the transistor 16 may have a multi-gate structure in which a plurality of electrically connected gate electrodes is provided so that a plurality of channel formation regions is included in one active layer.

Furthermore, as illustrated as an example in FIG. 23, the semiconductor film 430 of the transistor 16 includes an oxide semiconductor film 430a to an oxide semiconductor film 430c which are sequentially stacked over the insulating film 422. Note that in one embodiment of the present invention, the semiconductor film 430 included in the transistor 16 may be formed using a single-layer metal oxide film.

Examples of Electronic Device

The semiconductor device of one embodiment of the present invention can be used for display devices, personal computers, or image reproducing devices provided with recording media (typically, devices which reproduce the content of recording media such as DVDs (Digital Versatile Discs) and have displays for displaying the images). As other electronic devices for which the semiconductor device of one embodiment of the present invention can be used, mobile phones, game machines including portable ones, portable information terminals, e-book readers, cameras such as video cameras and digital still cameras, goggle-type displays (head-mounted displays), navigation systems, audio reproducing devices (e.g., car audio systems and digital audio players), copiers, facsimiles, printers, multi-function printers, automated teller machines (ATMs), vending machines, and medical equipment are given. FIG. 25 illustrates specific examples of these electronic devices.

FIG. 25(A) illustrates a portable game console including a housing 5001, a housing 5002, a display portion 5003, a display portion 5004, a microphone 5005, a speaker 5006, an operation key 5007, a stylus 5008, and the like. The semiconductor device of one embodiment of the present invention can be used for a variety of integrated circuits in the portable game console. Note that, although the portable game console illustrated in FIG. 25(A) includes two display portions 5003 and 5004, the number of display portions included in the portable game console is not limited thereto.

FIG. 25(B) illustrates a portable information terminal including a first housing 5601, a second housing 5602, a first display portion 5603, a second display portion 5604, a joint 5605, an operation key 5606, and the like. The semiconductor device of one embodiment of the present invention can be used for a variety of integrated circuits in the portable information terminal. The first display portion 5603 is provided in the first housing 5601, and the second display portion 5604 is provided in the second housing 5602. Furthermore, the first housing 5601 and the second housing 5602 are connected to each other with the joint 5605, and the angle between the first housing 5601 and the second housing 5602 can be changed with the joint 5605. Images on the first display portion 5603 may be switched in accordance with the angle at the joint 5605 between the first housing 5601 and the second housing 5602. In addition, a display device with a function of a position input device may be used for the first display portion 5603 and/or the second display portion 5604. Note that the function of a position input device can be added by providing a touch panel in a display device. Alternatively, the function of a position input device can be added by providing a photoelectric conversion element which is also called a photosensor in a pixel portion of a display device.

FIG. 25(C) illustrates a laptop personal computer including a housing 5401, a display portion 5402, a keyboard 5403, a pointing device 5404, and the like. The semiconductor device of one embodiment of the present invention can be used for a variety of integrated circuits in the laptop personal computer.

FIG. 25(D) illustrates a hand mirror including a first housing 5301, a second housing 5302, a mirror 5303, a joint 5304, and the like. The first housing 5301 and the second housing 5302 are connected to each other with the joint 5304, and the angle between the first housing 5301 and the second housing 5302 can be changed with the joint 5304. Furthermore, lighting devices are used for the first housing 5301 and the second housing 5302. The lighting devices each include a planar light-emitting element. The light-emitting element may be configured to be switched between the light-emission state and the non-conduction state in accordance with the angle between the first housing 5301 and the second housing 5302 at the joint 5304. The semiconductor device of one embodiment of the present invention can be used for a variety of integrated circuits for controlling the operation of the lighting device.

FIG. 25(E) illustrates a bracelet-type display device including a housing 5701 having a curved surface, a display portion 5702, and the like. The semiconductor device of one embodiment of the present invention can be used for a variety of integrated circuits for controlling the operation of a display device used for the display portion 5702.

FIG. 25(F) illustrates a mobile phone. A housing 5901 having a curved surface is provided with a display portion 5902, a microphone 5907, a speaker 5904, a camera 5903, an external connection port 5906, and an operation button 5905. The semiconductor device of one embodiment of the present invention can be used for a variety of integrated circuits for controlling the operation of a display device used for the display portion 5902.

Others

In this specification and the like, for example, transistors with a variety of structures can be used as transistors. Therefore, there is no limitation on the type of transistors to be used. As a transistor, for example, a transistor containing single-crystal silicon or a transistor including a film of a non-single-crystal semiconductor typified by amorphous silicon, polycrystalline silicon, microcrystalline (also referred to as microcrystal, nanocrystal, or semi-amorphous) silicon, or the like can be used. Alternatively, a thin film transistor (TFT) including a thin film of such a semiconductor, or the like can be used. The use of the TFT has various advantages. For example, since it can be formed at a temperature lower than that in the case of single-crystal silicon, the manufacturing cost can be reduced or a larger manufacturing apparatus can be used. The larger manufacturing apparatus enables manufacture over a large substrate. Since the manufacturing temperature is low, it is also possible to use a substrate having low heat resistance.

Note that when a catalyst (e.g., nickel) is used for forming microcrystalline silicon, crystallinity can be further improved; thus, a transistor having favorable electrical characteristics can be formed. In this case, crystallinity can be improved by just heat treatment without laser irradiation. Note that it is possible to form polycrystalline silicon or microcrystalline silicon without a catalyst (e.g., nickel).

Note that as a transistor, for example, a transistor containing a compound semiconductor (e.g., SiGe or GaAs), an oxide semiconductor (e.g., Zn—O, In—Ga—Zn—O, In—Zn—O, In—Sn—O (ITO), Sn—O, Ti—O, Al—Zn—Sn—O (AZTO), or In—Sn—Zn—O), or the like can be used. Alternatively, a thin film transistor including a thin film of such a compound semiconductor or such an oxide semiconductor, or the like can be used. Since the manufacturing temperature can be lowered, a transistor can be formed at room temperature, for example. Accordingly, a transistor can be formed directly on a substrate having low heat resistance, such as a plastic substrate or a film substrate. Note that such a compound semiconductor or an oxide semiconductor can be used not only for a channel portion of the transistor but also for other applications.

Note that, for example, a transistor formed by an inkjet method or a printing method can be used as the transistor. These methods enable manufacture at room temperature, manufacture in a low vacuum, or manufacture over a large substrate. Therefore, manufacture without a mask (reticle) is possible, so that the layout of the transistor can be easily changed. Alternatively, since the manufacture without a resist is possible, the material cost can be reduced and the number of steps can be reduced. Furthermore, a film can be formed only in a portion where it is needed; therefore, the waste of a material can be prevented and the cost can be saved as compared with a manufacturing method in which a film deposited over the entire surface is etched.

Note that, for example, a transistor containing an organic semiconductor or a carbon nanotube can be used as a transistor. Accordingly, a transistor can be formed over a bendable substrate. A device using a transistor containing an organic semiconductor or a carbon nanotube can resist a shock.

Note that transistors with various other structures can be used as transistors. For example, a MOS transistor, a junction transistor, or a bipolar transistor can be used as a transistor. By using a MOS transistor as a transistor, the size of the transistor can be reduced. Thus, a large number of transistors can be mounted. By using a bipolar transistor as a transistor, a high current can be supplied. Thus, a circuit can operate at high speed. Note that a MOS transistor and a bipolar transistor may be formed over one substrate. Accordingly, low power consumption, a size reduction, high-speed operation, and the like can be achieved.

For example, in this specification and the like, an explicit description "X and Y are connected" means that X and Y are electrically connected, X and Y are functionally connected, and X and Y are directly connected. Accordingly, without being limited to a predetermined connection relation such as a connection relation shown in a drawing or text, a connection relation other than that shown in a drawing or text is possible.

Here, X and Y each denote an object (e.g., a device, an element, a circuit, a wiring, an electrode, a terminal, a conductive film, or a layer).

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that a switch functions by being controlled to be turned on or off. That is, a switch has a function of controlling whether to let current flow or not by falling into the conducting state (on state) or non-conducting state (off state). Alternatively, a switch has a function of selecting and switching a current path.

For example, in the case where X and Y are functionally connected, one or more circuits that enable a functional connection between X and Y (e.g., a logic circuit (inverter, a NAND circuit, a NOR circuit, or the like), a signal converter circuit (a D/A converter circuit, an A/D converter circuit, a gamma correction circuit, or the like), a potential level converter circuit (a power supply circuit (such as a step-up circuit or a step-down circuit), a level shifter circuit for changing the potential level of a signal, or the like), a voltage source, a current source, a switching circuit, an amplifier circuit (a circuit that can increase the signal amplitude, the amount of current, or the like, an operational amplifier, a differential amplifier circuit, a source follower circuit, a buffer circuit, or the like), a signal generation circuit, a memory circuit, or a control circuit) can be connected between X and Y. Note that, for example, in the case where a signal output from X is transmitted to Y even with another circuit positioned between X and Y, X and Y are functionally connected.

Note that an explicit description "X and Y are electrically connected" means not only that X and Y are electrically connected (i.e., X and Y are connected with another element or another circuit positioned therebetween), but also that X and Y are functionally connected (i.e., X and Y are functionally connected with another circuit positioned therebetween) and that X and Y are directly connected (i.e., X and Y are connected without another element or another circuit positioned therebetween). That is, the explicit description "electrically connected" is the same as the explicit simple description "connected".

Note that, for example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expression include "X, Y, and a source (or a first terminal or the like) and a drain (or a second terminal or the like) of a transistor are electrically connected to each other, and X, the source (or the first terminal or the like) of the transistor, the drain (or the second terminal or the like) of the transistor, and Y are electrically connected in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided in this connection order". When the connection order in a circuit configuration is defined by an expression similar to these examples, a source (or a first terminal or the like) and a drain (or a second terminal or the like) of a transistor can be distinguished from each other to specify the technical scope. Note that these expressions are just examples and no limitation is imposed by these expressions. Here, X, Y, Z1, and Z2 each denote an object (e.g., a device, an element, a circuit, a wiring, an electrode, a terminal, a conductive film, or a layer).

Note that, even when independent components are electrically connected to each other in a circuit diagram, one component has functions of a plurality of components in some cases. For example, when part of a wiring also functions as an electrode, one conductive film has functions of both components, namely, a function of the wiring and a function of the electrode. Thus, the category "electrical connection" in this specification includes such a case where one conductive film has functions of a plurality of components.

Note that a content (or part of the content) described in an embodiment can be applied to, combined with, or replaced by a different content (or part of the content) described in the embodiment and/or a content (or part of the content) described in another or other embodiments.

Note that in each embodiment, a content described in the embodiment is a content described with reference to a variety of drawings or a content described with text in the specification.

Note that, by combining a drawing (or part thereof) illustrated in one embodiment with another part of the drawing, a different drawing (or part thereof) illustrated in the embodiment, and/or a drawing (or part thereof) illustrated in another or other embodiments, much more drawings can be created.

Note that, as for a content that is not specified in any drawing or text in the specification, one embodiment of the invention excluding the content can be constituted. Alternatively, when the range of a value that is defined, for example, by the maximum value and the minimum value is described, the range may be freely narrowed or a value in the range may be excluded, so that one embodiment of the invention can be specified by the range part of which is excluded. In this manner, for example, it is possible to specify the technical scope of one embodiment of the present invention such that a conventional technology is excluded.

As a specific example, a circuit diagram illustrating a circuit with first to fifth transistors is given. In this case, the invention can be specified by the circuit without a sixth transistor or by the circuit without a capacitor. Moreover, it is possible to constitute the invention specified by the circuit without a sixth transistor having a particular connection structure. It is also possible to constitute the invention specified by the circuit without a capacitor having a particular connection structure. For example, the invention can be specified by the absence of a sixth transistor whose gate is connected to a gate of the third transistor. Alternatively, for example, the invention can be specified by the absence of a capacitor whose first electrode is connected to the gate of the third transistor.

As another specific example, for example, the description of a value, "a voltage is preferably higher than or equal to 3 V and lower than or equal to 10 V" is given. In this case, for example, one embodiment of the invention can be specified by excluding the case where the voltage is higher than or equal to −2 V and lower than or equal to 1 V. Alternatively, for example, one embodiment of the invention can be specified by excluding the case where the voltage is higher than or equal to 13 V. Note that, for example, it is also possible to specify the invention by the voltage ranging from 5 V to 8 V. Note that, for example, it is also possible to specify the invention by the voltage of approximately 9 V. Note that, for example, it is also possible to specify the invention by excluding the case where the voltage is higher than or equal to 3 V and lower than or equal to 10 V but is not 9 V. Note that even when a description of a value includes "a certain range is preferable", "preferably satisfies a certain condition", or the like, the value is not limited to the description. In other words, a term such as "preferable" or "preferably" does not necessarily impose limitation.

As another specific example, for example, the description of a value, "a voltage is preferably 10 V" is given. In this case, for example, one embodiment of the invention can be specified by excluding the case where the voltage is higher than or equal to −2 V and lower than or equal to 1 V. Alternatively, for example, one embodiment of the invention can be specified by excluding the case where the voltage is higher than or equal to 13 V.

As another specific example, for example, the description of a property of a substance, "a film is an insulating film" is given. In this case, for example, one embodiment of the invention can be specified by excluding the case where the insulating film is an organic insulating film. Alternatively, for example, one embodiment of the invention can be specified by excluding the case where the insulating film is an inorganic insulating film. Alternatively, for example, one embodiment of the invention can be specified by excluding the case where the film is a conductive film. Alternatively, for example, one embodiment of the invention can be specified by excluding the case where the film is a semiconductor film.

As another specific example, for example, the description of a stacked-layer structure, "a film is provided between a film A and a film B" is given. In this case, for example, the invention can be specified by excluding the case where the film is a stacked film of four or more layers. Alternatively, for example, the invention can be specified by excluding the case where a conductive film is provided between the film A and the film.

Note that various people can implement one embodiment of the invention described in this specification and the like. However, several people may be involved in the implementation. For example, in the case of a transmission/reception system, the following case is possible: Company A manufactures and sells transmitting devices, and Company B manufactures and sells receiving devices. As another example, in the case of a light-emitting device including a transistor and a light-emitting element, the following case is possible: Company A manufactures and sells semiconductor devices in which transistors are formed, and Company B purchases the semiconductor devices and completes light-emitting devices by providing the semiconductor devices with light-emitting elements.

In such a case, one embodiment of the invention can be constituted such that a patent infringement can be claimed against both Company A and Company B. In other words, one embodiment of the invention can be constituted so as to be implemented by only Company A, and one embodiment of the invention can be constituted as another embodiment of the invention so as to be implemented by only Company B. In addition, one embodiment of the invention with which a patent infringement can be claimed against Company A or Company B is clear and can be regarded as being disclosed in this specification or the like. For example, in the case of a transmission/reception system, even when this specification or the like lacks a description of the sole use of a transmitting device or a description of the sole use of a receiving device, one embodiment of the invention can be constituted by only the transmitting device and another embodiment of the invention can be constituted by only the receiving device. These embodiments of the invention are clear and can be regarded as being disclosed in this specification or the like. As another example, the case of a light-emitting device including a transistor and a light-emitting element is given. Even when this specification or the like lacks a description of the sole use of a semiconductor device in which the transistor is formed or a description of the sole use of a light-emitting device including the light-emitting element, one embodiment of the invention can be constituted by only the semiconductor device in which the transistor is formed and one embodiment of the invention can be constituted by only the light-emitting device including the light-emitting element. These embodiments of the invention are clear and can be regarded as being disclosed in this specification or the like.

Note that in this specification and the like, it may be possible for those skilled in the art to constitute one embodiment of the invention even when portions to which all the terminals of an active element (e.g., a transistor or a diode), a passive element (e.g., a capacitor or a resistor), or the like are connected are not specified. In other words, one embodiment of the invention is clear even when connection portions are not specified. Furthermore, in the case where a specific connection portion is disclosed in this specification or the like, it may be possible to determine that one embodiment of the invention in which a connection portion is not specified is disclosed in this specification or the like. In particular, in the case where the number of portions to which the terminal is connected may be more than one, the portions to which the terminal is connected is not necessarily limited to a specific portion. Therefore, it may be possible to constitute one embodiment of the invention by specifying only portions to which some terminals of an active element (e.g., a transistor or a diode), a passive element (e.g., a capacitor or a resistor), or the like are connected.

Note that in this specification and the like, it may be possible for those skilled in the art to specify the invention when at least the connection portion of a circuit is specified. Alternatively, it may be possible for those skilled in the art to specify the invention when at least a function of a circuit is specified. In other words, when a function is specified, one embodiment of the invention is clear. Furthermore, it may be possible to determine that one embodiment of the invention whose function is specified is disclosed in this specification or the like. Therefore, even when a function is not specified, a circuit whose connection portion is specified can be regarded as being disclosed as one embodiment of the invention and constitute one embodiment of the invention. Alternatively, even when a connection portion is not specified, a circuit whose function is specified can be regarded as being disclosed as one embodiment of the invention and constitute one embodiment of the invention.

Note that in this specification and the like, part of a drawing or text described in one embodiment can be taken out to constitute one embodiment of the invention. Thus, in the case where a drawing or text referring to a certain portion is described, a content obtained by taking out part of the drawing or the text can also be regarded as being disclosed as one embodiment of the invention and constitute one embodiment of the invention. Furthermore, the embodiment of the invention is clear. Therefore, to constitute one embodiment of the invention, for example, it is possible to take out part of a drawing or text in which one or more active elements (e.g., transistors or diodes), wirings, passive elements (e.g., capacitors or resistors), conductive layers, insulating layers, semiconductor layers, organic materials, inorganic materials, components, devices, operation methods, manufacturing methods, or the like are described. For example, from a circuit diagram including N circuit elements (e.g., transistors or capacitors; N is an integer), it is possible to take out M circuit elements (e.g., transistors or capacitors; M is an integer, where M<N) to constitute one embodiment of the invention. As another example, it is possible to take out M layers (M is an integer) from a cross-sectional view including N layers (N is an integer, where M<N) to constitute one embodiment of the invention. As another example, it is possible to take out M elements (M is an integer) from a flow chart including N elements (N is an integer, where M<N) to constitute one embodiment of the invention. As another example, it is possible to take out some given elements from a sentence "A includes B, C, D, E, or F" to constitute one embodiment of the invention, for example, "A includes B and E", "A includes E and F", "A includes C, E, and F", or "A includes B, C, D, and E".

Note that in the case where at least one specific example is given in a drawing or text described in one embodiment in this specification or the like, it will be readily appreciated by those skilled in the art that a broader concept of the specific example can be derived. Therefore, in the case where at least one specific example is given in a drawing or text described in one embodiment, a broader concept of the specific example can be regarded as being disclosed as one embodiment of the invention and constitute one embodiment of the invention. Furthermore, the embodiment of the invention is clear.

Note that in this specification and the like, what is illustrated in at least a drawing (or part of the drawing) can be regarded as being disclosed as one embodiment of the invention and constitute one embodiment of the invention. Therefore, even when not described with text, a certain content illustrated in a drawing can be regarded as being disclosed as one embodiment of the invention and can constitute one embodiment of the invention. Similarly, a drawing obtained by taking out part of a drawing can be regarded as being disclosed as one embodiment of the invention and can constitute one embodiment of the invention. Furthermore, the embodiment of the invention is clear.

Note that a current source has a function of supplying a constant current even when the magnitude of a voltage applied between both terminals of the current source is changed. Alternatively, for example, a current source has a function of supplying a constant current to an element connected to the current source even when the potential of the element is changed.

Note that there is a voltage source as a power source different from a current source. A voltage source has a function of supplying a constant voltage even when a current flowing through a circuit connected to the voltage source is changed. Thus, a voltage source and a current source have a function of supplying a voltage and a current, respectively. Their functions are different from each other in an object to be supplied at a constant level even when one factor is changed. A current source has a function of supplying a constant current even when the voltage between both ends is changed. A voltage source has a function of supplying a constant voltage even when the current is changed.

REFERENCE NUMERALS

10: analog arithmetic circuit
11: circuit
11-$k$: circuit
11-$m$: circuit
11-1: circuit
11$a$: circuit
11$h$: circuit
12: memory circuit
12$a$: memory circuit
12$b$: memory circuit
13: arithmetic circuit
14: controller
15: switch
15$t$: transistor
16: transistor
17: capacitor
18: delay circuit
18$a$: delay circuit
18$b$: delay circuit
18$c$: delay circuit
19: resistor
20: capacitor
21: inverter
21-1: inverter
21-2: inverter
21-2$n$: inverter
22: transistor
23: transistor
24: transistor
25: transistor
26: transistor
27: transistor
28: transistor
29: transistor
29$a$: transistor
29$b$: transistor
30: capacitor
31: wiring
32: wiring
33: delay circuit
34: delay circuit
35$a$: circuit
35$b$: circuit
36: inverter
37: transistor
38: delay circuit
39: delay circuit
40: AND circuit
41: transistor
42: transistor
43: transistor
44: resistor
45: resistor
46: resistor
47: resistor
48: resistor
49: diode
50: diode
51: resistor
52: resistor
53: resistor
54: resistor
55: resistor
56: resistor
57: resistor
58: resistor
59: resistor
60: memory cell
61: transistor
62: transistor
63: capacitor
64: circuit
65: transistor
66: transistor
67: transistor
68: transistor
69: transistor
70: transistor
71: capacitor
75: semiconductor device
76: input device
77: analog processor
78: output device
79: analog-to-digital converter circuit
80: digital-to-analog converter circuit
81: digital processor
82: wiring
83: wiring
84: wiring
85: analog processor
86: I/O interface
87: analog memory
88: resistor
89: inverter
90: transistor 91: insulating film
92a: oxide semiconductor film
92b: oxide semiconductor film
92c: oxide semiconductor film
93: conductive film
94: conductive film
95: insulating film
96: conductive film
97: substrate
400: substrate
401: element isolation region
402: impurity region
403: impurity region
404: channel formation region
405: insulating film
406: gate electrode
411: insulating film
412: conductive film
413: conductive film
414: conductive film
416: conductive film
417: conductive film
418: conductive film
420: insulating film
421: insulating film
422: insulating film
430: semiconductor film
430a: oxide semiconductor film
430c: oxide semiconductor film
431: gate insulating film
432: conductive film
433: conductive film
434: gate electrode
601: semiconductor substrate
610: element isolation region
611: insulating film
612: insulating film
613: insulating film
625: conductive film
626: conductive film
627: conductive film
634: conductive film
635: conductive film
636: conductive film
637: conductive film
644: conductive film
651: conductive film
652: conductive film
653: conductive film
654: conductive film
655: conductive film
661: insulating film
662: gate insulating film
663: insulating film
701: semiconductor film
710: region
711: region
721: conductive film
722: conductive film
731: gate electrode
800: semiconductor device
801: image sensor
802: image memory
803: analog processor
804: display device
805: sensor array
806: driver circuit
807: circuit
808: image data
809: analog memory
810: pixel
5001: housing
5002: housing
5003: display portion
5004: display portion
5005: microphone
5006: speaker
5007: operation key
5008: stylus
5301: housing
5302: housing
5303: mirror
5304: joint
5401: housing
5402: display portion
5403: keyboard
5404: pointing device
5601: housing
5602: housing
5603: display portion
5604: display portion
5605: joint
5606: operation key
5701: housing
5702: display portion
5901: housing
5902: display portion
5903: camera
5904: speaker
5905: button
5906: external connection port
5907: microphone

The invention claimed is:

1. An analog arithmetic circuit comprising a plurality of first circuits,
   wherein an output terminal of the k-th (k is a natural number) first circuit is connected to an input terminal of the k+1-th first circuit,
   wherein each of the first circuits comprises a memory circuit which holds an analog signal, a second circuit which performs arithmetic processing using the analog signal, a switch which controls power supply to the second circuit, and a controller,
   wherein the memory circuit is electrically connected to the controller,
   wherein an output terminal of the second circuit in the k-th first circuit is electrically connected to an input terminal of the memory circuit in the k+1-th first circuit,
   wherein a first output terminal of the controller in the k+1-th first circuit is electrically connected to an input terminal of the controller in the k+2-th first circuit, and
   wherein a second output terminal of the controller in the k+1-th first circuit is electrically connected to the switch in the k-th first circuit.

2. The analog arithmetic circuit according to claim 1, wherein the switch comprises a transistor, and
   wherein the transistor comprises a channel formation region in an oxide semiconductor film.

3. The analog arithmetic circuit according to claim 2, wherein the oxide semiconductor film contains In, Ga, and Zn.

4. An electronic device comprising:
the analog arithmetic circuit according to claim 1; and
a display device.

5. A semiconductor device comprising:
the analog arithmetic circuit according to claim 1; and
a logic circuit.

6. An electronic device comprising:
the semiconductor device according to claim 5; and
a display device.

* * * * *